US008204809B1

(12) United States Patent
Wise

(10) Patent No.: US 8,204,809 B1
(45) Date of Patent: Jun. 19, 2012

(54) FINANCE FUNCTION HIGH PERFORMANCE CAPABILITY ASSESSMENT

(75) Inventor: Charles Paul Wise, Alpharetta, GA (US)

(73) Assignee: Accenture Global Services Limited, Dublin (IE)

( * ) Notice: Subject to any disclaimer, the term of this patent is extended or adjusted under 35 U.S.C. 154(b) by 160 days.

(21) Appl. No.: 12/466,995

(22) Filed: May 15, 2009

Related U.S. Application Data

(60) Provisional application No. 61/092,225, filed on Aug. 27, 2008.

(51) Int. Cl.
*G06Q 40/00* (2012.01)
(52) U.S. Cl. .................................. 705/35; 705/36 R
(58) Field of Classification Search ................ 705/1.1, 705/11, 35, 317, 346, 347, 500
See application file for complete search history.

(56) References Cited

U.S. PATENT DOCUMENTS

| | | | |
|---|---|---|---|
| 5,212,635 A * | 5/1993 | Ferriter | 705/11 |
| 5,365,425 A * | 11/1994 | Torma et al. | 705/2 |
| 5,574,828 A * | 11/1996 | Hayward et al. | 706/45 |
| 5,875,431 A * | 2/1999 | Heckman et al. | 705/7 |
| 6,119,097 A * | 9/2000 | Ibarra | 705/11 |
| 6,556,974 B1 * | 4/2003 | D'Alessandro | 705/10 |
| 6,877,034 B1 * | 4/2005 | Machin et al. | 709/223 |
| 6,968,316 B1 * | 11/2005 | Hamilton | 705/36 R |
| 2002/0035495 A1 | 3/2002 | Spira et al. | |
| 2002/0055866 A1 * | 5/2002 | Dewar | 705/8 |
| 2002/0069083 A1 * | 6/2002 | Harter et al. | 705/1 |
| 2002/0120491 A1 * | 8/2002 | Nelson | 705/10 |
| 2002/0133368 A1 * | 9/2002 | Strutt et al. | 705/1 |
| 2003/0065543 A1 * | 4/2003 | Anderson | 705/7 |
| 2003/0083898 A1 * | 5/2003 | Wick et al. | 705/1 |
| 2003/0083912 A1 | 5/2003 | Covington, III et al. | |
| 2004/0054567 A1 * | 3/2004 | Bubner | 705/7 |
| 2004/0098299 A1 | 5/2004 | Ligon et al. | |
| 2004/0102990 A1 * | 5/2004 | Jones | 705/1 |
| 2005/0234767 A1 * | 10/2005 | Bolzman et al. | 705/11 |
| 2006/0074788 A1 * | 4/2006 | Grizack et al. | 705/35 |
| 2006/0200358 A1 * | 9/2006 | Ohnemus et al. | 705/1 |
| 2006/0235778 A1 * | 10/2006 | Razvi et al. | 705/35 |
| 2007/0239466 A1 * | 10/2007 | McCullagh et al. | 705/1 |

OTHER PUBLICATIONS

Anonymous "Comparing mean variance tests with stochastic dominance tests when assessing international portfolio diversification benefits." Jun. 2005 Financial Services Review, v 14, n 2, p. 149.*
Anonymous "Prove it: indexing measures purchasing performance." Oct. 2006 Summit Magazine, v 9, n 6, p. 10.*
Moffett et al. "Benchmarking and performance measurement: a statistical analysis" 2008Benchmarking v15n4 pp. 368-381.*
Punniyamoorthy, et al "Balanced score for the balanced scorecard: a benchmarking tool" 2008Benchmarking v15n4 pp. 420-443.*

(Continued)

*Primary Examiner* — Kelly Campen
(74) *Attorney, Agent, or Firm* — Brinks Hofer Gilson & Lione

(57) ABSTRACT

A finance function high performance capability assessment model helps a business meet the challenges of the global marketplace. As a result, businesses can achieve the clarity, consistency, and well-defined execution of a finance functions improvement program. In addition, the finance function high performance capability assessment model helps the business to identify specific areas in which cost reductions and improvements to key areas that impact finance functions may be made and understand how to make the improvements.

25 Claims, 51 Drawing Sheets

OTHER PUBLICATIONS

Amand et al "Benchmarking the benchmarking models" 2008 Benchmarking v15n3 pp. 257-291.*

Non-Final Office Action dated Apr. 28, 2011, issued in related U.S. Appl. No. 12/129,080.

* cited by examiner

| Finance Process Excellence | 100 | | | |
|---|---|---|---|---|
| Finance Function Management 104 | Finance & Accounting Operations 106 | Enterprise Performance Management 108 | Corporate Finance 110 | Enterprise Risk Management 112 |
| Manage Finance Organization 114 | General Accounting & Reporting (Record to Report) 118 | Strategic Planning / Shareholder Value Targeting 134 | Internal Controls | Financial Risk Management 150 |
| Drive Enterprise Wide Change 116 | Fixed Asset Accounting 120 | Target Setting 136 | Investor Relations 142 | Non-Financial Risk Management 152 |
| | Purchase to Pay 122 | Planning, Resource Allocation & Forecasting 138 | Treasury & Cash Management 144 | |
| | Travel & Expense Reimbursements (T&E) 124 | Performance Reporting and Analytics 140 | Corporate Tax 146 | |
| | Order to Cash (OTC) 126 | | 148 | |
| | Product Costing – Costing and Inventory Accounting 128 | | | |
| | Payroll 130 | | | |
| | Maintain Finance Systems and Data Structures 132 | | | |

FIG. 1

| Identify Proper Role of Finance | 302 |
|---|---|
| Identify potential finance services / roles / activities | |
| Segregate potential roles by value-add and by finance ability to execute | |
| Define and communicate appropriate finance scope of responsibility | |
| Periodically reassess finance role within the enterprise | |

| Understand Needs of Internal Customers | 304 |
|---|---|
| Interview / survey users of finance services | |
| Compile and analyze results | |
| Adjust scope of services or delivery model if appropriate | |
| Periodically reassess finance role within the enterprise | |

| Manage Delivery of Finance Services | 306 |
|---|---|
| Establish service levels for specific finance activities | |
| Define appropriate service delivery model(s) | |
| Estimate resource requirements to provide desired service levels | |
| Deploy specific resources (e.g. people, technology, etc.) to achieve service levels | |

| Manage Cost of Finance | 308 |
|---|---|
| Measure cost of finance | |
| Analyze finance cost and determine cost drivers | |
| Identify root causes of cost issues | |
| Set finance function cost targets | |
| Structure and execute cost reduction activities | |

| Manage Performance of Finance Function | 310 |
|---|---|
| Identify Finance Function Performance Metrics | |
| Measure Baseline Performance | |
| Set Targets for Metrics | |
| Track Performance Against These Targets | |
| Identify Root Causes of Poor Performance and Take Corrective Action | |

| Create / Maintain Finance Organization Structure | 312 |
|---|---|
| Define finance organization structure | |
| Define finance reporting relationships | |
| Define scope of responsibility for "sub-organizations" within finance | |
| Periodically re-assess finance organization structure | |

| Manage Finance Workforce; Develop Finance Skills | 314 |
|---|---|
| Identify required skills of finance staff | |
| Hire / recruit finance employees | |
| Provide training and mentoring to finance employees | |
| Manage performance / career development / progression of finance staff | |
| Mange compensation of finance employees | |
| Manage finance rotation programs | |

| Continuously Improve Finance Function | 316 |
|---|---|
| Establish finance improvement governance structure | |
| Measure baseline – cost and performance | |
| Set improvement targets | |
| Structure and execute improvement initiatives | |
| Continue cycle – measure, target, improve, measure, etc. | |

1100

FIG. 11

| Drive a Value Focus into the Enterprise | 1202 |
|---|---|
| Educate company personnel on shareholder value concepts | |
| Enforce consistency and rigor in all financial and business analysis | |
| Structure all enterprise performance management processes around value concepts | |

| Provide Merger & Acquisition Support | 1204 |
|---|---|
| Mobilize Effort | |
| Define Migration Path | |
| Execute Integration | |

| Act as Change Agent Across the Enterprise | 1206 |
|---|---|
| Identify value creating opportunities across the enterprise | |
| Lead efforts to secure support, approval, and funding for change initiatives | |
| Play an appropriate leadership role in the change initiative | |

| Record Transactions | 402 |
|---|---|

| Establish, maintain, and communicate journal entry policies and procedures |
|---|
| Create and provide journal entry templates |
| Create and submit journal entry for review and approval |
|    Identify required entry and entry type |
|    Prepare journal entry request |
|    Forward for approval |
| Review journal entry request and approve, edit, or deny |
| Verify journal request and approval |
| Post manual journal entry |
|    Identify document type for journal voucher |
|    Prepare journal voucher |
|    Input journal entry / set-up recurring journal entry |
|    Resolve issues |
| Process automated entries |
|    Identify appropriate automated entries / jobs (e.g. fx revaluation) |
|    Configure ERP system to perform calculations / record entries |
|    Review and sign-off on automated entry content and schedule |
|    Update closing calendar with dates / times of automated entries |
|    Run jobs at the proper date / time |
|    Escalate non-posting rejects |
|    Resolve issues |
|    Review output for completeness / accuracy |
| Perform QA Review |
| Notify Requestor on Posting of Journal |
| Perform QA review of general ledger |
| File Journal Voucher and Back-up Documentation Electronically |

| Perform Intercompany Accounting | 404 |
|---|---|

| Establish, maintain, and communicate intercompany accounting policies and procedures |
|---|
| Generate intercompany transactions, balance data, and related documentation |

| Provide interco. transaction documentation – invoices, credit notes, billings, etc. |
|---|
| Receive intercompany transaction documentation – invoices, credit notes, billings, etc. |
| Generate / extract GL and sub-system transactions and balance data |

| Process inbound / outbound invoices, credits, billings, settlements, and statements |
|---|
| Record intercompany dividend, funding, loan, and interest entries |
| Generate intercompany matching reports |
| Perform intercompany reconciliations |
| Confirm intercompany balances with trading partners |
| Identify intercompany issues |
| Resolve disputes and provide supporting documentation |
| Close intercompany issues |
| Finalize intercompany balances, issue status report, and maintain documentation |

| Manage Interfaces | 406 |
|---|---|

| Establish, maintain, and communicate interface inventory, schedule, policies, & procedures |
|---|
| Receive and review interface inventory and schedule |
| Notify outbound interface availability from feeder systems |
| Confirm interface availability per agreed schedule |
| Run and monitor system interfaces |
| Process interface data; post sub-ledger transactions to the GL |
| Validate interface execution and generate control reports |
| Identify and communicate / escalate interface errors and exceptions |
| Authorize correcting entries |
| Resolve interface errors and book corrections as necessary |
| Maintain appropriate documentation |

| Analyze & Reconcile Accounts | 408 |

- Establish, maintain, and communicate reconciliation policies and approach / methodology
  - Define, maintain, and communicate reconciliation policy and procedures
  - Define, maintain, and communicate account analysis / reconciliation schedule
  - Receive and review policies, procedures, and schedule
  - Assign accounts to specific organization entities
  - Assign accounts to specific individuals
- Assemble reconciliation inputs and populate reconciliation tool
  - Provide periodic transactions & balance data
  - Provide G/L & subsystem transactions & balance data
  - Provide supporting documentation
  - Assemble reconciliation inputs and populate reconciliation tool
- Perform reconciliations and analyze accounts
  - Analyze account balances and activity
  - Perform and document reconciliations
  - Prepare file documentation
  - Review file for completeness; ensure adequate backup is included
- Identify and resolve reconciliation issues
  - Identify reconciliation issues / misstated balances
  - Resolve reconciliation issues
  - Adjust account balances as necessary
- Perform supervisory review and approval
- Finalize reconciliations and analytical review
  - Perform QA review of reconciliation sample
  - Prepare, review and approve management summary report
  - Approve and Close reconciliations
- Maintain documentation
- Respond to inquiries and provide support as needed

1500

FIG. 15

| Perform Financial Reporting | 412 |
|---|---|

| Establish, maintain, and communicate financial reporting policies and procedures |
|---|
| Update financial reporting templates |
|     Review prior period's financial reporting process and data |
|     Identify and communicate any changes in financial reporting policies |
|     Roll forward financial reports / templates from prior period |
|     Make required changes in financial report templates |
| Prepare financial reports |
|     Extract financial reporting data from system after close |
|     Populate financial reports / prepare financial statements |
|     Generate and provide supplemental financial reporting information |
|     Prepare supplemental schedules |
|     Perform data validity checks on financial reporting package |
| Distribute, review and finalize financial reports |
|     Distribute financial reporting package |
|     Review and finalize financial reports |
| Provide information to auditors and other parties as appropriate |
| Maintain documentation |

| Perform Regulatory Reporting | 414 |
|---|---|

| Establish, maintain, and communicate regulatory reporting policies and procedures |
|---|
| Update statutory / regulatory reporting templates |
|     Review prior period's statutory / regulatory reporting process and data |
|     Identify and communicate any changes in statutory / regulatory reporting policies |
|     Roll forward statutory / regulatory reports from prior period |
|     Make required changes in statutory / regulatory report templates |
| Prepare regulatory reports |
|     Extract reporting data from system after close |
|     Populate regulatory / statutory report templates with current data |
|     Generate and provide supplemental reporting information |
|     Prepare supplemental schedules |
|     Perform data validity checks on reporting package |
| Distribute, review and finalize regulatory reports |
|     Distribute preliminary reporting package internally |
|     Review reporting package |
|     Incorporate feedback and finalize reporting package |
| Submit reporting package to regulatory authority |
| Respond to inquiries from regulatory authorities as needed |
| Maintain documentation |

| Perform Management Reporting | 416 |
|---|---|

| Maintain Accounting Master Data | 418 |

- Design accounting master data structure
  - Design cost center structure
  - Design profit center structure
  - Design legal entity structure
  - Design chart of accounts / codeblock
  - Design P&L / income statement structure
  - Design balance sheet structure
- Establish, maintain, and communicate accounting master data policies and procedures
  - Define policies, procedures, and controls
  - Establish authority levels for inputs and approvals
  - Define error escalation process
- Update / maintain accounting master data
  - Complete electronic master data change request
  - Approve, reject, or modify
  - Forward electronic master data change request for processing
  - Receive electronic master data change request
  - Validate that request is properly approved and complies with policy
  - Make authorized master data change in ERP system
  - Prepare master data change history detail
  - Generate master data change control report
  - Perform supervisory review
  - Resolve master data exceptions
  - Notify requestor that update is complete
  - Update consolidated master data change log / report
  - Maintain documentation

| Fixed Asset Accounting | 120 |
|---|---|
| Establish and Communicate Fixed Asset Policies and Procedures | 2002 |
| Record Asset Acquisition / Disposition | 2004 |

| Record Asset Acquisition / Capitalization / Enhancement / Adjustment |
|---|
| Submit transaction request using standard template |
| Submit invoices and supporting documentation |
| Receive and validate transaction request |
| Determine / confirm proper asset category, useful life, and depreciation method |
| Execute transaction in fixed assets system |

| Record Construction-in-Process |
|---|
| Authorize and initiate capital projects |
| Complete project set-up template |
| Create and issue unique capital project number |
| Set up project within ERP system |
| Communicate project setup and project number |
| Charge appropriate labor, materials, etc. to project code |
| Submit invoices and other supporting documentation |
| Validate charges and monitor project status |
| Record appropriate accounting entries |
| Close completed projects |
| Perform ongoing monitoring of active projects |
| Research and determine status of inactive projects |

| Process & Record Asset Transfers |
|---|
| Submit transaction request using standard template |
| Submit supporting documentation |
| Receive and validate transaction request |
| Process accounting entries resulting from asset movements |

| Process & Record Asset Maintenance and Repair Expenses |
|---|
| Review coding (capitalize vs. expense) of repair / maintenance expenses |
| Adjust as necessary |

| Record Asset Disposition |
|---|
| Submit transaction request using standard template |
| Submit supporting documentation |
| Receive and validate transaction request |
| Determine proper accounting treatment |
| Execute transaction in fixed assets system |

| Purchase-to-Pay | 122 |
|---|---|

| Manage Vendor Data / Vendor Master | 2702 |
|---|---|

Design PTP master data structure in accordance with enterprise wide data model

Define PTP master data maintenance policies and procedures

Maintain PTP master data - process change requests
- Complete electronic master data change request
- Approve, reject, or modify
- Forward electronic master data change request for processing
- Receive electronic master data change request
- Validate that request is properly approved and complies with policy
- Enter data into ERP system
- Publish and verify master data change control report
- Perform supervisory review
- Notify requestor that update is complete
- Maintain documentation Maintain PTP master data - delete inactive vendors
- Run inactive / no open PO vendors report
- De-activate / hold / release vebdors
- Make appropriate updates in ERP and procurement systems
- Publish data maintenance activity report
- Maintain documentation

| Manage Corporate P-Card Program | 2704 |
|---|---|

- Select P-Card vendor(s)
- Issue P-Cards to employees
- Manage card-holder profiles
- Other

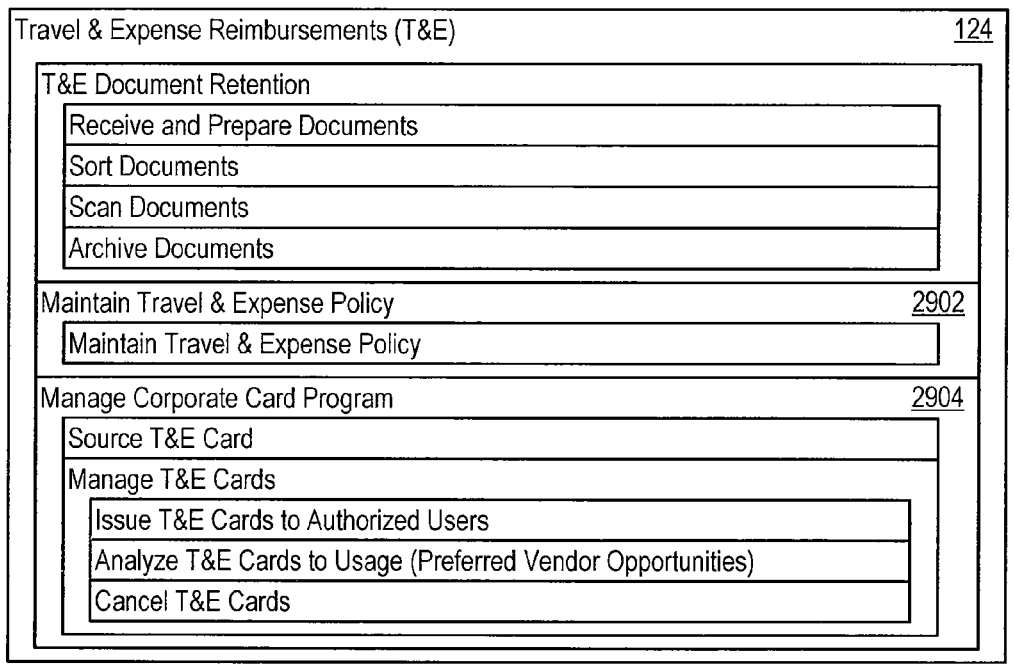
FIG. 29

| Order to Cash | 126 |

| Authorize and Manage Credit | 3002 |

Establish Credit Policies

Assess New Customer Credit Risk
- Request credit check
- Perform credit check and document results
- Assess and document credit risk based on risk profile, credit data, and policy Extend Customer Credit
- Approve or overrule assessment / recommendation
- Establish formal credit limit and other guidelines and document internally
- Communicate credit extension to customer Monitor Existing Customer & Portfolio Credit Risk
- Review orders on hold each day
- Release orders on hold as appropriate
- Perform periodic credit check of existing customers
- Revise customer specific credit recommendations where appropriate
- Monitor and report on customers nearing or reaching credit limits and apply policy
- Document / communicate notifications of customer entering receivership, liquidation, etc.
- Liaise with customers solicitors / collection agencies as required
- Periodically analyze and document overall portfolio credit risk
- Recommend revised credit policy as appropriate

| Manage Sales Orders | 3004 |

Manage Quotes

Receive & Validate Sales Orders
- Originate sales order
- Receive, scan, and index sales order
- Agree pricing / rates with customer
- Validate order against executable order checklist; confirm documentation and approval
- Archive and retain records / documentation Determine Product and/or Service Availability and Logistics Enter Orders Track and Manage Orders, Backorders, and Updates
- Report orders booked but not invoiced
- Create order cancellation request
- Validate and process cancellation requests

FIG. 30          3000

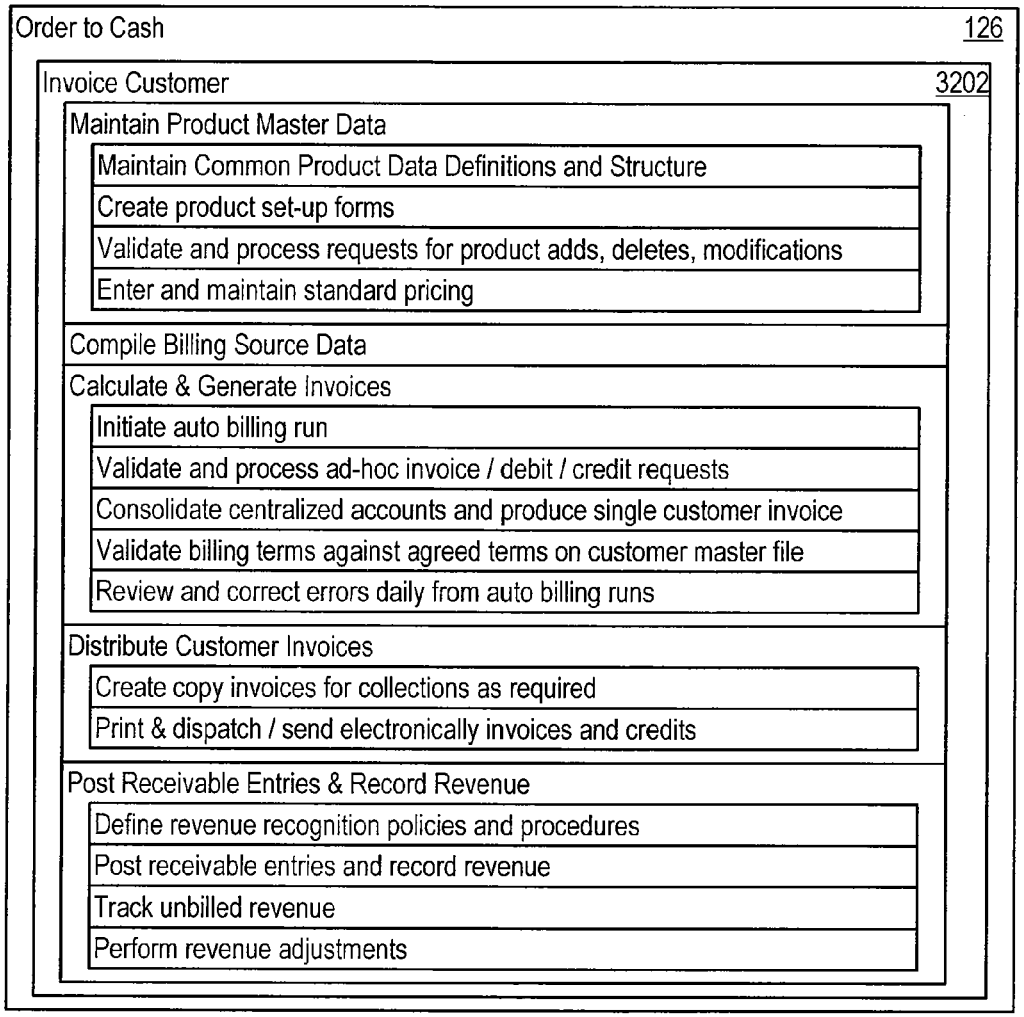
FIG. 32

| Order to Cash | 126 |
|---|---|
| Maintain A/R Ledger and Apply Cash — 3302 | |

- Establish A/R and Revenue Policies
- Receive and Deposit Customer Payments
  - Receive and scan bank check receipts
  - Forward scanned remittance advices to the order to cash team
  - Process credit card receipts and rejections
  - Process direct debits and rejections
  - Write back to customer account any checks not paid when presented; advise customer
  - Reconcile posted cash daily
  - Validate & process refunds
  - Archive and retain records / documentation
- Apply Cash Remittances and Credits / Adjustments
  - Receive, sort (receipt, remittance, etc.), and scan incoming documents
  - Apply incoming check payments / bills of exchange to the A/R and sales ledger
  - Apply to the sales ledger any payments made by customers direct to bank
  - Process remittance advices
  - Upload remittances to match to invoices
  - Produce unapplied / unidentified cash report; investigate / resolve / return overpayments
  - Raise and process debit memos to reflect debits taken on remittances (short pays / deductions)
  - Archive and retain records / documentation
- Maintain Bad Debt Reserves and Allowances
  - Set-up and process contra accounts
  - Analyze bad debts calculate provision
  - Book appropriate G/L entries
- Prepare A/R Reporting
- Post and Reconcile A/R Activity to the GL

| Order to Cash | 126 |
|---|---|
| Manage and Process Disputes / Deductions | 3502 |
| Establish Policies for Disputes and Deductions | |
| Research Dispute / Deduction | |
| Correspond and Negotiate Dispute / Deduction With Customer | |
| Perform Root Cause Analysis | |
| Route and Resolve Dispute / Deductions Internally | |
| Prepare Chargeback Invoices | |
| Process Dispute / Deduction Adjustments and Write-off Balances | |
| Manage Customer Requests and Inquiries | 3504 |
| Receive and Record Customer Requests and Inquiries | |
| Route Customer Requests and Inquiries | |
| Resolve and Respond To Customer Requests and Inquiries | |
| Perform Revenue Assurance Activities | 3506 |
| Reconcile Source Transactions to Bill | |
| Monitor Revenue From Booked Order / Contract Through Cash Collection | |
| Detect and Document Revenue Leakage Points | |
| Implement Corrective / Preventative Measures | |

- Product Costing and Inventory Accounting 128
  - Perform Product Cost Planning
    - Define Product Cost Master Data
    - Define Overhead
    - Estimate Activity Rates
    - Create Cost Estimate (Costing Run)
    - Analyze Costing Results
    - Update Standards
  - Record Production Transactions
    - Record Material Issues
    - Make Direct Postings to Cost Centers / Production Orders
    - Perform Activity Allocations
    - Record Goods Receipt (production confirmation)
  - Perform Period End Closing
    - Allocate Overhead / Process Costs for Settlement by Order
    - Calculate Work-In-Process
    - Calculate Variance for Settlement by Order
    - Distribute Variances
  - Perform Cost Analysis & Reporting
    - Analyze and Report Product Cost
    - Analyze and Report Product Profitability
    - Analyze Variances
  - Count Inventory
    - Define Cycle Count Parameters
    - Perform Cycle / Periodic Inventory Count
    - Post and Print Inventory Differences
  - Set Transfer Prices
    - Define Transfer Pricing Strategy & Objectives
    - Implement Intercompany and Intracompany Pricing
    - Review / Revise Pricing Policy

3600

FIG. 36

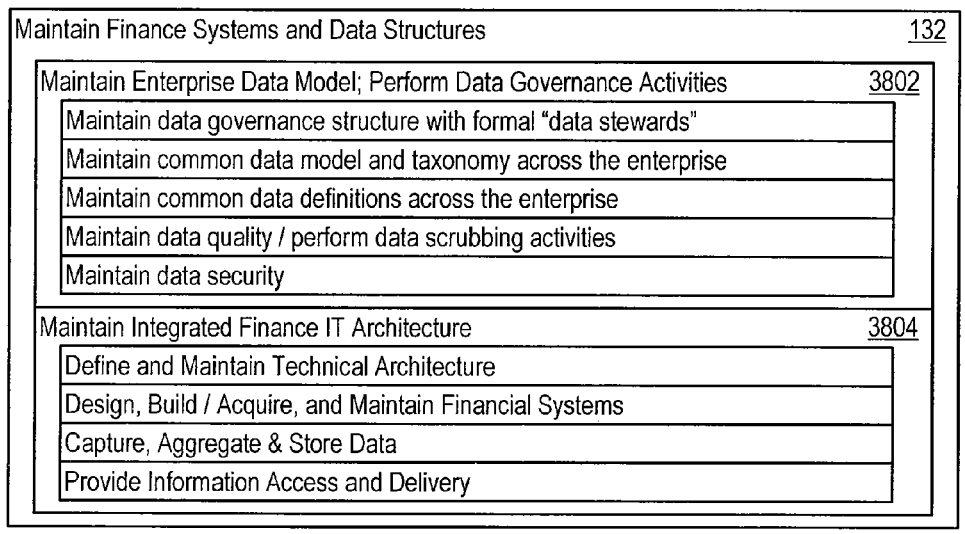
FIG. 38

| Strategic Planning / Shareholder Value Targeting | 134 |
|---|---|

| Refine Corporate Vision and Strategic Objectives | 3902 |
|---|---|
| Perform corporate shareholder value analysis and summarize insights | |
| Review and confirm mission statement and core values | |
| Review and confirm strategic vision | |
| Establish strategic business objectives - short, intermediate, and long term | |
| Create strategy map | |

| Determine Key Business Drivers | 3904 |
|---|---|
| Identify value drivers (current and future, financial and non-financial) | |
| Perform driver materiality and volatility analysis | |
| Establish linkages between non-financial and financial drivers | |
| Prioritize drivers based on relative sensitivity and manageability | |
| Create and validate driver models | |
| Align drivers with strategy and value creation objectives | |

| Determine Key Measures of Success | 3906 |
|---|---|
| Identify metrics | |
| Prioritize metrics (based on business objectives and value drivers) | |
| Define metrics (formula and data source) | |
| Finalize metrics | |
| Update strategy map and scorecards | |

| Create Strategic Plan | 3908 |
|---|---|
| Review performance of current / previous strategic initiatives | |
| Select and prioritize strategic initiatives | |

- Identify initiatives
- Document investment requirements and expected benefits
- Develop decision making framework
- Prioritize initiatives and determine sequencing Create / refine economic model Identify strategic options and model impact
- Assess likely market / competitor response to various options
- Model financial impact
- Update economic model and strategy map Gain alignment of key leadership and stakeholders Finalize strategic planning documents Communicate strategic plans Perform post-implementation review of strategic plans

| Planning, Resource Allocation, & Forecasting | 138 |
|---|---|

| Develop Plans and Budgets | 4102 |
|---|---|
| Develop and maintain plan / budget policies and procedures | |
| Obtain corporate and BU targets | |
| Confirm key drivers and initiatives | |
| Perform driver based budgeting / planning by SBU | |
| Perform driver based budgeting / planning by function | |
| Agree on first year targets for KPIs | |
| Prepare detailed P&L, BS, and cash flow budgets / plans for all entities | |

| Perform Capital Planning / Resource Allocation | 4104 |
|---|---|

Perform Enterprise Wide Capital / Investment Planning
- Establish Capital Expenditure / Investment Policies and Procedures
- Perform Capital / Investment Planning & Budgeting
- Allocate capital and investment $ to BUs based on relative value creation opportunities
- Resolve contention in capital and investment allocations
- Finalize capital / investment plan for approved initiatives Evaluate Specific Capital Expenditure / Investment Requests
- Prepare Expenditure / Investment Request
- Evaluate and Approve / Modify / Deny Request
- Document Project Approval, Budget, Description, and Timeline Evaluate Success of the Investment
- Evaluate Return on Investment
- Conduct "Post-Implementation Review" of Major Investments

| Review, Challenge, and Finalize Plans and Budgets | 4106 |
|---|---|
| Consolidate plans / budgets by function | |
| Consolidate plans / budgets by BU | |
| Understand gaps to target and related risks | |
| Close gaps and approve budgets / plans | |

| Perform Periodic Forecasting | 4108 |
|---|---|
| Review performance against target, budget, and/or previous forecast | |
| Identify variances and root causes | |
| Determine whether deviations are likely to persist | |
| Assess near and mid term business outlook | |
| Perform driver based rolling forecast | |
| Review and finalize forecast | |

| Performance Reporting and Analytics | 140 |
|---|---|
| Measure, Report, and Analyze Business Performance | 4202 |
| Produce management P&Ls for business units, geographies, etc. | |
| Measure and analyze performance against budget, target, and/or forecast | |
| Measure and analyze performance of business drivers / KPIs | |
| Identify variances and root causes | |
| Perform value added / ad-hoc analysis | |
| Publish / deliver dashboards, scorecards, and reports | |
| Review Performance with Management | |
| Conduct formal, recurring business reviews | |
| Provide ad hoc decision support | |
| Develop Action Plans, Re-Allocate Resources, & Update Forecast | |
| Identify any required corrective actions | |
| Agree on responsibility for corrective action; reallocate resources | |
| Update forecast | |
| Maintain Common Performance Language and Definitions | 4204 |
| Identify and maintain library of metrics and measures | |
| Maintain formal definition of each metric and measure | |
| Define data source(s) for each metric and measure | |
| Assign an owner for each metric | |
| Define the measurement frequency and tolerance for each metric | |
| Identify common, recurring analyses (e.g. make vs. buy) | |
| Maintain library of analysis templates with definitions and usage guidelines | |
| Provide On-going Reporting & Analytical Support | 4206 |
| Identify core and specialized requirements | |
| Align resources to support reporting & analytic requirements | |
| Track consistency, quality, and efficiency of reporting & analytics | |
| Implement periodic reviews and on-going rationalization process | |
| Review Impact of Management Incentive Structure on Financial Performance | 4208 |
| Conduct periodic review of incentives & rewards program | |
| Validate incentive program continues to support financial performance objectives | |
| Monitor and track behaviors incentives program drives | |
| Measure, Record, and Value Intangible Assets | 4210 |
| Identify Intangible Assets | |
| Assign Value to Intangible Assets | |
| Measure Return Generated by Intangible Assets | |
| Measure and drive Increase in Value of Intangible Assets | |

| Internal Controls | 142 |
|---|---|
| Establish and Maintain Control Policies and Procedures | |
|    Establish and Maintain Accounting Policies | |
|    Establish and Maintain Control Procedures | |
| Operate Controls and Monitor Compliance | |
|    Design and Implement Control Activities | |
|    Monitor Control Effectiveness | |
|    Remediate Control Deficiencies | |
| Perform Internal Audit Activities | |
| Conduct External Audits | |
| Report on Internal Controls and Compliance | |

| Investor Relations | 144 |
|---|---|
| Communicate with Investor Community | |
|    Provide CEO with developments & updates in the market | |
|    Write & develop material for investor presentations and prepare responses to likely investor questions | |
|    Write & produce quarterly and annual reports as well as press releases | |
|    Plan and manage analyst meetings, conferences, and web casts | |
|    Manage investor relations content for corporate website | |
|    Organize and post results | |

| Treasury & Cash Management | 146 |
|---|---|

| Perform Treasury Governance Activities | 4402 |
|---|---|
| Set, Monitor, and Enforce Treasury Policy and Procedure | |
| Create and Maintain Treasury Organization Structure | |

| Perform Banking & Cash Management Activities | 4404 |
|---|---|
| Manage Banking Relationships | |
|   Identify banking partners | |
|   Manage banking partner relationships | |
|   Negotiate bank scope and service and fees | |

| Perform Bank Reconciliations |
|---|
| Download bank statements from banking systems |
| Generate systems interface file to upload daily transactions to ERP system |
| Upload to ERP systems |
| Review upload control reports and amend incorrect postings |
| Perform daily reconciliation between bank statements and ERP |
| Perform and approve monthly bank account reconciliations |
| Prepare aged analysis of reconciling differences and action plan to resolve |
| Provide periodic aged analysis and action plan to treasury management |

| Manage Cash Position |
|---|
| Manage and reconcile cash positions |
| Manage cash equivalents |
| Process and manage electronic funds transfers (EFT) |
| Manage cash pooling and sweeps |

| Perform Cash Flow and Cash Position Forecasting | 4406 |
|---|---|

| Manage In-House Bank Accounts |
|---|
| Manage in-house bank accounts for subsidiaries |
| Manage and facilitate inter-company borrowing transactions |
| Manage centralized outgoing payments for subsidiaries |
| Manage centralized incoming payments for subsidiaries |
| Manage internal payments and netting transactions |
| Calculate interest and fees for in-house bank accounts |
| Provide account statements for in-house bank accounts |

| Manage Investments |
|---|
| Manage Short Term Investments / Invest Excess Cash |
| Manage Long Term Investments |

FIG. 44

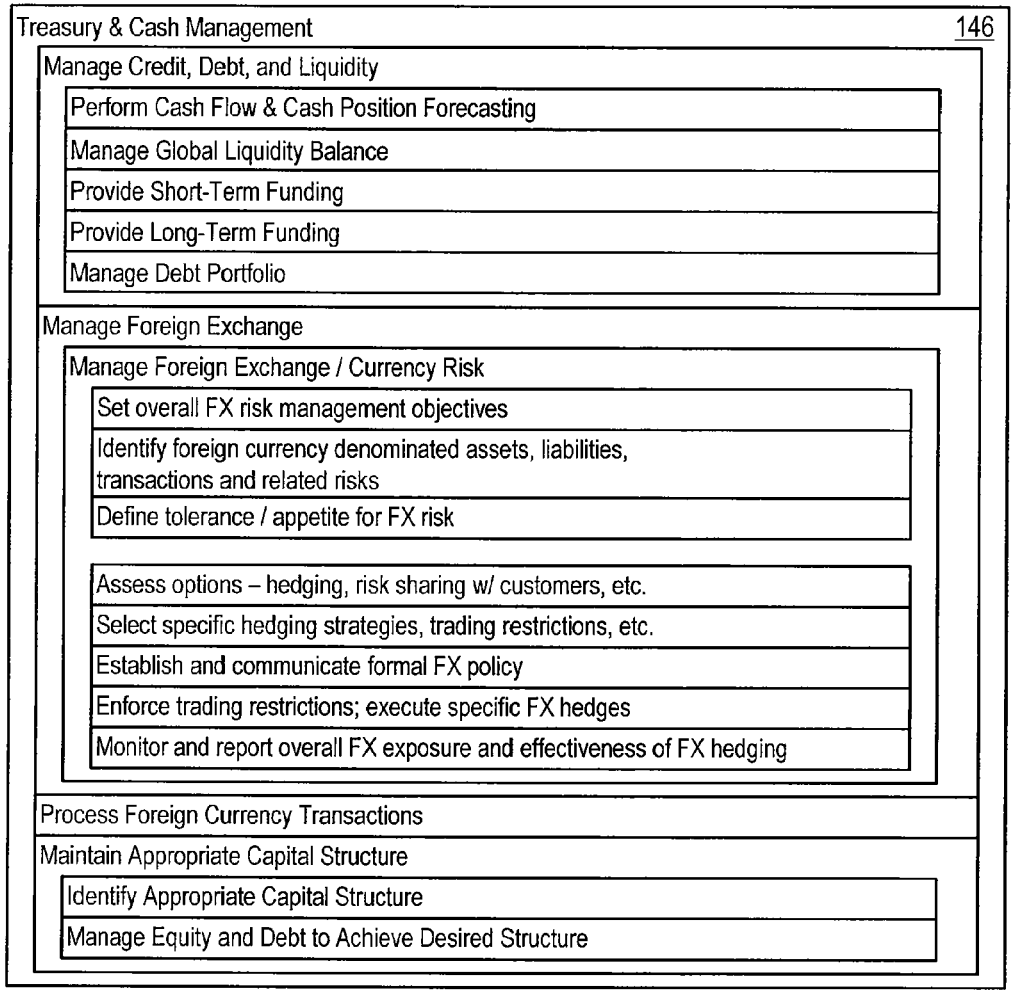
FIG. 45

| Corporate Tax | 148 |
|---|---|

- Perform Tax Planning
  - Develop Tax Planning Strategy
  - Implement Tax Planning Strategy
  - Manage/Review/Revise Planning Strategy
- Perform Tax Accounting & Reporting Activities
  - Direct Tax / Income Tax
    - Maintain Tax Master Data
    - Review Tax Sensitive Transactions
    - Reconcile Tax Accounts
    - Prepare and Calculate Current & Deferred Tax
    - Prepare and Calculate Tax Payments
    - Prepare and Calculate Tax Returns
    - Complete and Calculate Tax Reconciliations
  - Transaction / Indirect Taxes
    - Establish the Tax Operating Model
    - Maintain Tax Master Data, Tax Rates & Taxability Rules
    - Maintain Exemption Certificates
    - Review Tax Sensitive Transactions
    - Reconcile Tax Liability Accounts
    - Complete Tax Returns
  - Perform Tax Analysis for Statutory Reporting
    - Prepare Tax Footnotes and Other Details for Statutory Reporting
    - Submit Prepared Results to Financial Reporting Team
- Perform Tax Audit
  - Open Audit
  - Respond to Inquiries
  - Negotiate Adjustments
  - Close Audit
- Perform Tax Governance
  - Define/Maintain Tax Policies & Procedures
  - Perform Tax Operations Oversight
  - Perform Tax Performance Management

| Process Excellence Structure and Metrics | Metric Number | Metric Type | | | UOM | Client Value | Client Quartile Rank | Benchmark | | |
|---|---|---|---|---|---|---|---|---|---|---|
| | | Output Measures | | Driver of Cost and / or Quality | | | | 1st Q | Median | 3rd Q |
| | | FTE / Cost / Productivity | Quality / Effectiveness / Cycle Time | | | | | | | |
| Total Finance Cost as % of Revenue (E/R) | 0.0 - 1 | FTE / Cost | | | % | X% | 1st Quartile | X% | X% | X% |
| Total Finance FTEs per $B of Revenue | 0.0 - 2 | FTE / Cost | | | # | XX | 1st Quartile | XX | XX | XX |
| Total Finance Cost per Finance FTE | 0.0 - 3 | FTE / Cost | | | $ | $XX | 1st Quartile | $XX | $XX | $XX |
| Finance Salary & Benefits Cost per Finance FTE | 0.0 - 4 | FTE / Cost | | | $ | $XX | 1st Quartile | $XX | $XX | $XX |
| Total Finance Cost: % Labor | 0.0 - 5 | FTE / Cost | | | % | XX% | * | * | XX% | * |
| Total Finance Cost: % Professional Services | 0.0 - 6 | FTE / Cost | | | % | XX% | * | * | XX% | * |
| Total Finance Cost: % Technology | 0.0 - 7 | FTE / Cost | | | % | XX% | * | * | XX% | * |
| Total Finance Cost: % Other | 0.0 - 8 | FTE / Cost | | | % | XX% | * | * | XX% | * |
| 1.0 Process Cost as % of Revenue (E/R) | 1.0 - 1 | FTE / Cost | | | % | X% | 1st Quartile | X% | X% | X% |
| 1.0 Process FTEs per $B of Revenue | 1.0 - 2 | FTE / Cost | | | # | XX | 1st Quartile | XX | XX | XX |
| 1.0 Process Cost per FTE | 1.0 - 3 | FTE / Cost | | | $ | $XX | 1st Quartile | $XX | $XX | $XX |
| 1.0 Salary & Benefits Cost per FTE | 1.0 - 4 | FTE / Cost | | | $ | $XX | 1st Quartile | $XX | $XX | $XX |
| Unmanaged / Unplanned Attrition of Finance Staff | 1.0 - 5 | | Quality | | % | | * | * | * | * |
| 2.1 Process Cost as % of Revenue (E/R) | 2.1 - 1 | FTE / Cost | | | % | X% | 1st Quartile | X% | X% | X% |
| 2.1 Process FTEs per $B of Revenue | 2.1 - 2 | FTE / Cost | | | # | XX | 1st Quartile | XX | XX | XX |
| 2.1 Process Cost per FTE | 2.1 - 3 | FTE / Cost | | | $ | $XX | 1st Quartile | $XX | $XX | $XX |
| 2.1 Salary & Benefits Cost per FTE | 2.1 - 4 | FTE / Cost | | | $ | $XX | 1st Quartile | $XX | $XX | $XX |
| Days to Close | 2.1 - 5 | | | Cycle Time | # Days | | * | X | X | X |
| Days to Internal Management Reports | 2.1 - 6 | | | Cycle Time | # Days | | * | X | X | X |

FINANCE FUNCTION HIGH PERFORMANCE CAPABILITY ASSESSMENT

PRIORITY CLAIM

This application claims the benefit of priority to U.S. provisional patent application assigned Ser. No. 61/092,225 filed in the United States Patent and Trademark Office on Aug. 27, 2008.

BACKGROUND OF THE INVENTION

1. Technical Field

This disclosure concerns a system and method to identify the performance capability of the finance functions of an organization on a scale of representative capabilities. In particular, this disclosure relates to an efficient and cost effective way to assess the performance capability level of key assessment areas of the finance functions within the processes of an organization.

2. Background Information

Businesses in every industry must adapt to an increasingly competitive environment and execute in a clear, consistent, and efficient manner. Furthermore, the global nature of most industries greatly increases the complexity and difficulty of surviving on a day to day basis, let alone growing and prospering.

Despite the need for a business to meet the challenges of the global marketplace, often the business lacks clarity, consistency, and well-defined execution of an improvement program directed to finance transformation. Many chief financial officers (CFOs) fail to measure finance cost and performance in a rigorous way, such as the resources expended on finance, the costs by process and in comparison with other businesses in similar industries. Often, CFOs lack the information necessary to prioritize improvement initiatives, develop a compelling business case for such initiatives and measure performance improvement consistently. These shortcomings severely constrain the business, and lead directly to inefficiencies and waste due to unnecessary complexity, process exceptions, and customer dissatisfaction. At the same time, identifying specific processes to which improvements may be made can be very difficult, either because the business itself does not have the expertise to identify the processes or because the complexities of the business frustrate attempts to clearly delineate the processes to be improved.

Even if the business can identify one of the many processes that need to improve, the business may not know how to improve the process or be able to identify a concrete and measurable improvement goal. Another difficulty exists in determining whether intermediate goals exist that should be reached along the way. As a result, businesses struggle to meet the demands of the modern global marketplace and fail to identify cost reduction opportunities for margin improvement to reach other important goals.

Therefore, a need exists for an efficient and effective system and method to assess the performance capability level of key assessment areas within the processes of an organization.

SUMMARY

A finance function high performance capability assessment (FF-HPCA) model helps businesses meet the challenges of the global marketplace by defining a scale of performance capability along which the current practices of the business may be located. The FF-HPCA model accelerates the discovery of process and capability gaps within business operations. In addition, the FF-HPCA model also helps the business to identify specific areas in which improvements may be made, how to make the improvements, and how to establish levels of capability during the course of attempting to achieve an ultimate capability goal. As a result, the business can achieve the clarity, consistency, and well-defined execution of core processes that reduce inefficiencies and waste.

The FF-HPCA model includes a key factor dimension and a performance capability scale dimension. The performance capability scale dimension defines multiple capability levels. The performance capability levels may form a scale of increasing organizational performance capability. One example of such a scale includes a 'Basic' capability level, a 'Competitive' capability level, and a 'Market Leading' capability level. Each performance capability level includes criteria specific to a corresponding finance function key assessment area. Each finance function key assessment area identifies some aspect of a finance function capability of a business.

Finance function process capabilities of a business may be grouped into platforms. For example, the FF-HPCA model may group the finance function capabilities of an organization into a high-level platform (e.g., finance process excellence platform). Platforms may include sub-platforms, as well as capabilities, and capabilities may include other capabilities (e.g., sub-capabilities). For example, the finance process excellence platform may include a 'finance function management' platform, finance and accounting operations platform, enterprise performance management, corporate finance platform and enterprise risk management platform. Examples of capabilities within the finance function management platform may include a manage finance organization capability and a drive enterprise wide change capability.

The key factor dimension establishes a set of key assessment areas in which to analyze the capabilities of a business. Key assessment areas include performance capability criteria. Performance capability criteria populate the performance capability assessment model. The performance capability criteria may be specific to any one of many different business capabilities. For example, the vision and strategy platform includes performance capability criteria for external analysis and internal business planning key assessment areas at each of the capability levels along the performance capability scale dimension and in each of the key assessment areas along the key factor dimension. Any number of performance capability assessment models and performance capability criteria may be defined and stored in a capability detail pool for subsequent retrieval and application to a business under examination. Accordingly, the FF-HPCA model provides a flexible and adaptive scale of performance capability against which finance function business practices may be compared to ascertain where the finance function capabilities of a business under examination fall along the scale.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The performance capability assessment model and system may be better understood with reference to the following drawings and description. The elements in the figures are not necessarily to scale, emphasis instead being placed upon illustrating the principles of the capability assessment techniques. In the figures, like-referenced numerals designate corresponding parts throughout the different views.

FIG. 1 shows an example of high-level platforms that organize capabilities in a finance function high performance capability assessment (FF-HPCA) model.

FIG. 10 illustrates capabilities within the 'manage finance organization' capability corresponding to the 'finance function management' platform.

FIG. 11 illustrates additional capabilities within the 'manage finance organization' capability corresponding to the 'finance function management' platform.

FIG. 12 illustrates capabilities within the 'drive enterprise wide change' capability corresponding to the 'finance function management' platform.

FIG. 13 illustrates capabilities within the 'record transactions' capability corresponding to the general accounting and reporting (record to report) capability.

FIG. 14 illustrates capabilities within the 'perform intercompany accounting' capability and the 'manage interfaces' capability corresponding to the general accounting and reporting (record to report) capability.

FIG. 15 illustrates capabilities within the 'analyze and reconcile accounts' capability corresponding to the general accounting and reporting (record to report) capability.

FIG. 17 illustrates capabilities within the 'perform financial reporting' capability corresponding to the general accounting and reporting (record to report) capability.

FIG. 18 illustrates capabilities within the 'perform regulatory reporting' capability and 'perform management reporting' capability corresponding to the general accounting and reporting (record to report) capability.

FIG. 19 illustrates capabilities within the 'maintain accounting master data' capability corresponding to the general accounting and reporting (record to report) capability.

FIG. 20 illustrates capabilities within the 'fixed asset accounting' capability corresponding to the 'finance and accounting operations' platform.

FIG. 27 illustrates additional capabilities within the 'purchase to pay' capability corresponding to the 'finance and accounting operations' platform.

FIG. 29 illustrates additional capabilities within the 'travel and expense reimbursement' capability corresponding to the 'finance and accounting operations' platform.

FIG. 30 illustrates capabilities within the 'order to cash' capability corresponding to the 'finance and accounting operations' platform.

FIG. 32 illustrates additional capabilities within the 'order to cash' capability corresponding to the 'finance and accounting operations' platform.

FIG. 33 illustrates additional capabilities within the 'order to cash' capability corresponding to the 'finance and accounting operations' platform.

FIG. 35 illustrates additional capabilities within the 'order to cash' capability corresponding to the 'finance and accounting operations' platform.

FIG. 36 illustrates capabilities within the 'product costing and inventory accounting' capability corresponding to the 'finance and accounting operations' platform.

FIG. 38 illustrates capabilities within the 'finance systems and data structures' capability corresponding to the 'finance and accounting operations' platform.

FIG. 39 illustrates capabilities within the 'strategic planning and shareholder value targeting' capability corresponding to the 'enterprise performance management' platform.

FIG. 41 illustrates capabilities within the 'planning, resource allocation and forecasting' capability corresponding to the 'enterprise performance management' platform.

FIG. 42 illustrates capabilities within the 'performance reporting and analytics' capability corresponding to the 'enterprise performance management' platform.

FIG. 43 illustrates capabilities within the 'internal controls' capability corresponding to the 'corporate finance' platform.

FIG. 44 illustrates capabilities within the 'treasury and cash management' capability corresponding to the 'corporate finance' platform.

FIG. 45 illustrates additional capabilities within the 'treasury and cash management' capability corresponding to the 'corporate finance' platform.

FIG. 46 illustrates capabilities within the 'corporate tax' capability corresponding to the 'corporate finance' platform.

FIG. 49 illustrates a FF-HPCA benchmarking output report.

DETAILED DESCRIPTION OF THE PREFERRED EMBODIMENTS

The FF-HPCA model establishes a multidimensional performance reference set that includes multiple key assessment performance reference tables. The key assessment performance reference tables include a 'Basic' performance capability level, a 'Competitive' performance capability level and a 'Market Leading' performance capability level. The 'Basic' performance capability level specifies 'Basic' finance function performance assessment criteria, the 'Competitive' performance capability level specifies 'Competitive' finance function performance assessment criteria, and the 'Market Leading' performance capability level specifies 'Market Leading' finance function performance assessment criteria. The FF-HPCA model receives input data that specifies a finance function business platform (e.g., a business area and/or business process) and a finance function key assessment area (e.g., capability and/or business process) for analysis. The FF-HPCA model searches the multidimensional business performance reference set for a matching key assessment performance reference table that matches the business platform and capability within the platform and the key assessment area, and retrieves the matching key assessment performance reference table. The FF-HPCA model initiates analysis of the matching key assessment performance reference table to obtain a resultant performance capability level for the key assessment area.

The FF-HPCA model provides quantitative assessment of finance function costs and performance of an organization, including comparisons to peers, supplemented with qualitative analysis to provide context and to maximize analytical value. The FF-HPCA model identifies and quantifies improvement opportunities through internal and external performance comparisons (e.g., benchmarking metrics within and/or across multiple industries), highlights specific processes, regions, and/or business units that provide the greatest opportunities for cost reductions and/or performance improvement, and establishes a rigorous baseline to measure the impact of future improvements. The FF-HPCA model provides a knowledge base from which to define improvement recommendations, build a confident business case and focus on rigorous metrics and continuous improvement. The FF-HPCA model calculates quartile rankings for each key assessment area of an organization compared to industry benchmarks. The FF-HPCA model calculates the performance level of each finance function key assessment area, including the cost of each key assessment area as a percent of revenue, and the cost of each key assessment area according to full-time equivalents (FTEs) per dollars of revenue (e.g., FTEs/revenue).

Figure 50:
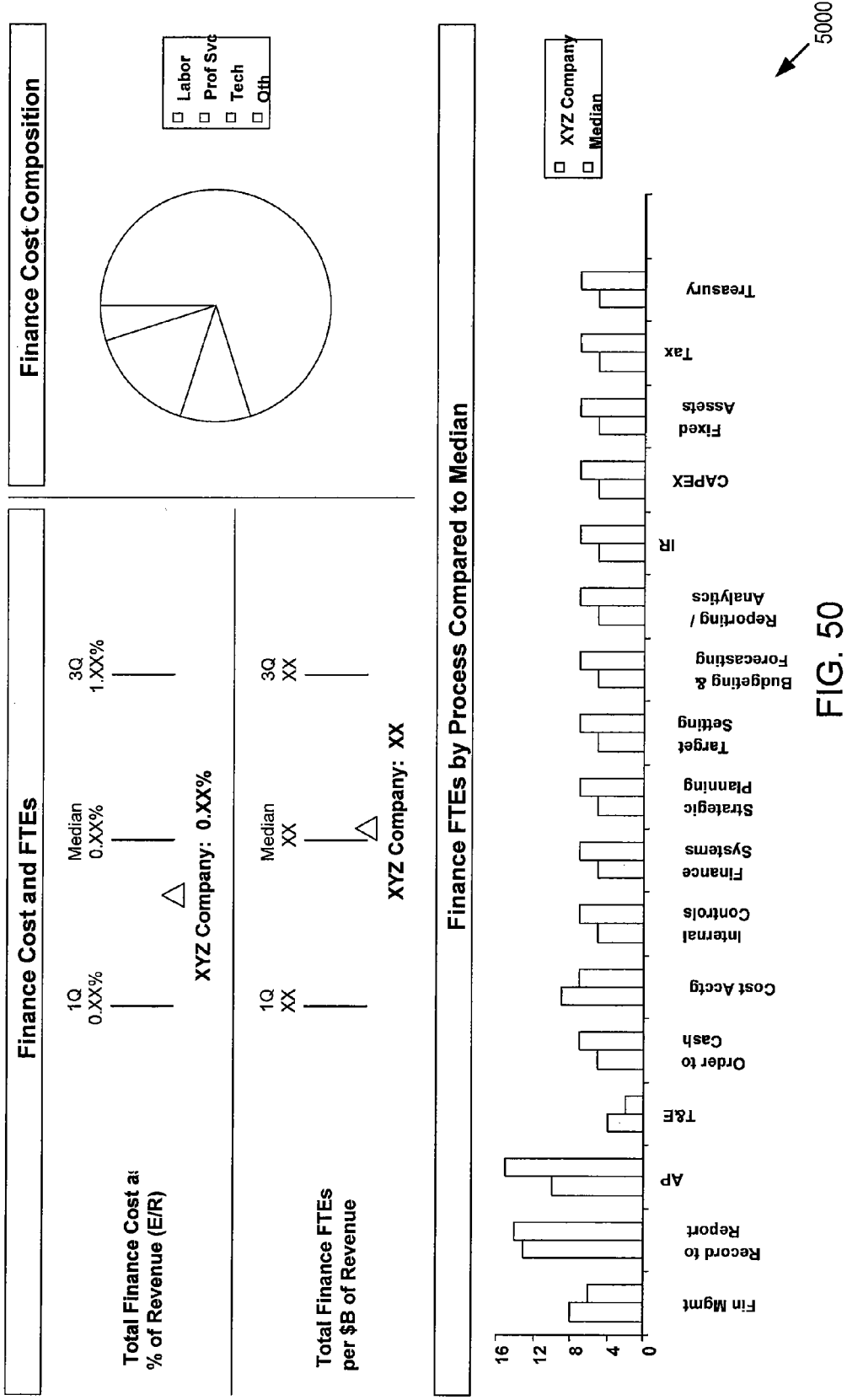
FIG. 50 illustrates a FF-HPCA benchmarking cost and FTE summary report.
Figure 51:
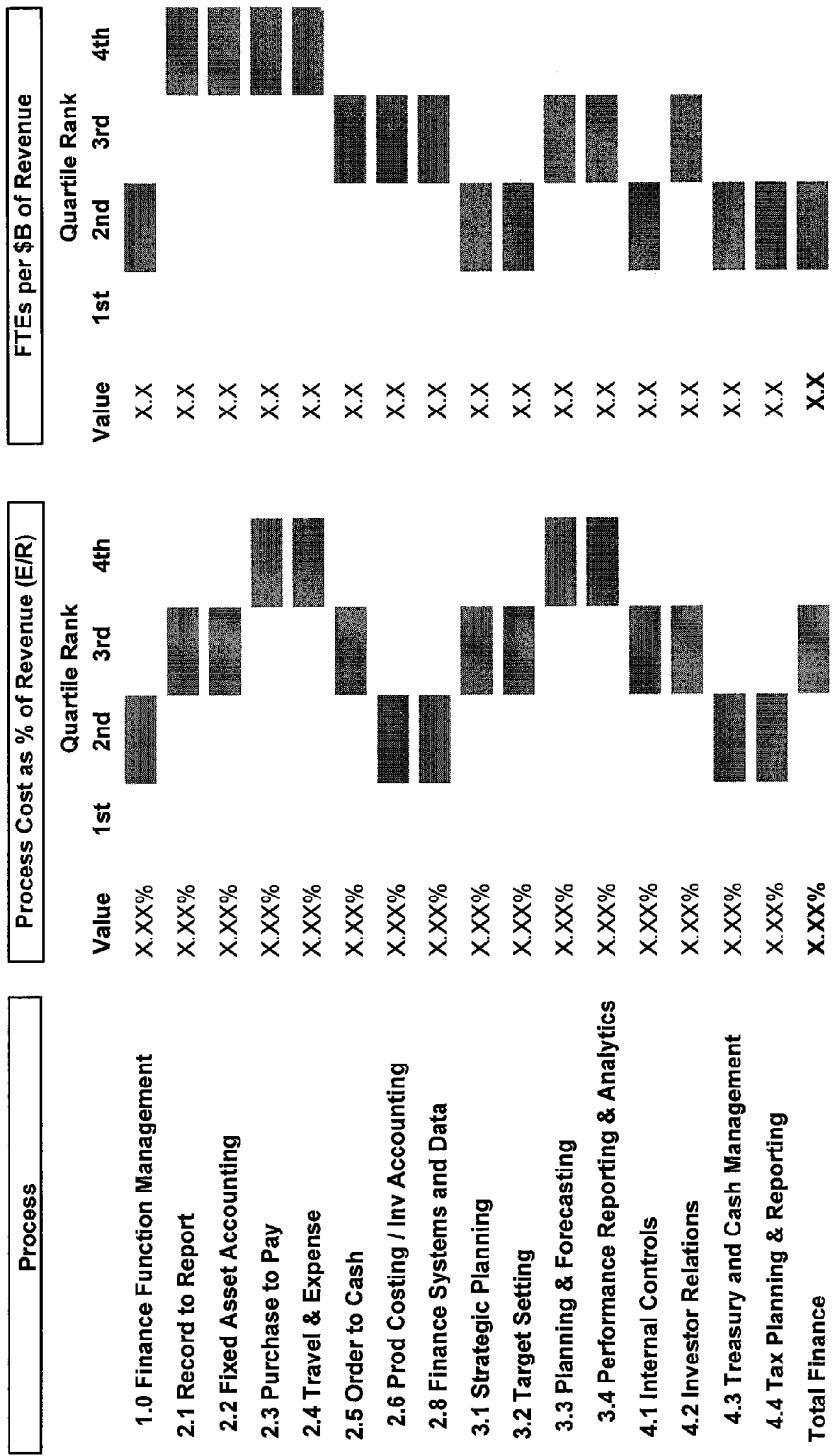
FIG. 51 illustrates a FF-HPCA quartile ranking by process-cost and FTEs report.

Referring briefly to FIGS. 49-51, the FF-HPCA model comprises a finance function process excellence framework, finance function diagnostic tool and benchmarking. The FF-HPCA model analyzes information regarding finance function key assessment areas of an organization, calculates performance results, and produces FF-HPCA model reports, including: FF-HPCA benchmarking output report 4900; FF-HPCA benchmarking cost and FTE summary report 5000; and FF-HPCA quartile ranking by process-cost and FTEs report 5100. The FF-HPCA model reports and the information contained within the reports may be graphically displayed, presented and/or communicated in any number of ways.

FIG. 1 shows a finance function high performance capability assessment (FF-HPCA) model 100. The FF-HPCA model 100 (e.g., finance process excellence framework) may be implemented as a multi-level hierarchy encompassing all processes for which a CFO may be accountable. The FF-HPCA model 100 specifies a finance process excellence platform (e.g., hierarchy) 102 including a finance function management platform 104, finance and accounting operations platform 106, enterprise performance management 108, corporate finance 110 and enterprise risk management platform 112. Additional, different, or fewer platforms may be used in other implementations, each platform defining additional, different, or fewer capabilities. Each platform includes one or more capabilities. Capabilities within the FF-HPCA model 100 may include sub-capabilities, which may be organized into further sub-capabilities to form a hierarchy as deep as desired to meet any particular implementation target. The platforms and capabilities of the FF-HPCA model 100 form a multi-level hierarchy, as illustrated in FIGS. 10-48.

A capability may include corresponding key assessment areas. Each key assessment area may include or define additional key assessment areas. In other words, a business capability may include sub-capabilities, and therefore, key assessment areas corresponding to the multiple sub-capabilities. Additional, different, or fewer finance function performance assessment criteria may be used in other implementations, each finance function performance assessment criteria corresponding to additional, different, or fewer platforms and/or capabilities.

In one implementation, the finance function management platform 104 includes: a manage finance organization capability 114 and a drive enterprise wide change capability 116. The accounting operations platform 106 includes: a general account and reporting (record to report) capability 118, fixed asset accounting capability 120, purchase to pay capability 122, a travel and expense reimbursements (T&E) capability 124, order to cash capability 126, 'product costing and inventory accounting' capability 128, a payroll capability 130 and a 'maintain finance systems and data structures' capability 132. The enterprise performance management platform 108 includes: a strategic planning/shareholder value targeting capability 134, a target setting capability 136, a 'planning, resource allocation and forecasting' capability 138, and a performance reporting and analytics capability 140. The corporate finance platform 110 includes internal controls capability 142, an inventor relations capability 144, treasury and cash management capability 146, and corporate tax capability 148. The enterprise risk management platform 112 includes: a financial risk management capability 150, and a non-financial risk management capability 152.

Figure 2:
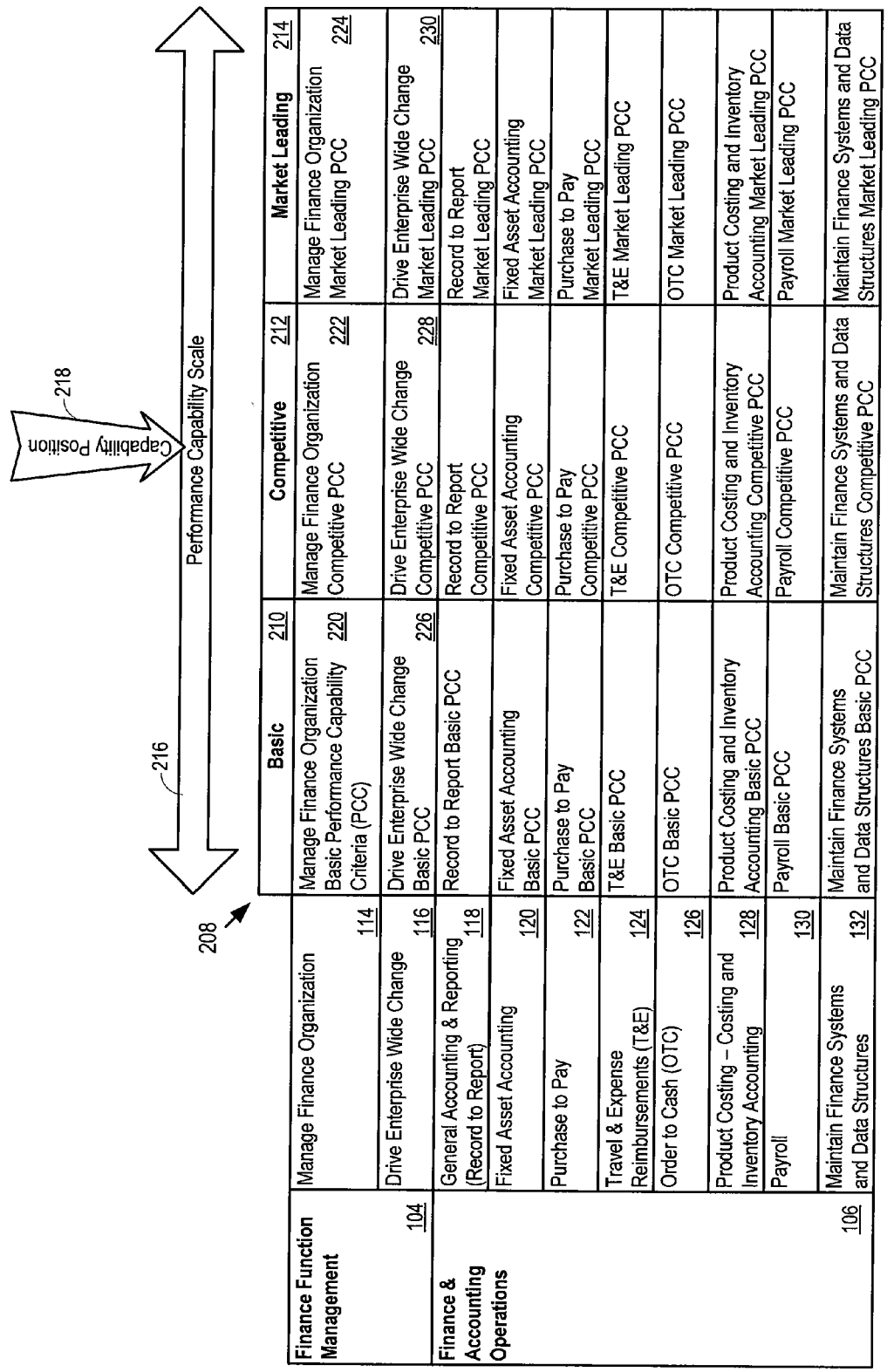
FIG. 2 shows a FF-HPCA model with a performance capability scale and performance capability criteria.

FIG. 2 shows a portion of the FF-HPCA model 100 and multiple capability levels 208. The capability levels 208 establish a scale of increasing organizational performance capability. In FIG. 2, the capability levels 208 include a 'Basic' capability level 210, a 'Competitive' capability level 212, and a 'Market Leading' capability level 214. The FF-HPCA model 100 establishes a performance capability scale 216 along which current business practices may be located and identified with respect to any platform and capability within a platform according to an analysis of performance capability criteria (PCC) (e.g., 220-230).

Figure 3:
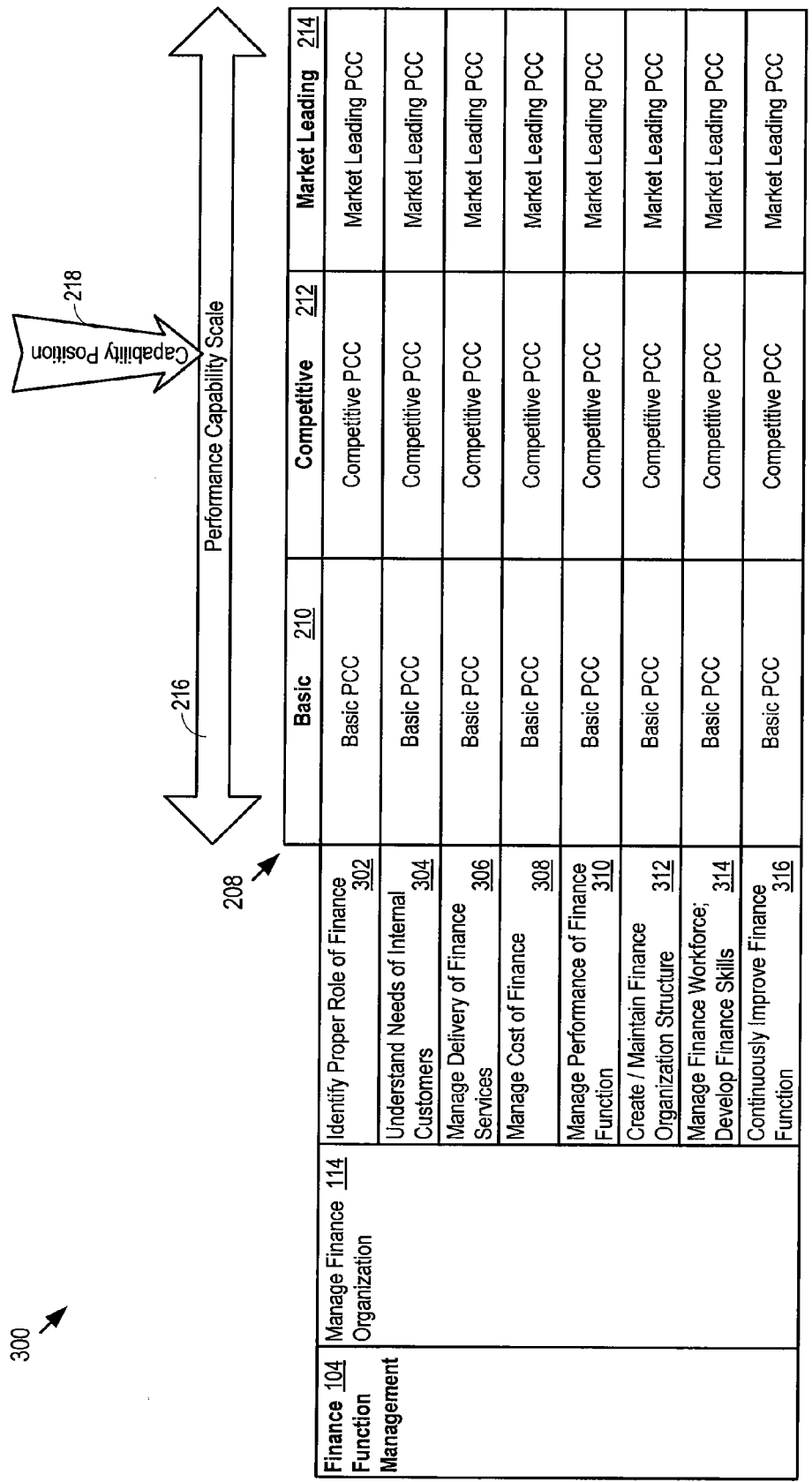
FIG. 3 shows a FF-HPCA model with sub-capabilities within the manage finance organization capability.

FIG. 3 illustrates that each capability within a platform (e.g., the finance function management platform 104) may include additional capabilities (e.g., 302-316). In other words, a business capability may include multiple sub-capabilities. For example, FIG. 3 shows the finance function management platform 104 with the manage finance organization capability 114 with additional capabilities. FIG. 3 shows the manage finance organization capability 114 that further includes an: identify proper role of finance capability 302, understand needs of internal customers capability 304, manage delivery of finance services capability 306, manage cost of finance capability 308, manage performance of finance function capability 310, create/maintain finance organization structure capability 312, manage finance workforce develop finance skills capability 314, and continuously improve finance function capability 316.

Table 1 provides an explanation of the manage finance organization capability 114 and key assessment areas (e.g., capabilities 302-316) within the manage finance organization capability 114. The key assessment areas (e.g., capabilities 302-316) include performance capability criteria (PCC) (e.g., 220-230). A capability under evaluation may be assigned a capability level 208 based on a capability position 218 along the performance capability scale 216 (e.g., the 'competitive' capability level 212).

Performance capability criteria (e.g., 220-230) populate the FF-HPCA model 100. The performance capability criteria capture criteria, characteristics, and/or other features of a capability at a particular capability level for a key assessment area. Examples below illustrate performance capability criteria that provide unexpectedly good analysis and benchmarking for the finance functions of an organization. The FF-HPCA model 100 performance capability criteria provide a tool for determining where a platform and capability under examination falls along the performance capability scale 216. For example, process engineers may interview a business or receive data about the business to determine, measure, or otherwise ascertain the characteristics, criteria, and other features of a particular capability implemented within the business. The process engineers may compare the characteristics of the business to the performance capability criteria in the FF-HPCA model 100 and arrive at a capability level 208 for the capability under examination. In doing so, for example, the process engineers may identify where the capability under examination falls in terms of capability level for each key assessment area of a capability and determine an overall position on the performance capability scale 216 for the capability under examination. Performance capability criteria may populate the FF-HPCA model 100 in whole or in part. Multiple high performance capability assessment models may be collected and stored with the performance capability criteria for future retrieval and possible modification in a capability detail pool, discussed below.

TABLE 1

| Manage Finance Organization 114 | |
| --- | --- |
| Description: | Manage Finance Organization includes all aspects managing and governing the entire finance organization - including role definition, managing the cost, service, and performance of the finance function, and managing the finance workforce. These activities are typically performed by the most senior finance executives including the CFO, CFO direct reports, and selected individuals designated by those executives. |
| Identify Proper Role of Finance 302/ Understand Needs of Internal Customers 304 | |
| Basic Criteria: 210 | Focus primarily on GAAP accounting, financial performance, and traditional governance; finance does not actively or effectively partner with the rest of the organization; finance has not explicitly surveyed the needs of internal customers; limited link between customer needs and finance services provided 220 |
| Competitive Criteria: 212 | Actively partners with other departments but potential for better integration remains; provides some business support and problem resolution advice but competes with other groups for this role; spends less time than desired on high value activities; finance has informally identified needs of internal customers 222 |
| Market Leading Criteria: 214 | Excels at both traditional governance and analytics/decision support; large % of time spent on high value activities; intimate business partner with business unit (BU) management; has infused entire enterprise with a value creation mindset and financial acumen; is considered the "go-to" organization for decision support; has explicitly identified needs of internal customers; consciously makes cost vs. service level decisions 224 |
| Manage Cost of Finance 308 | |
| Basic Criteria: 210 | May or may not know the true cost of finance; limited understanding of cost drivers of cost; no formal cost reduction program 220 |
| Competitive Criteria: 212 | Has accurately measured total cost of finance; understands drivers of cost; has begun strategic cost reduction program and realized some benefits 222 |
| Market Leading Criteria: 214 | Accurately measured total cost of finance; understands cost drivers; achieved desired cost position 224 |
| Organization Structure 312 | |
| Basic Criteria: 210 | Organization structure has "evolved" over time without conscious design; shared services used for selected transactional processes; limited use of low cost locations 220 |
| Competitive Criteria: 212 | Organization structure has been consciously designed, but is not yet optimized; heavy use of shared services center (SSCs)/low cost locations/outsourcing; ongoing efforts to refine controllership and financial planning and analysis (FP&A) structures 222 |
| Market Leading Criteria: 214 | Organization structure has been consciously designed and optimized; all transactional activities in SSCs/low cost locations/outsourced; centers of excellence (COEs) used where appropriate; analysts properly aligned with business units 224 |
| Manage Finance Workforce 314/Develop Finance Skills 314 | |
| Basic Criteria: 210 | Basic finance & accounting skills; limited business acumen, deep specialization, or analysis capabilities 220 |
| Competitive Criteria: 212 | Strong finance & accounting skills; moderate business acumen/analysis skills; deep specialists in selected areas; basic value creation mindset 222 |
| Market Leading Criteria: 214 | Very strong finance & accounting and business acumen skills; deep specialists in all relevant areas; deep understanding of value creation 224 |

TABLE 1-continued

Manage Finance Organization 114

Continuously Improve Finance Function 316

| | |
|---|---|
| Basic Criteria: 210 | One-off initiatives targeted at "fixing problems/fighting fires"; no formal, clearly defined finance roadmap; inconsistent tracking of finance metrics 220 |
| Competitive Criteria: 212 | Continuous improvement mindset, but no formal program; collection of individual initiatives; selected tracking of finance cost/performance metrics 222 |
| Market Leading Criteria: 214 | Formal, ongoing improvement program; senior leader/sponsor; regular tracking of finance cost/performance metrics; constant "raising of the bar" 224 |

Table 2 describes additional market leading criteria for key assessment areas (e.g., capabilities 302-316) of the 'manage finance organization' capability 114. FIGS. 10 and 11 illustrate capabilities within the finance process excellence framework multi-level hierarchy corresponding to the 'manage finance organization' capability 114. Market leading criteria for 'identify proper role of finance' capability 302 may include: maintaining a key role in the management team; actively participating in all key decisions affecting the future of the company; and redirecting time from transaction processing, data gathering and reconciliation.

Market leading criteria for 'understand needs of internal customer' capability 304 may include: formally surveying users of finance services to better understand the needs and wants as well as the users' perceptions of finance capabilities; leveraging an online survey tool (e.g., for broad surveys) and/or a standard interview guide (e.g., for more focused surveys); repeating surveys as part of an ongoing cycle and measuring changes over time; and modifying content and delivery of finance services, as appropriate based on identified needs and wants of internal customers.

Market leading criteria for 'manage delivery of finance services' capability 306 may include: management possessing a deep understanding of company strategy and value drivers; and assessing opportunities to add value based on the company strategy and value drivers, along with a rigorous definition of the role that finance plays (e.g., low cost provider of basic finance services, and/or intimate business partner). Market leading criteria for 'manage delivery of finance services' capability 306 may include: publishing formal quarterly communications (e.g., a web postcard) to all executives above a certain level that highlight relevant changes in finance services, new initiatives, and results of satisfaction surveys; and the communications may be a combination of information, education and internal marketing.

Market leading criteria for 'manage cost of finance' capability 308 may include: leveraging cost collection templates and guidelines to ensure all costs are captured consistently; identifying finance costs incurred outside of the "finance budget"; and decomposing capabilities by process (e.g., record-to-report and purchase-to-pay capabilities), by function (e.g., controllership and treasury), by cost type (e.g., people and technology), by activity (e.g., data gathering and analysis), and/or by geography. Market leading criteria for 'manage cost of finance' capability 308 may further include: identifying cost drivers and root causes of any cost issues; evaluating the cost of various finance components in connection with the relative value add of each of the various finance components; setting formal cost reduction targets based on benchmarking analysis and/or other objective measures.

Establishing formal cost reduction targets may allow finance to better prioritize cost reduction activities and measure progress. Market leading criteria for 'manage cost of finance' capability 308 may further include: engaging a formal cost reduction program lead by a single senior executive with oversight of all individual cost reduction efforts in order to make meaningful progress against cost reduction objectives; managing all transactional and general accounting and reporting activities, and selected reporting and analytics that are standard and/or recurring; locating centralized activities in low cost locations (e.g., on, near, or off-shore) based on cost versus quality trade-offs.

A complex IT architecture may be a significant driver of cost (e.g., excess data gathering, reconciliation, data entry, and IT maintenance). Accordingly, market leading criteria for 'manage cost of finance' capability 308 may include standardizing on a single enterprise resource management (ERP) system and decommissioning legacy systems. The efficiency of "down-stream" activities (e.g., accounts payable) may be heavily influenced by "up-stream" activities (e.g., purchasing). Accordingly, market leading criteria for 'manage cost of finance' capability 308 may include global end-to-end processes (e.g., 'record to report'—R2R, 'purchase to pay'—P2P, and 'order to cash'—OTC) that maximize efficiency and create seamless hand-offs between entities.

Market leading criteria for 'manage cost of finance' capability 308 may reflect a conscious trade-off between costs and service levels. For example, the use of technology may heavily facilitate a self service model (e.g., a web portal to deliver finance reports). Common data structures and definitions reduce data gathering and reconciliation time, streamline reporting and analysis, and eliminate uncertainty regarding particular terms used (e.g., "customer", "headcount", and "fixed cost"). Market leading criteria for 'manage cost of finance' capability 308 may include employing a formal cost control framework, making managers throughout the organization responsible for cost control within the framework and helping the managers understand the cost implications of actions.

Market leading criteria for 'manage performance of finance function' capability 310 may include: identifying a list of metrics that cover the spectrum of finance performance; rationalizing the list of metrics based on the level of impact on the finance function and the organization as a whole; setting formal performance targets based on benchmarking analysis and/or other objective measures; and setting formal targets to better prioritize improvement initiatives and measure progress. Market leading criteria for 'manage performance of finance function' capability 310 may include: assigning primary responsibility for each metric to an executive with the authority and influence to drive improvement in each assigned metric; integrating the performance reviews of the finance function into the overall cycle of enterprise performance reviews; and delivering finance function metrics via web based portal, as well as enterprise wide metrics.

Market leading criteria for 'create/maintain finance organization structure' capability 312 may include: consciously defining the finance organization structure rather than allowing the structure to simply "evolve" over time; periodically reviewing the structure for effectiveness; and re-structuring the organization as necessary. Market leading criteria for 'create/maintain finance organization structure' capability 312 may include: designing finance organization structures that are responsive to overall organization objectives and take into consideration the role of finance (e.g., low cost provider of basic finance services, intimate business partner). Examples considerations include transaction processing (e.g., low cost objective and clerical skills), GAAP reporting (e.g., accuracy objective and CPA skills), decision support (e.g., business partnering objective and MBA skills), and specialized expertise (e.g., various objectives and highly specialized skills). Market leading criteria for 'create/maintain finance organization structure' capability 312 may include: tightly aligning decision support resources and co-locating resources with the management teams the resources support to allow more effective business partnering; while having decision support resources report directly to the CFO to allow better, standards, consistency, finance career paths, skills development.

Market leading criteria for 'create/maintain finance organization structure' capability 312 may further include: for each major finance process, function and activity, formally defining the inputs, roles, and outputs for corporate finance and business unit (BU) finance; and defining working relationships and "hand-offs" between the corporate finance and BU finance. BU, plant, and geography specific finance may be physically co-located with their respective management team, the BU, plant, and geography specific finance report directly to the CFO (even though a "strong dotted line" relationship might exist); CFO should control the hiring, firing, and career development of all finance employees along with the finance budget and the scope, content, and delivery of finance services; one exception is Internal Audit which should report to the Audit Committee of the Board. Examples include investor relations and strategic planning.

Shadow finance organizations hinder efforts to drive consistency, financial control, and low cost. For example, a manager may create a "finance team" with a direct reporting relationship to the manager inconsistent with the organization structure. Market leading criteria for 'create/maintain finance organization structure' capability 312 may include using organization controls to prevent the creation of "shadow finance" organizations.

Market leading criteria for 'create/maintain finance organization structure' capability 312 may include: ensuring that users of finance services have an effective working relationship with a primary finance contact; and authorizing the creation of shared services and outsourcing a "critical mass" of scarce and/or specialized resources to help finance to drive consistency and standardization. Shared services and outsourcing may include essentially all general accounting and transaction processing activities, such as tax, treasury, pricing, high powered analytics, and M&A. True shared services (as opposed to simple centralization) includes a number of components including a formal service delivery model, service level agreements, common processes and technologies, and an appropriate governance structure. Market leading criteria for 'create/maintain finance organization structure' capability 312 may include: limiting redundant transaction processing activities performed at the country level; and performing country specific activities in-country on an exception basis only; distributing activities between a "central hub" and selected low cost locations. Though activities may be located in a number of geographic locations, the centers may be a part of a single shared services organization, led by a senior executive, and employ a formal governance structure. In one implementation, rather than a "finance shared services organization", a "multi-function business services organization may be employed. The benefits of a shared services organization include maximizing economies of scale, integrated facility utilization, a single shared services leadership team, end-to-end process support for cross-functional processes, single face of shared services for all customers and cross functional job rotation and career options.

Market leading criteria for 'manage finance workforce; develop finance skills' capability 314 may include: defining the overall role as well as specific responsibilities, of each finance position, maintaining in a "role dictionary", and be reviewing and updating as necessary; identifying all skills required by finance professionals (e.g., functional, technical, leadership and communications); identifying the mix of skills required for each role and/or career level; and creating a competency model which describes the progression from "basic" skills through "expert", and identifies the level of mastery required for each role and/or career level. Market leading criteria for 'manage finance workforce; develop finance skills' capability 314 may include ensuring that finance professionals possess the ability to: perform typical accounting and control functions, as well as the ability to partner with other functions; instill a value creation mindset in the broader organization; identify and pursuing value creation opportunities; lead change programs; and making and/or influence important business decisions. Market leading criteria for 'manage finance workforce; develop finance skills' capability 314 may include employing rotational programs for finance staff and mid-level finance personnel. Rotational programs may provide opportunities for finance personnel to identify more appealing career paths, in addition to providing a broad exposure to the entire finance function, and potentially increasing the breadth of finance skills of the finance personnel. Market leading criteria for 'manage finance workforce; develop finance skills' capability 314 may further include: defining various "jumping off" points where executives may cease rotation and become more specialized; and ensuring that individual performance objectives for all finance staff align with finance mission and overall company strategy.

Market leading criteria for 'continuously improve finance function' capability 316 may include: ensuring that managers continuously improve cost effectiveness and budgets; performance evaluations reflect continuous improvement as a goal; maintaining an improvement program with a senior leader/sponsor; regular tracking finance cost and performance metrics; maintaining a mechanism to propose and evaluate new improvement ideas, and traditional project management discipline (e.g., stakeholders, project plans, timelines and deliverables). Market leading criteria for 'continuously improve finance function' capability 316 may further include: creating a formal framework to identify and evaluate improvement ideas and/or future state capabilities; continuously evaluating needs of the larger enterprise, the role of finance; objectively analyze existing finance capabilities; and implementing an approach for approving initiatives and integrating initiatives into a larger change management program.

TABLE 2

Manage Finance Organization 114 - Market Leading Criteria 214

| | |
|---|---|
| Identify Proper Role of Finance 302 | Active finance participation in key management decisions |
| | Significant % of finance time spent on high value added activities |
| | Heavy focus on decision support and analytics |
| | Actively instill a value creation mindset and financial acumen into the enterprise |
| | State finance's goals clearly in a written vision statement |
| Understand Needs of | Formally measure needs, wants, and satisfaction of internal finance customers |

TABLE 2-continued

Manage Finance Organization 114 - Market Leading Criteria 214

| | |
|---|---|
| Internal Customer 304 | Make changes to content or delivery of finance services based on legitimate internal customer desires |
| | Hold regular meetings between Finance and business leaders/other department heads to ensure that finance is clearly focused on the needs of the business |
| | Use customer focus groups to resolve specific issues |
| Manage Delivery of Finance Services 306 | Align finance service delivery with the strategic objectives of the company |
| | Make conscious trade-offs between cost and service levels when structuring finance service delivery |
| | Formal service level agreements with internal customers |
| | Regularly communicate with internal customers decisions regarding delivery of finance services |
| Manage Cost of Finance 308 | Formally measure the cost of finance; decompose by process, function, cost type, by activity, and/or by geography |
| | Analyze finance cost to understand cost drivers and relative level of value add of each cost component |
| | Set formal cost reduction targets |
| | Structure formal cost reduction program |
| | Maximize the use of shared services and/or outsourcing |
| | Leverage use of low cost locations |
| | Standardize on a single ERP system; decommission legacy systems |
| | Adopt a process view (as opposed to a "department" view) of activities and design end-to-end processes |
| | Rationalize service levels and/or adopt self service models where practical |
| | Adopt common data structures and definitions |
| | Make managers throughout the organization responsible for cost control |
| | Reduce complexity of "upstream" processes |
| Manage Performance of Finance Function 310 | Identify short list of most relevant finance function performance metrics |
| | Set targets for each metric based on benchmarking or other objective measure |
| | Assign accountability for each metric |
| | Hold formal performance reviews |
| | Publish performance against selected metrics |
| | Continuously monitor performance and take corrective action as required |
| Create Finance Organization Structure 312 | Consciously define the desired finance organization structure |
| | Review the organization's strategic objectives; identify finance's role; then design a structure around this |
| | Segregate activities requiring different skill sets and which have different objectives |
| | Tightly align decision supportresources with the BU management they support; but directly reporting to the CFO |
| | Formally define the working relationship and division of responsibilities between corporate and business unit finance in the overall design |
| | All of finance reports into the CFO organization, including BU finance personnel |
| | Often, "finance related areas" should report to the to CFO as well |
| | Perform no finance activities outside of finance; eliminate any "shadow finance" organizations |
| | All internal customers of finance should have clear points of contact |
| | Maximize the use of shared services and/or outsourcing as well as use of low cost locations |
| | Leverage centers of expertise wherever deep specialized skills are required |
| | Maximize the use of true shared services and/or outsourcing in the transaction processing space |
| | Eliminate redundancies across countries |
| | Employ a global shared services/business process outsourcing (BPO) strategy and model |
| | The shared services organization should be a formal organization entity |
| | Employ a "multi-function" shared services model |
| | Employ standard processes across all business units and geographies |
| | Maximize the use of true shared services and/or outsourcing in the Controllership space |
| | Formally define the working relationship and division of responsibilities between Controllership and FP&A |
| | Centralize as much as possible with minimal activities performed at the regional/country level |
| | Remove transaction processing from direct Controller responsibility - Focus Corporate Controller group on highest vale activities |
| | Formally define the working relationship and division of responsibilities between corporate and business unit finance in the FP&A decision support space |
| | Tightly align decision support resources with the BU management they support; but report hard-line to the CFO |
| Manage Finance Workforce; Develop Finance Skills 314 | Leverage centers of expertise wherever specialized skills are required |
| | Create formal role definitions for all finance positions |
| | Identify and define the required finance skills for all career levels and roles and embed in a formal competency model |
| | Focus heavily on leadership skills and "MBA skills" in addition to traditional "CPA skills" |
| | Use rotation programs to develop finance skills and provide broad exposure to the finance function |
| | Formal professional development plans for all finance staff |
| | Formal succession plans for key finance staff |
| | Individual performance objectives for all finance staff |
| | Rotate tasks to promote "process thinking" and to increase motivation and flexibility |
| | Review staff performance against the achievement of pre-defined objectives |
| | Use Finance as a training ground for future company leaders |
| Continuously Improve Finance Function 316 | Create a continuous improvement mindset and culture |
| | Pursue finance transformation via a formal program |
| | Identify desired future capabilities based on overall goals of the organization and an analysis of existing finance capabilities |

Table 3 provides an explanation of the 'drive enterprise wide change' capability 116, key assessment areas within the finance function platform 104 and corresponding performance capability criteria.

TABLE 3

Drive Enterprise Wide Change 116

| | |
|---|---|
| Description: | Drive Enterprise Wide Change addresses the finance function's role in educating the enterprise on financial concepts and driving or participating in enterprise wide change programs. |
| | Drive a Value Focus into Enterprise 1202 |
| Basic Criteria: 210 | Heavy focus on "getting the accounting right", "making plan" and "increasing current profit"; limited shareholder value focus; finance as a whole cannot claim to deeply understand how the enterprise creates shareholder value 226 |
| Competitive Criteria: 212 | Finance understands value creation but has not yet infused the rest of this enterprise with this mindset; more senior employees understand how their actions contribute to the achievement of business goals, but this understanding has not filtered down to lower levels 228 |
| Market Leading Criteria: 214 | Finance deeply understands shareholder value creation and has infused the entire organization with a value creation mindset and financial acumen; employees at all organizational levels understand how individual actions contribute to achievement of business goals 230 |
| | Decision Making Framework |
| Basic Criteria: 210 | Limited value based analysis is performed; key business decisions are made without adequate information or are based on simplistic frameworks (e.g., expect profit to go up, impact on capital or risk not considered) 226 |

TABLE 3-continued

Drive Enterprise Wide Change 116

| | |
|---|---|
| Competitive Criteria: 212 | Business decisions are generally based on value analysis; profit, cash flow, capital, and risk are all considered; but important information is often unavailable; instinct is relied on more often executives would prefer 228 |
| Market Leading Criteria: 214 | All key business decisions are based on rigorous value analysis prepared with accurate and timely data; profit, cash flow, capital, and risk (short term and long term) are all considered; executive experience and instinct supplements the analysis but does not replace analysis 230 |
| Level of Finance Influence | |
| Basic Criteria: 210 | Finance has only partial control of traditional finance activities and must often seek "permission" to makes finance function changes; limited or no finance influence outside of the finance function 226 |
| Competitive Criteria: 212 | Finance has complete control over "traditional finance" activities and can manage the finance function as it sees fit; finance has only selective influence outside of finance function however 228 |
| Market Leading Criteria: 214 | Finance influence extend well beyond the finance organization; finance is involved in all major decisions pertaining to the future of the company 230 |
| Act as Change Agent Across the Enterprise 1206 | |
| Basic Criteria: 210 | Finance is typically in a reactive mode, racing to respond to changes driven from elsewhere in the organization; typically plays a relatively minor role in major business transformation efforts 226 |
| Competitive Criteria: 212 | Finance reacts quickly to enterprise-wide change; and proactively drives changes within its own organization; but is not truly a change agent across the enterprise; often plays a key supporting role in major business transformation efforts 228 |
| Market Leading Criteria: 214 | Finance is proactive in driving both finance-specific and enterprise-wide change aligned with company strategy and with shareholder value creation; is viewed as a change agent; often plays a lead role in major business transformation efforts 230 |

Table 4 describes additional market leading criteria for the capabilities of the 'drive enterprise wide change' capability 116. FIG. 12 illustrates a hierarchy of capabilities (e.g., key assessment areas 1202-1206) corresponding to the 'drive enterprise wide change' capability 116. Market leading criteria for 'drive enterprise wide change' capability 116 may include: ensuring that executives have a clear and consistent understanding of value drivers for the organization that are consistent with shareholder value principles; maintaining and frequently updating a formal enterprise valuation model (e.g., the type used by sell-side equity analysts); ensuring that finance executives are familiar with enterprise valuation model and the primary drivers of shareholder value; and actively incorporating the model into long-term/strategic planning; ensuring that discussions about performance (e.g., analysis of past performance and/or plans for future performance) are grounded in shareholder value; ensuring that finance executives and personnel understand the distinction between current value and future value; ensuring that management devotes sufficient time to managing future value.

TABLE 4

Drive Enterprise Wide Change 116 - Market Leading Criteria 214

| | |
|---|---|
| Drive a Value Focus into the Enterprise 1202 | Active finance participation in key management decisions<br>Actively instill a value creation mindset and financial acumen into the enterprise<br>Maintain formal enterprise valuation model<br>Ground all planning and analysis in shareholder value |

TABLE 4-continued

Drive Enterprise Wide Change 116 - Market Leading Criteria 214

| | |
|---|---|
| | Distinguish between current value and future value<br>Conduct formal and informal training sessions on the topic of shareholder value creation<br>Communicate regularly with management on business and financial issues<br>Work to develop financial skills in all key decision-makers (inside and outside of finance) |
| Act as Change Agent Across the Enterprise 1206 | Actively Identify value creating opportunities across the enterprise |

Figure 4:
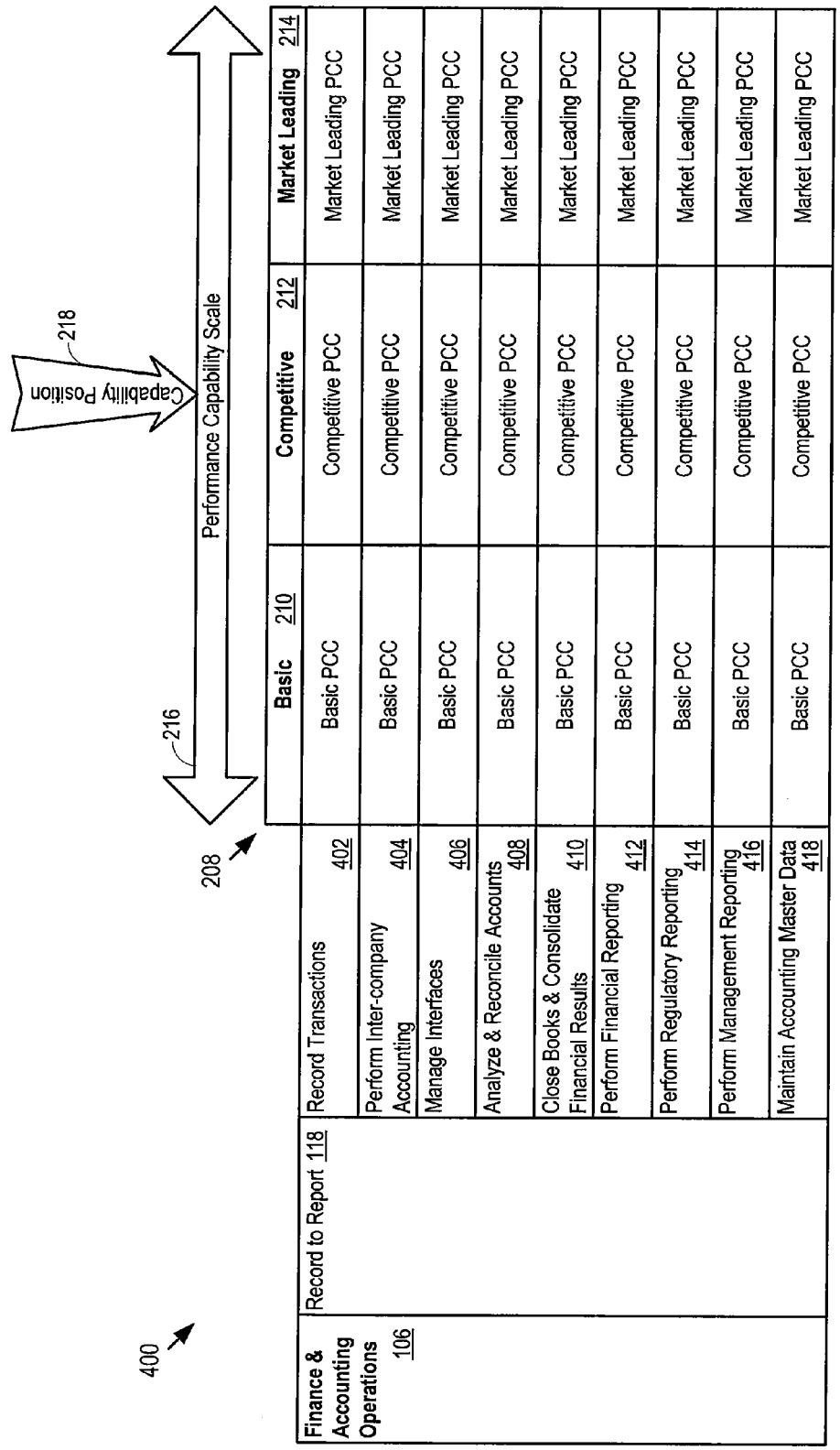
FIG. 4 illustrates a FF-HPCA model with sub-capabilities within the general accounting and reporting (record to report) capability.

FIG. 4 further illustrates that each capability within a platform (e.g., the finance and accounting operations platform 106) may include additional capabilities (e.g., 402-418). For example, FIG. 4 shows the finance and accounting operations platform 106 with the record to report capability 118 with additional capabilities. FIG. 4 shows the record to report capability 118 that further includes a records transaction capability 402, a perform inter-company account capability 404, a manage interfaces capability 406, an analyze and reconcile accounts capability 408, a close books and consolidate financial results capability 410, a perform financial reporting capability 412, a perform regulatory reporting capability 414, a perform management reporting capability 416 and maintain accounting master data capability 418.

Table 5 provides an explanation of the general accounting and reporting (record to report) capability 118, key assessment areas within the capability and corresponding performance capability criteria. FIG. 12 illustrates capabilities within the finance process excellence framework multi-level hierarchy corresponding to the 'record transactions' capability 402.

TABLE 5

General Accounting & Reporting (Record to Report) 118

| | |
|---|---|
| Description: | Record to Report is the end-to-end process that begins with the collection of source transactions and other accounting data and ends with the creation of external statutory reporting.<br>It encompasses the majority of activities typically referred to as "general accounting". |
| Record Transactions 402 | |
| Basic Criteria: 210 | Heavy focus on transaction capture, month-end close, and "getting the accounting right" |
| Competitive Criteria: 212 | Close process is a challenge; but moderate focus on management reporting and analysis |
| Market Leading Criteria: 214 | Heavy focus on management reporting and analysis (rather than just basic accounting) |
| Perform Inter-company Accounting 404 | |
| Basic Criteria: 210 | Closing and reporting cycle times are slower than peers.<br>One of the last companies in the industry to report results after a quarter end |
| Competitive Criteria: 212 | Closing and reporting cycle times are consistent with peers |
| Market Leading Criteria: 214 | Closing and reporting cycle times are materially faster than peers. One of the first companies in the industry to report results after a quarter end |
| Accuracy | |
| Basic Criteria: 210 | Financial results finalized after many audit adjustments.<br>Internal users often question the accuracy of |

TABLE 5-continued

General Accounting & Reporting (Record to Report) 118

| | |
|---|---|
| | management reporting. Restatements are required periodically |
| Competitive Criteria: 212 | Limited audit adjustments are required to finalize financial results. Internal users question the accuracy of selected management reporting - but overall it is considered accurate. Restatements are extremely rare |
| Market Leading Criteria: 214 | Few, if any, audit adjustments are required to finalize financial results. Internal management reporting is considered highly accurate by all users. Restatements are essentially unheard of |
| Reporting Content | |
| Basic Criteria: 210 | Reporting content designed to meet external reporting requirements is also used for management reporting. Limited value added management reporting |
| Competitive Criteria: 212 | Reporting content feeds distinct management reports in addition to financial reports. Management reporting meets some of the needs of internal users |
| Market Leading Criteria: 214 | Reporting content feeds distinct management reports in addition to financial reports. Reporting is adequate to meet the needs of all users - internal and external |

Table 6 describes additional market leading criteria for the capabilities of the 'finance and accounting operations' platform 106. Market leading criteria for 'finance and accounting operations' platform 106 may include: aligning the organization to support the processes of finance and accounting operations, rather than aligning the processes of finance and accounting operations to fit into organizational silos; and ensuring that entities use the same process, regardless of BU or geography.

General accounting and reporting (record-to-report) (RTR) capability 118 may be deployed to a shared services center (SSC) and/or business process outsourcing (BPO). The transactional portion of RTR is typically a non-core competency for many organizations. Market leading criteria for RTR capability 118 may include deploying RTR to SSR and/or BPO and thereby, reducing operating expenses, and improving controls, scalability and efficiencies by consolidating operations. Market leading criteria for RTR capability 118 may include providing online policy manuals to employees conducting RTR activities; employing service level agreements (SLAs), service management reporting, customer satisfaction surveys, internal audit, and external audits; improving overall performance through proactive management of RTR capability. Market leading criteria for RTR capability 118 may further include: employing incentive compensation to manage attrition and performance in specific areas, and non-monetary incentives to build team morale. Market leading criteria for RTR capability 118 may include controlling operating expenses with a highly leveraged organization; improving service levels, customer interactions, and cycle times and performance by developing specializations, while also cross training personnel. Developing specializations and cross training personnel may be incorporated into initial employee training, training across disciplines (e.g., functional, technical and communications), and training across the RTR process to enable integration and work load balancing, while improving staff performance.

TABLE 6

Finance & Accounting Operations 106 - Market Leading Criteria 214

| | |
|---|---|
| General Accounting & Reporting (Record to Report) 118 | Leverage a single, standard, end-to-end RTR process - across all business units and geographies<br>Perform the majority of RTR activities using a shared service center or BPO model<br>Utilize flexible sourcing models that take advantage of cost reductions available by placing select staff in low cost geographic locations.<br>Formally document all RTR policies and procedures<br>Formally and regularly measure the level of internal customer satisfaction with the RTR process<br>Implement a formal feedback loop and continuous improvement process within the RTR process<br>Develop incentive structure that includes performance based compensation at the SSC, team, and individual levels.<br>Implement a relatively flat organization with high spans of control<br>Organize RTR staff in specialized teams based on function<br>Establish clear and regular communication channels and escalation paths across entities involved with the within the RTR process<br>Institute a robust RTR training curriculum and program |
| Basic Criteria: 210 | Reporting content designed to meet external reporting requirements is also used for management reporting. Limited value added management reporting |
| Competitive Criteria: 212 | Reporting content feeds distinct management reports in addition to financial reports. Management reporting meets some of the needs of internal users |
| Market Leading Criteria: 214 | Reporting content feeds distinct management reports in addition to financial reports. Reporting is adequate to meet the needs of all users - internal and external |

Table 7 describes additional market leading criteria for the capabilities of the finance and accounting operations platform 106. Market leading criteria for finance and accounting operations platform 106 includes 'general accounting and reporting (record to report)' capability 118. FIGS. 13-19 illustrate capabilities within the finance process excellence framework multi-level hierarchy corresponding to the 'general accounting and reporting (record to report)' capability 118.

The foundation for financial transactions is the ERP code block, which includes the chart of accounts (COA) as well as other master data elements (detailed cost centers, profit centers, legal entities, currencies, product types, internal counterparties, customers, sales codes, and tax codes). Market leading criteria for finance and accounting operations platform 106 may include: standardizing all of the business units, geographies and legal entities of an organization onto a single code block so that transaction processing is simplified and account reconciliations, analyses, and adjustments are sharply reduced. Market leading criteria for 'finance and accounting operations' platform 106 may further include: providing online, user-friendly access to all relevant accounting policies, procedures, and account definitions; standardizing core processes and policies (e.g., areas such as transfer pricing, inter-company transactions, payments and receipts) to improve accessibility and ease to data entry; limiting the amount of reconciliation and adjustments that hold up a close; improving efficiencies, (e.g., in SSC/BPO environments);

streamlining data roll-up and summarization, closing, and consolidation. Market leading criteria for 'finance and accounting operations' platform 106 may include: validating data at the source of input, rather than at a subsequent point; employing a set of common validation tables and rules in all transaction systems; establishing and enforcing information quality responsibilities with the information source provider; recording transactions once and capturing all relevant information (e.g., financial, statutory, management, and tax) to eliminate statutory and management discrepancies and streamlines tax processes. Market leading criteria for 'finance and accounting operations' platform 106 may also include: locating transaction system views in subsidiary ledgers rather than in the general ledger (GL); posting all transactions to sub-ledgers rather to the GL so that the GL remains clean, minimizing reconciliation and analysis between the GL and sub-ledgers. Maximizing use of standard and recurring journal entries may limit manual activity.

Market leading criteria for 'finance and accounting operations' platform 106 may include: automating recurring entries and related controls (e.g., prior to close) to simplify transaction processing and eliminate time and critical path items from the closing process. Examples of recurring entries and related controls include: inter-company transactions, currency translation, allocations, accruals and reversals. Market leading criteria for 'finance and accounting operations' platform 106 may further include: eliminating all unnecessary accruals; and imposing materiality thresholds. For example, accruals with low volatility and/or materiality estimates may be used and accruals may be performed earlier in the month (e.g., before the closing process begins). Market leading criteria for 'finance and accounting operations' platform 106 may include: automating all key accruals, including reversals; creating accruals dynamically when a commitment occurs (e.g., goods and/or services are received); employing subsystems rather than people to calculate key accruals; prohibiting accruals and allocations to be performed via personal computer spreadsheets; and limiting allocations to only controllable expenses and revenues. Market leading criteria for 'finance and accounting operations' platform 106 may include: prohibiting allocations less than a certain dollar amount; applying basic rules such as whether an allocation adds value (e.g., different decisions without allocation); ensuring that the "receiving" manager controls and/or influences the allocated costs; performing allocations in ERP and/or consolidation systems rather than manually calculating allocations using a spreadsheet. Market leading criteria for 'finance and accounting operations' platform 106 may include: booking allocations prior to the close, based on fixed-rate, budgeted rates and/or prior month. Allocation cycles may be run automatically overnight, and the basis, validity, usefulness and relevance of allocations may be reassessed frequently. Market leading criteria for 'finance and accounting operations' platform 106 may include: ensuring that necessary information is captured once, in a consistent format, for each journal entry across the entire enterprise; and ensuring that management accounting requirements lead to identifying reclassification needs and legally required reclassification only upon hard close; requiring approvals for selected entries based on pre-defined policy which incorporates dollar value and risk; and reducing the approval process cycle time and manual effort; and automating entries resulting from transactions between companies leveraging web technology.

FIG. 14 illustrates the hierarchy of 'Perform Inter-Company Accounting' capability 404. Market leading criteria for 'Perform Inter-Company Accounting' capability 404 may include clearly defining and strictly enforcing an inter-entity transaction policy; promoting the use of internal "contracts" and formal documentation to justify inter-company transactions to reduce disputes from occurring after processing a transaction; automatically managing inter-organization transactions in the accounting systems (e.g., credit transactions may automatically generate the debit transactions in the debtor set of books) to reduce "out-of balance" conditions and reconciliations. Market leading criteria for 'Perform Inter-Company Accounting' capability 404 may include: allowing the sending organization to create both the receivables and payables entries streamlines inter-company billings in addition to eliminating "out of balance" situations; agreeing inter-company balances some number of days (e.g., 5 days) before the month end by reporting balances in advance and monitoring the final weeks transactions; investigating mismatches over a certain threshold (by the local reporting units) after applying the group consolidation tool; simplifying inter-company transactions, reconciliations, and automating off-set entries; employing worldwide data definitions so that all entities can agree on the balances to included in a particular account.

FIG. 14 further illustrates the hierarchy of 'Manage Interfaces' capability 406. Market leading criteria for 'Manage Interfaces' capability 406 may include: posting all transaction activities to sub-ledgers rather than to the general ledger (GL); loading sub-ledger source system data into the GL on a weekly, daily, and/or instantaneously to eliminate some activities from the close process critical path and allow interim flash reporting during the month; reducing manual activities by employing automated interfaces between source systems and main repositories; aggregating and closing non-critical sub-ledgers prior to month-end to spread closing activities over a longer period without adversely impacting the moth-and close cycle. Market leading criteria for 'Manage Interfaces' capability 406 may include: executing selected processes prior to the close and then perform catch-up activities during the actual close.

Integrated ERP solutions can provide drill-down capability from the GL to the sub-ledgers simplifying account analysis. Market leading criteria for 'Manage Interfaces' capability 406 may include: employing an ERP solution to perform data extracts from internal and external systems into a central repository to meet multiple reporting requirements (one version of the truth); aggregating receiving and shipping data more frequently to facilitate ongoing accessibility to data, rather than only at period end, and thereby reducing reconciliation; deploying a single ERP system worldwide and eliminate and/or limit the use of legacy systems; transforming all sub-ledger account validation to the common ERP chart of accounts which supports the corporate general ledger; integrating systems to eliminate and/or reduce stand-alone sub-ledgers, feeder systems and the related interfaces and reconciliation; establishing common definitions and usage guidelines for key data elements, regardless of the system where the data resides; and facilitating efficient interface, roll-up and aggregation.

FIG. 15 illustrates the hierarchy of 'Analyze & Reconcile Accounts' capability 408. Market leading criteria for 'Analyze & Reconcile Accounts' capability 408 may include: employing an expansive cost center, profit center, legal entity structure and chart of accounts adds significant complexity to the R2R process including account reconciliation, analysis, and adjustment; and assigning accounts to entities (e.g., corporate controller or SSC) and individuals within the entities based on account materiality, complexity, and risk. Market leading criteria for 'Analyze & Reconcile Accounts' capability 408 may further include: defining the reconciliation frequency for each account and maintaining formal calendar and tracking of completed reconciliations; automatically managing inter-organization transactions in the accounting systems (e.g., credit transactions automatically generate the debit transactions in the debtor set of books); ensuring that local reporting units maintain ownership of information and responsibility for quality and accuracy of the local reporting unit reports and corporate notifies the local unit of errors.

Figure 16:
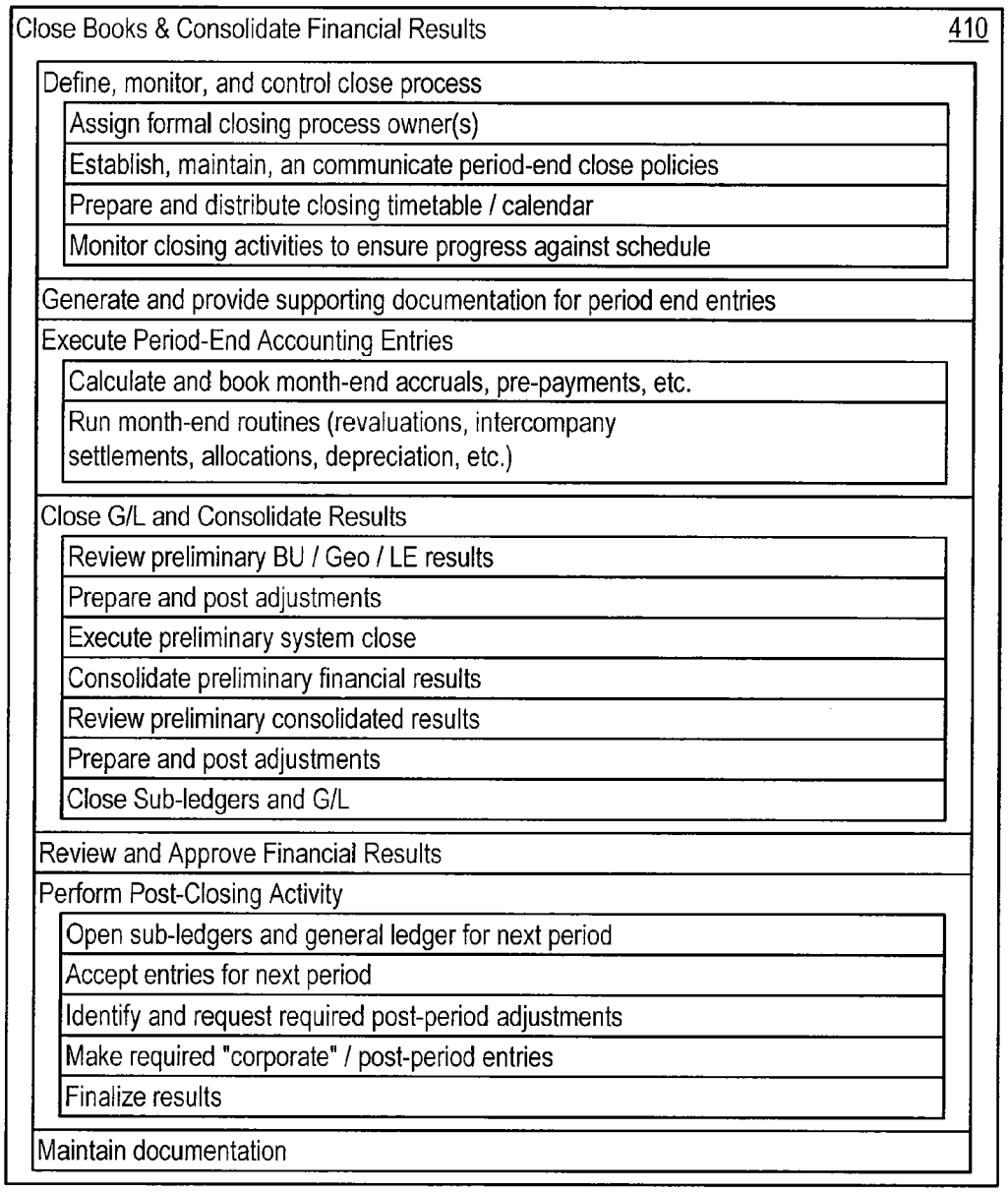
FIG. 16 illustrates capabilities within the 'close books and consolidate financial results' capability corresponding to the general accounting and reporting (record to report) capability.

FIG. 16 illustrates the hierarchy of 'Close Books & Consolidate Financial Results' capability 410. Market leading criteria for 'Close Books & Consolidate Financial Results' capability 410 may include: maintaining a highly structured and rigorous close process so that finance can pre-determine close; issuing a calendar on an annual basis that identifies the when each accounting period should close, when inter-company balances should be agreed, when the ledgers are to be closed, and the dates for various cut-offs; implementing and/or re-designing a consolidated close calendar managed by a single process owner to shorten the closing cycle; ensuring that all purchase orders are registered, purchase and sales invoices are processed and expense claims are submitted; holding individuals accountable for major errors that impact the close timeline; and employing automatic "trigger" in the general ledger (GL) that downloads data to the consolidation tool on a set date each month. Market leading criteria for 'Close Books & Consolidate Financial Results' capability 410 may include: employing a formal and pre-defined communication approach, issue resolution process and decision framework to speed identification and resolution of close issues; monitoring continuous improvement of the close process by developing and tracking metrics including days to close, days to report, # of manual journal entries; and periodically reviewing process, systems and data to identify and manage bottlenecks. Market leading criteria for 'Close Books & Consolidate Financial Results' capability 410 may include: leveraging formal communication vehicles (e.g., meetings, conference calls, websites, and online activity tracking) to ensure that all issues are raised and resolved in the most timely manner; discussing any unusual results with management and auditors; performing less analysis, limiting reconciliations and adjustments during non-quarter end months, and adjusting materiality thresholds in connection with strong quarter-end closing and reporting processes and strong internal controls; aggregating and closing non-critical sub-ledgers prior to month-end to spread closing activities over a longer period without adversely impacting the month-end close cycle; ensuring that as many activities as possible are performed in parallel rather then serially to dramatically shorten the close cycle; limiting period end and closing entries to only those that are required for financial reporting purposes and/or are material from a management reporting standpoint (e.g., corrections, adjustments, and reclassifications).

Market leading criteria for 'Close Books & Consolidate Financial Results' capability 410 may include: optimizing the materiality levels for making adjusting entries, allocations and/or inter-company charges; establishing and enforcing materiality thresholds; evaluating the impacts at the consolidated level when determining materiality thresholds for closing cycle adjustments; avoiding missing a closing deadline by keeping source systems open to book last minute adjustments that are not material to the enterprise as a whole. Often, in decentralized companies with "full P&L business units", the full P&L business units attempt to "negotiate" with corporate for last minute adjustments. Market leading criteria for 'Close Books & Consolidate Financial Results' capability 410 may include: employing a "controllable P&L" to eliminate a negotiation process around non-controllable expense allocations; maintaining exchange rates in the system by corporate so that currency translations occur automatically (e.g., systems, process, timetable, foreign exchange translation and "topside" entries); harmonizing the code block so that finance can automate the consolidation process through the use of a standard consolidation tool; transmitting balances directly to corporate consolidating books, where consolidation has not been automated; transmitting balances directly to corporate consolidating books and eliminating other hierarchical consolidations; restricting allocations to areas where there is a business reason to justify the allocation rationale; eliminating hierarchical, multi-level, or sub-consolidations, where possible; and transmitting data electronically with limited and/or no manual input or re-keying.

FIG. 17 illustrates the hierarchy of 'Perform Financial Reporting' capability 412. Market leading criteria for 'Perform Financial Reporting' capability 412 may include: management understanding the differences between internal and external reporting needs so that GAAP P&L is not used as the single tool to run the business; extracting data from internal and external systems into a central repository to meet multiple reporting requirements; eliminating stand-alone statutory reporting systems; supporting all statutory/management reporting requirements through a single chart of accounts; employing a single and/or few data sources for US GAAP, IAS, and local country requirements to allow consolidated results to feed financial report directly, without adjustment, reclassification and/or modification; ensuring that ERP (e.g., consolidation system) automatically feeds financial reports and templates; ensuring that quarterly hard closes are performed to meet external reporting needs, and monthly soft closes meet internal management needs; implementing comprehensive statutory reporting procedures that are regularly updated and communicated to staff (e.g., base statutory reporting on draft tax charge and liabilities to an acceptable materiality within the same fully integrated system). Market leading criteria for 'Perform Financial Reporting' capability 412 may include: regularly reviewing accounting policies and compare to best practice, with reviews actively involving external advisors, Board members and the audit committee; explaining statutory accounting numbers to investors in terms of drivers of long term shareholder value; and supplying additional non-statutory information to support explanations.

FIG. 18 illustrates the hierarchy of 'Perform Regulatory Reporting' capability 414. Market leading criteria for 'Perform Regulatory Reporting' capability 414 may include: implementing comprehensive statutory reporting procedures that are regularly updated and communicated to staff (e.g., base statutory reporting on draft tax charge and liabilities to an acceptable materiality within the same fully integrated system); and regularly reviewing accounting policies and compare to best practice, with reviews actively involving external advisors, Board members and the audit committee.

FIG. 19 illustrates the hierarchy of 'Maintain Accounting Master Data' capability 418. Market leading criteria for 'Maintain Accounting Master Data' capability 418 may include: centralizing ownership of establishing and maintaining a standardized code block as well as standardization of other master data. For example, corporate finance may control all master data changes and only specific people may be allowed to make changes, while other people and/or entities may little or no access to such information. Market leading criteria for 'Maintain Accounting Master Data' capability 418 may include: leveraging formal request template, approval structure, central control, and policy; defining specific standards that must be met in order to add a new account and cost center. Market leading criteria for 'Maintain Accounting Master Data' capability 418 may include: identifying key performance indicators (KPIs) by which the organization desires to operate the business; designing the financial language of the organization to enable reporting by those KPIs; defining reporting requirements and then design the code block (e.g., ERP code block, which includes the chart of accounts); defining appropriate code block segments to support profitability and cost analysis and reporting so that one code block element can answer one business question; eliminating redundancy and inconsistency of values assigned to codes; design the language to capture data in basic elements that answer 7 fundamental business questions (who, what, why, where, when, how, which); employing combinations of basic elements to support different views of data; providing common and consistent definitions of code to both employees and applications. Market leading criteria for 'Maintain Accounting Master Data' capability 418 may include: planning and anticipating future mergers, divestments, re-organizations, geographic expansion and new product lines; designing intelligence into a code to restrict the number of values that the code can support and increase the amount of data input; prevent systems processing from relying on the values of certain elements and/or portions of elements when mnemonics are involved; deriving roll-ups by the reporting mechanism rather than embedding roll-ups in the language; employing relational tables to enable roll-ups; and providing end-user tools to users to define ad-hoc roll-ups.

TABLE 7

| General Accounting & Reporting (Record to Report) 118 - Market Leading Criteria 214 | |
|---|---|
| Record Transactions 402 | Leverage a single, standard, end-to-end RTR process - across all business units and geographies |
| | Perform the majority of RTR activities using a shared service center or BPO model |
| | Utilize flexible sourcing models that take advantage of cost reductions available by placing select staff in low cost geographic locations. |
| | Formally document all RTR policies and procedures |
| | Formally and regularly measure the level of internal customer satisfaction with the RTR process |
| | Implement a formal feedback loop and continuous improvement process within the RTR process |
| | Develop incentive structure that includes performance based compensation at the SSC, team, and individual levels. |
| | Implement a relatively flat organization with high spans of control |
| | Organize RTR staff in specialized teams based on function |
| | Establish clear and regular communication channels and escalation paths across entities involved with the within the RTR process |
| | Institute a robust RTR training curriculum and program |
| | Leverage a single, standardized, comprehensive code block across the enterprise |
| | Have a formal accounting manual available online |
| | Standardize policies and processes for recording of key transactions |
| | Standardize accounting treatments for all transactions across all legal entities |
| | Capture and validate management and statutory data once, at the source |
| | Post all transactions to the sub-ledger |
| | Maximize use of standard and recurring journal entries |
| | Automate recurring entries |
| | Accruals: Minimize the number of accruals |
| | Accruals: Use estimates where possible - and perform earlier in the month |

TABLE 7-continued

| General Accounting & Reporting (Record to Report) 118 - Market Leading Criteria 214 | |
|---|---|
| | Accruals: Automate accruals |
| | Allocations: Limit allocations |
| | Allocations: Prohibit allocations by PC spreadsheet |
| | Allocations: Minimize the negative impact of allocations on process efficiency |
| | Allocations: Continually reassess allocation methodology |
| | Manual Journal Entries: Use standard, online journal entry request templates |
| | Manual Journal Entries: Book no reclassifications or manual correcting entries unless material |
| | Manual Journal Entries: Require approvals on only high dollar/high risk journal entries |
| | Manual Journal Entries: Leverage workflow capabilities for approval/posting |
| | Leverage web connections to customers, suppliers, and other functions |
| | Establish an automated payroll accrual to accrue for the difference between payroll cycles and accounting periods |
| Perform Inter-Company Accounting 404 | Establish a formal inter-organization transaction policy |
| | Use inter-company contracts |
| | Automate off-setting inter-entity entries |
| | Promptly agree inter-company balances, if not fully automated |
| | Require all entities to use a single, standard chart of accounts |
| | Use consistent data definitions and roll-up structures across all entities |
| | Standardize accounting treatments for all transactions across all legal entities |
| | Automated tools to support the collection and reconciliation of inter-entity balances |
| | Post all transactions to the sub-ledger |
| Manage Interfaces 406 | Aggregate sub-ledgers to the general ledger (GL) frequently |
| | Automate interfaces between source systems and main repository |
| | Shift systems interface and sub-ledger aggregation to pre-close where possible |
| | Provide drill-down from the general ledger (GL) to the sub-ledgers |
| | Sub-accounts and general ledger should continuously reconcile |
| | Leverage single ERP/integrated systems to reduce number of interfaces |
| | Use consistent and common definitions for metrics and data elements across systems |
| Analyze & Reconcile Accounts 408 | Rationalize the number of cost centers, profit centers, G/L accounts, and legal entities |
| | Assign a formal account owner for each account |
| | Maintain a formal reconciliation schedule |
| | Automate off-setting inter-entity entries to eliminate out-of-balance situations and reconciliations |
| | Promptly agree inter-company balances, if not fully automated |
| | Limit the number of and continuously clear suspense accounts |
| | Sub-accounts and general ledger should continuously reconcile |
| | Accountability for data integrity should lie with local reporting unit. |
| Close Books & Consolidate Financial Results 410 | Structure a formal close process and calendar managed by a single process owner |
| | Issue clear and concise instructions to all departments/entities stating what will be required of them and by when |
| | Strict adherence to the timetable for monthly cut-offs |
| | Well understood and documented financial procedures and policies |
| | Pre-define issue resolution approach |
| | Continuously focus on and formally measure close process improvements |
| | Require formal, prompt, and regular communication between local reporting units and corporate during the close |

TABLE 7-continued

General Accounting & Reporting
(Record to Report) 118 - Market Leading Criteria 214

| | |
|---|---|
| | Establish a "pre close meeting" early in the closing cycle |
| | Accountability for data integrity lies with local reporting unit. |
| | Implement a soft close |
| | Shift non-critical items to pre-close |
| | Perform activities in parallel, wherever possible |
| | Address planning and forecasting outside of the close process |
| | Limit period end/closing entries |
| | Evaluate materiality thresholds - and book no reclassifications or manual correcting entries unless material |
| | Rationalize the number of management adjustments |
| | Support drill-down back to individual set of books |
| | All corporate adjustments reconciled and reported, where appropriate, to local units, so adjustments are also made locally |
| | Automate currency translation |
| | Centralize control of the consolidation environment |
| | Automate/streamline consolidations |
| | Simplify the allocations process |
| | Promptly agree inter-company balances- in advance of month-end wherever possible |
| | Transmit subsidiary balances directly to corporate consolidating books |
| | Transmit all data electronically |
| | Automate key accruals and minimize the number of accruals during the closing process |
| | Use subsystems, not people, to calculate key accruals |
| | Accruals should be created dynamically when a commitment occurs (i.e. goods receipt) |
| | Create and post all reversals automatically |
| Perform Financial Reporting 412 | Differentiate between internal (mgmt) and external (financial/regulatory) reporting needs - but leverage a single data source |
| | Single data source meets multiple country statutory reporting requirements |
| | The annual report format and notes to the accounts are agreed by the time that the results have been consolidated |
| | Release earnings and publish regulatory/statutory reports as rapidly as possible after period end |
| | Link financial reporting into the broader performance management agenda |
| | Make financial reporting available to managers at all levels of the organization |
| | Automated financial reporting |
| | 'Soft' close performed to support internal reporting needs on a more timely basis than required for external reporting |
| | Put in place comprehensive training plans to ensure all staff are up to date on current and future financial reporting requirements. |
| | Track key shareholder value measures in addition to accounting measures and use them to communicate with analysts |
| Perform Regulatory Reporting 414 | Publish statutory reports ahead of time and exceed investors' expectations. |
| | Put in place comprehensive training plans to ensure all staff are up to date on current and future regulatory reporting requirements. |
| Perform Management Reporting 416 | See Performance Reporting and Analytics - Measure, Report, and Analyze Business Performance |
| Maintain Accounting Master Data 418 | Maintain master data centrally |
| | Adopt a formal master data add/change/delete process and policy |
| | Leverage a single, standardized, comprehensive code block across the enterprise |
| | Clearly define the relationship between corporate and local chart of accounts |
| | Align the master data structure/language with the way management wants to run the business |
| | Reporting requirements should drive the development of the code block |
| | Simplify and focus the code block: Each element should be clearly defined and used solely for that purpose across the organization. And each element should have an expressed reporting/transaction capture purpose. |
| | Design flexibility into the code block to support future requirements. |
| | Use non-intelligent/non-hierarchical codes in the code block |
| | Support flexible, user-definable rollups |
| | Rationalize the number of cost centers, profit centers, and legal entities |
| | Continually assess/monitor/revise company cost center structure |

Table 8 provides an explanation of the fixed asset accounting capability 120, key assessment areas within the capability and corresponding performance capability criteria.

TABLE 8

Fixed Asset Accounting 120

| | |
|---|---|
| Description: | Includes all transactional activities associated with fixed asset accounting. |

Process

| | |
|---|---|
| Basic Criteria: 210 | Heavy focus on transaction capture and "getting the accounting right"; high volume of manual processing; moderate amount of finance management time devoted to fixed asset accounting |
| Competitive Criteria: 212 | Transaction capture and accounting fully automated but with exceptions; moderate amount of manual processing; minor amount of finance management time devoted to fixed asset accounting |
| Market Leading Criteria: 214 | Transaction capture and accounting fully automated; minor amount of manual processing; essentially no finance management time devoted to fixed asset accounting |

Systems

| | |
|---|---|
| Basic Criteria: 210 | Multiple ERP and/or legacy systems |
| Competitive Criteria: 212 | Single ERP system, but with exceptions - some legacy systems; various "work-arounds" |
| Market Leading Criteria: 214 | Single end-to-end ERP system used worldwide for fixed assets, CIP/project accounting, and general accounting |

Organization

| | |
|---|---|
| Basic Criteria: 210 | Fixed asset accounting activities fragmented across businesses and/or geographies; process designed around functional/geographic silos |
| Competitive Criteria: 212 | Selected use of shared services/outsourcing for fixed asset processes; journey to shared services not complete |
| Market Leading Criteria: 214 | Maximum leverage of shared service and/or outsourcing; organization is aligned to fit the process, not the other way around; |

Figure 21:
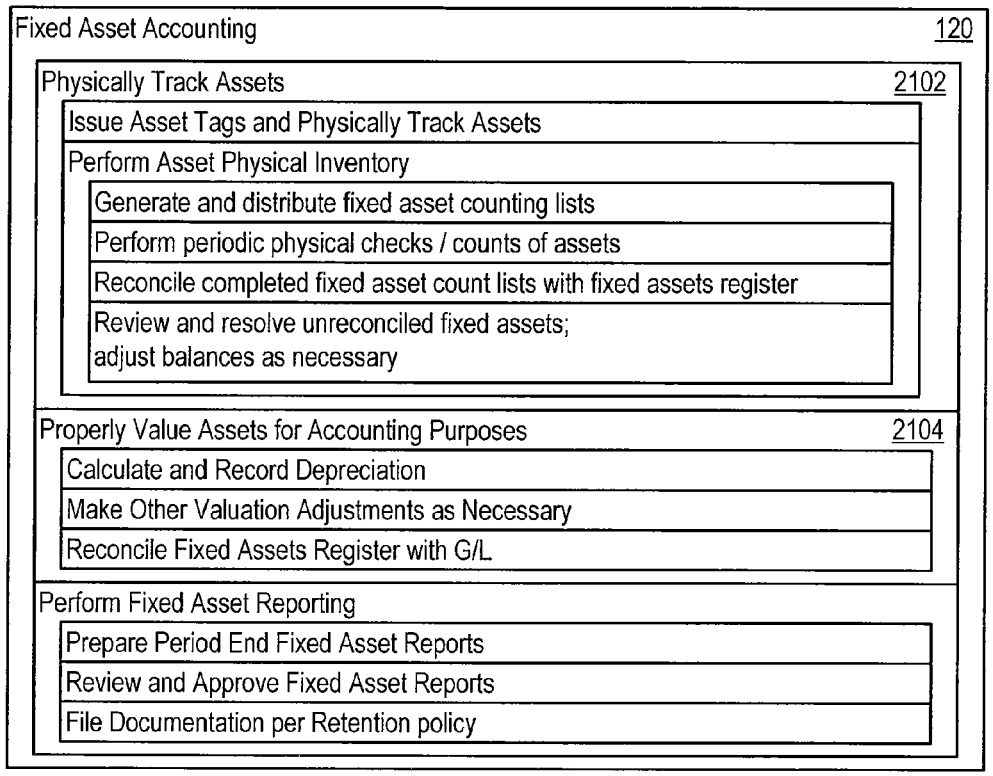
FIG. 21 illustrates additional capabilities within the 'fixed asset accounting' capability corresponding to the 'finance and accounting operations' platform.
Figure 22:
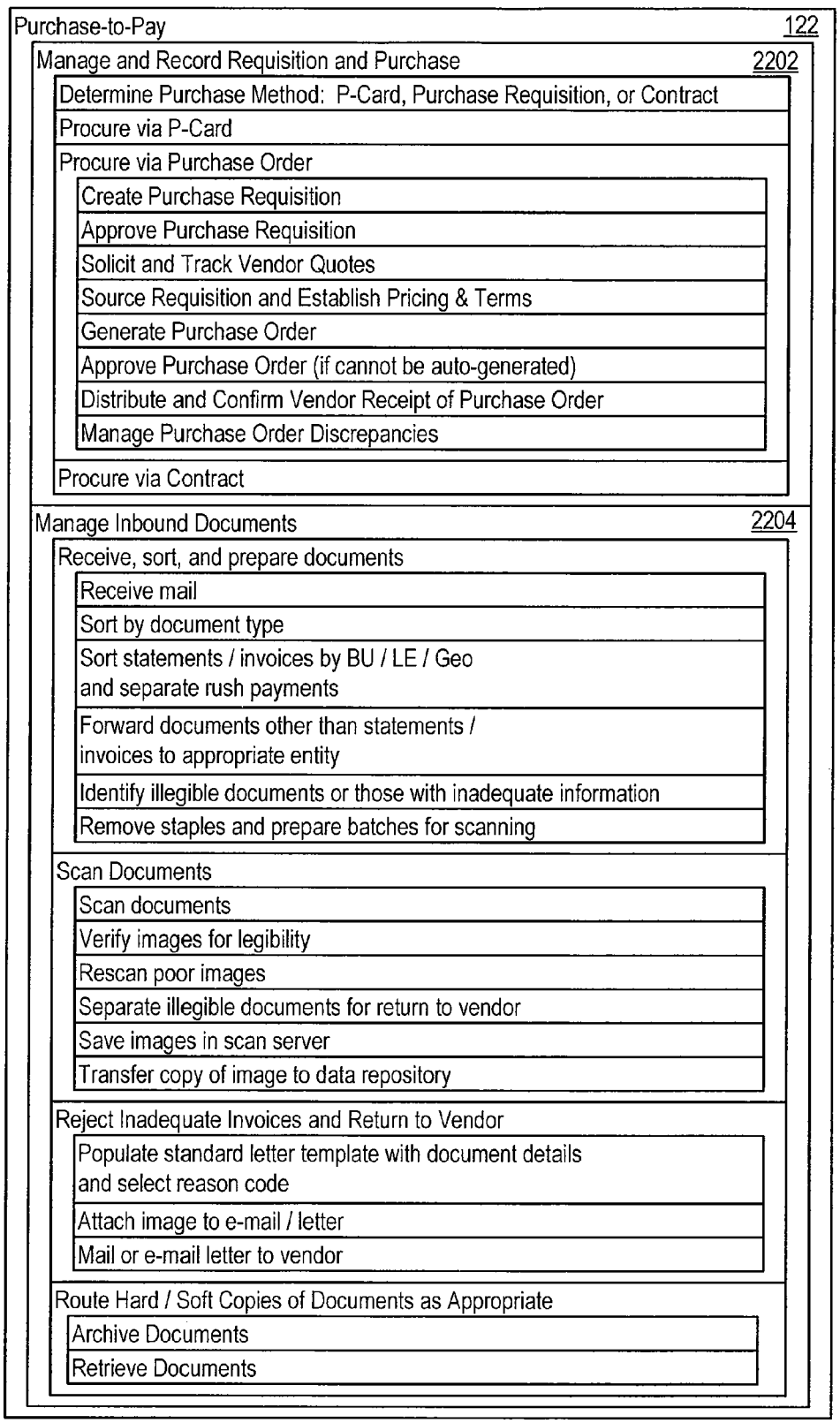
FIG. 22 illustrates capabilities within the 'purchase to pay' capability corresponding to the 'finance and accounting operations' platform.
Figure 23:
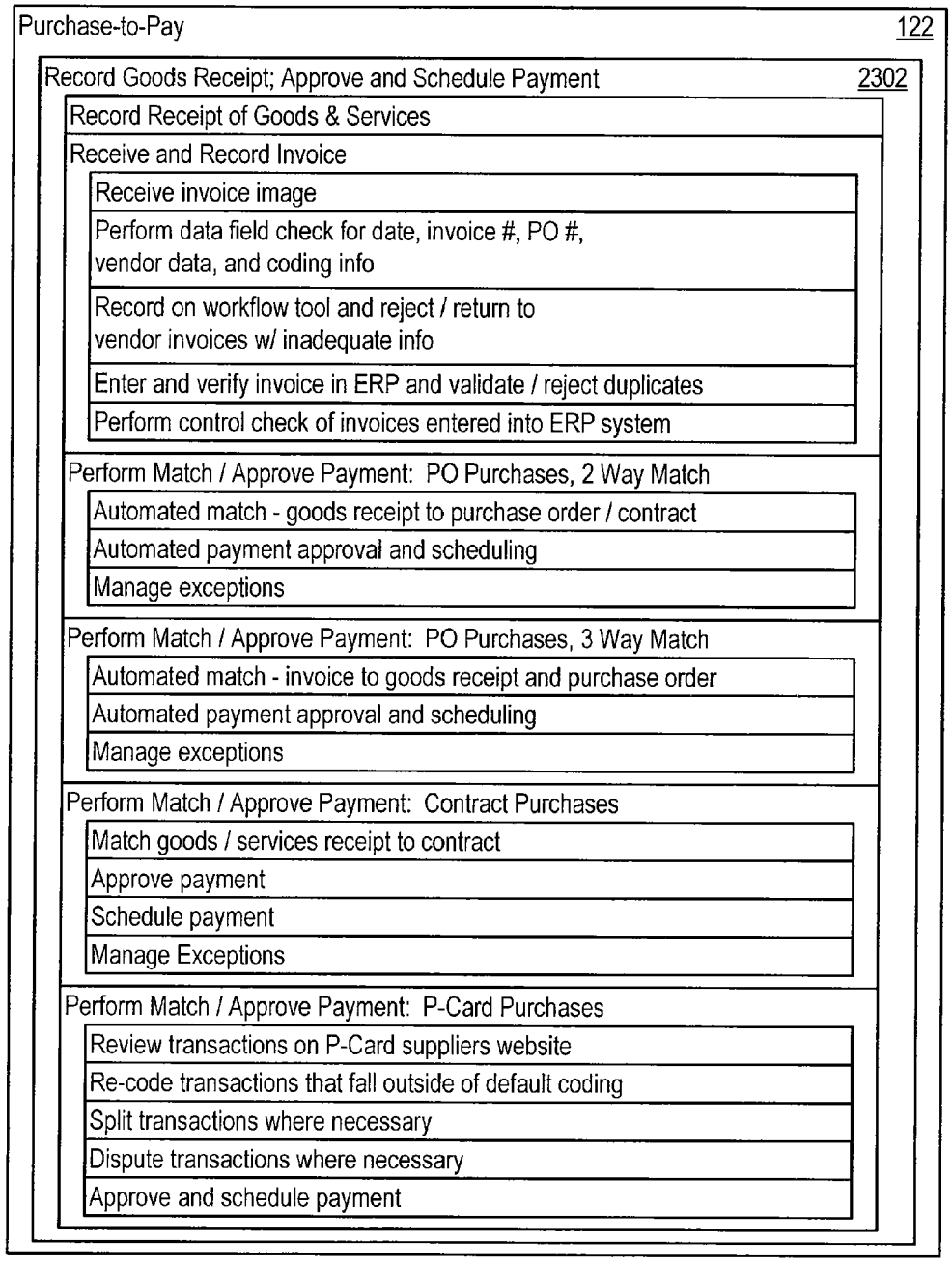
FIG. 23 illustrates additional capabilities within the 'purchase to pay' capability corresponding to the 'finance and accounting operations' platform.
Figure 24:
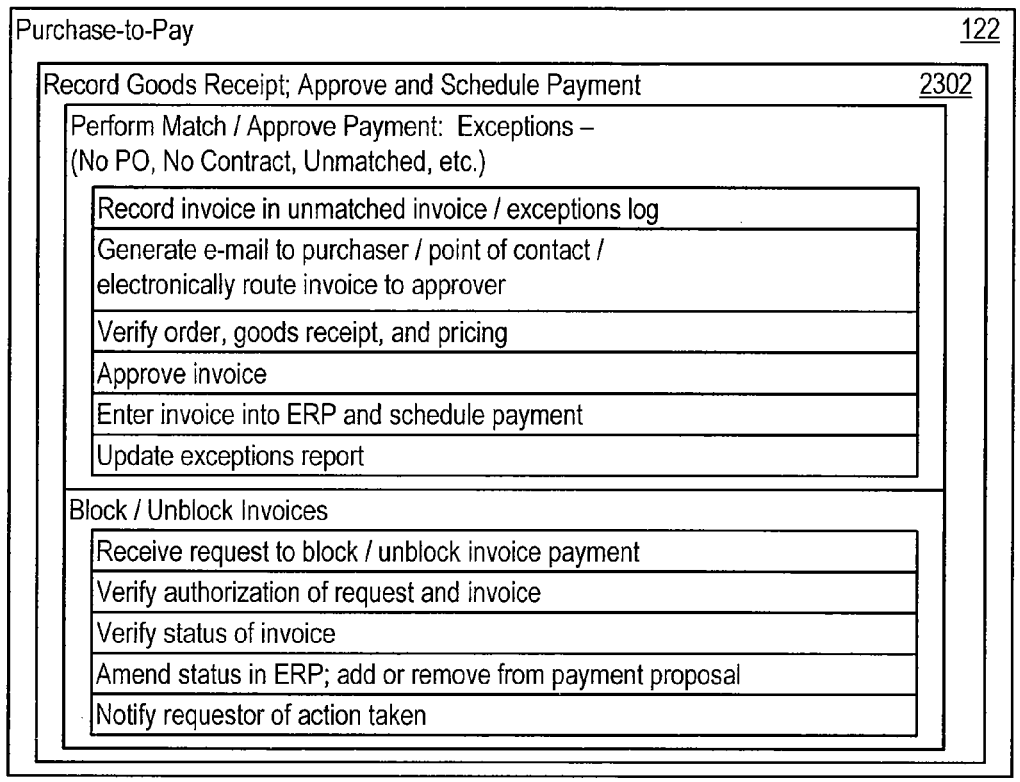
FIG. 24 illustrates additional capabilities within the 'purchase to pay' capability corresponding to the 'finance and accounting operations' platform.
Figure 25:
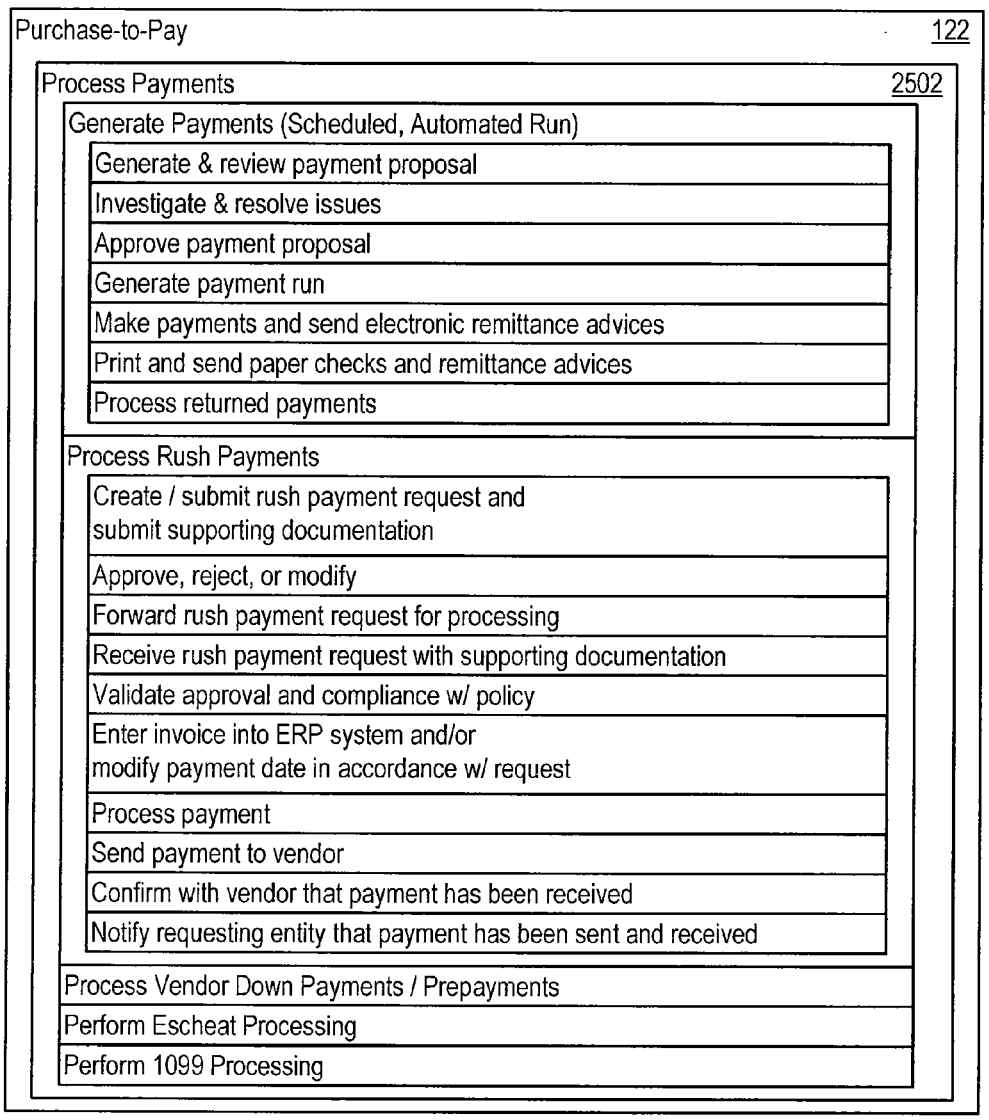
FIG. 25 illustrates additional capabilities within the 'purchase to pay' capability corresponding to the 'finance and accounting operations' platform.
Figure 26:
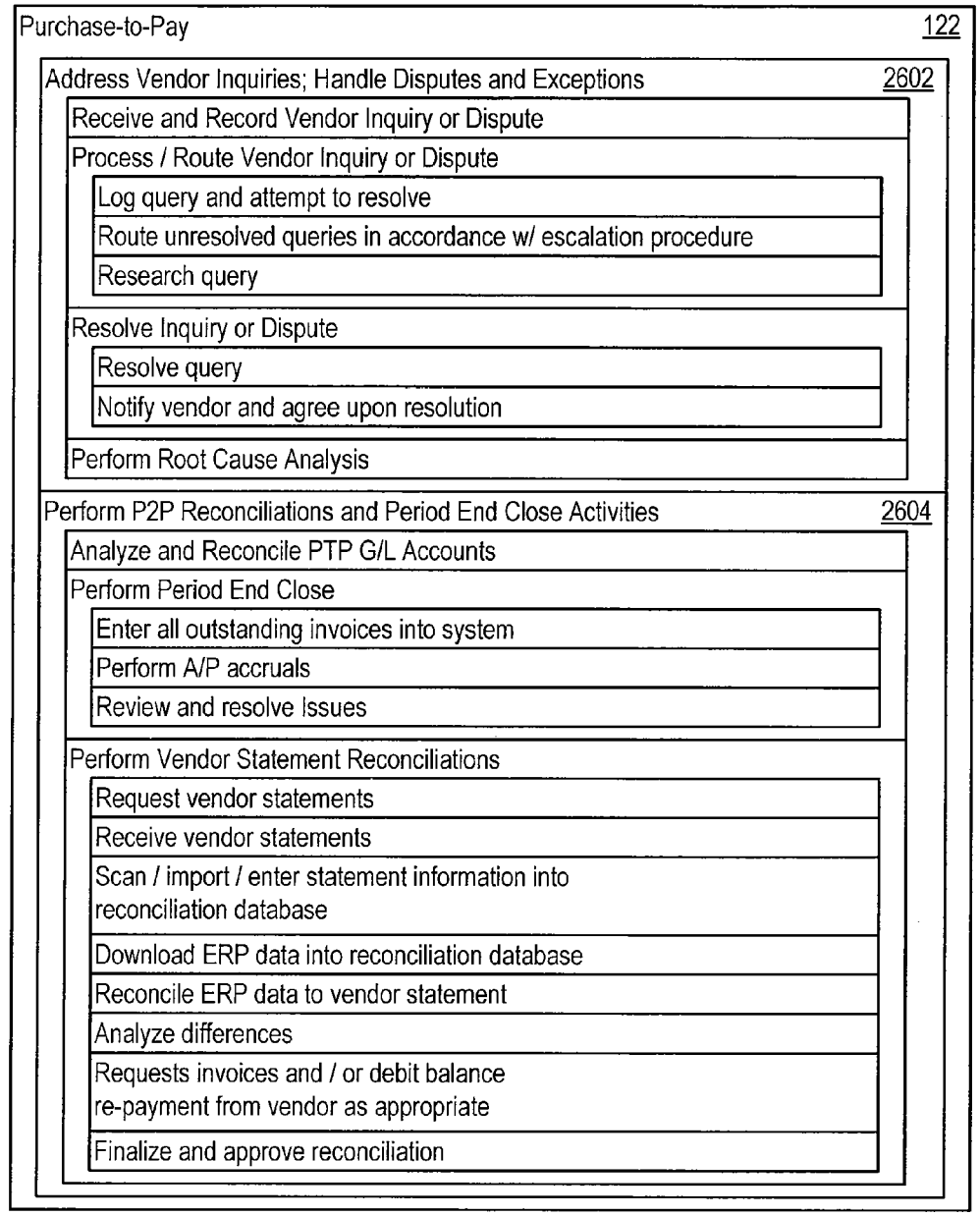
FIG. 26 illustrates additional capabilities within the 'purchase to pay' capability corresponding to the 'finance and accounting operations' platform.

Table 9 describes additional market leading criteria for the capabilities of the fixed asset accounting capability 120. FIGS. 20-21 illustrate capabilities within the finance process excellence framework multi-level hierarchy corresponding to the 'fixed asset accounting' capability 120. Market leading criteria for 'fixed asset accounting' capability 120 may include: aligning the organization to support the process. Fixed asset accounting is well suited for SSC and/or BPO. The transactional portion of fixed asset accounting is non-core competency for many organizations. Market leading criteria for 'fixed asset accounting' capability 120 may include: implementing fixed asset accounting capability as a SSC and/or BPO to reduce operating expense, improves controls, improves scalability, and improves efficiency by consolidating operations; employing incentive compensation to manage attrition and performance in specific areas, and non-monetary incentives to build team morale to improve fixed asset accounting performance; controlling operating expense with a highly leveraged organization.

TABLE 9

Finance & Accounting Operations 106 -
Market Leading Criteria 214

| | |
|---|---|
| Fixed Asset Accounting 120 | Leverage a single, standard, end-to-end fixed asset accounting process - across all business units and geographies |
| | Perform the majority of fixed asset accounting activities using a shared service center or BPO model |
| | Maximize use of low cost locations for fixed asset accounting activities/staff |
| | Formally and regularly measure the level of internal customer satisfaction with the fixed asset accounting process |
| | Implement a formal feedback loop and continuous improvement process within the fixed asset accounting process |
| | Develop incentive structure that includes performance based compensation at the SSC, team, and individual levels. |
| | Implement a relatively flat organization with high spans of control |
| | Organize fixed asset accounting staff in specialized teams based on function |
| | Establish clear and regular communication channels and escalation paths across entities involved with the within the fixed asset accounting process |
| | Institute a robust fixed asset accounting training curriculum and program |

Table 10 describes additional market leading criteria for capabilities within the fixed asset accounting capability 120, including criteria for: 'establish and communicate fixed asset policies and procedures capability 2002; 'record asset acquisition/disposition' capability 2004; 'physically track assets' capability 2102; and 'properly value assets for accounting purposes' capability 2104. The 'establish and communicate fixed asset policies and procedures' capability 2002 may include making an online policy manual available to employees conducting fixed asset accounting activities, which may ensure that once procurement of an asset has been approved in the budget process, subsequent approval requests do not occur. 'Record asset acquisition/disposition' capability 2004 may reduce and/or eliminate re-keying of fixed asset detail. Updating the fixed asset system with the acquisition, transfer, and/or disposal of an asset may automatically update the GL. Acquisitions of a capital nature may be capitalized for acquisitions over a minimum value. 'Physically track assets' capability 2102 may include tracking and identifying physical assets using bar-coded asset tags, which simplifies and streamlines fixed asset inventories and write-offs. 'Properly value assets for accounting purposes' capability 2104 may include company-wide standards (e.g., per category of assets) that are used consistently by all business units and regions, which simplifies data entry, depreciation calculation and projection, and reporting.

TABLE 10

Fixed Asset Accounting 120 -
Market Leading Criteria 214

| | |
|---|---|
| Establish and Communicate Fixed Asset Policies and Procedures 2002 | Formally document all fixed asset accounting policies and procedures |
| | Enforce one approval route; eliminate redundant approval of the same requisition |
| | Paperless approval process for asset transfers |
| Record Asset Acquisition/Disposition 2004 | Fixed asset register is an integrated part of accounting system with link to purchase ordering system, accounts payable application, and GL |
| | Automatically update on-line fixed asset register from requisitions |
| | Set materiality limit for capitalizing fixed assets at the highest level appropriate for the line of business |
| | Details held in the asset system should include information necessary for insurance, taxation, and GAAP accounting requirements |
| | Integrate fixed assets and leased asset systems to capture and report on all assets regardless of financing and accounting treatment |
| | Use pooling of assets approach for capitalizing assets with multiple units that have low individual asset values |
| Physically Track Assets 2102 | Attach bar coded asset tags to fixed assets, either during manufacture by the vendor or upon receipt |
| | Integrate fixed assets system with budgets (e.g., for assets under construction), purchasing, accounts payable and tax reporting. |
| | Maintain a continually updated surplus asset list that is available online to divisions, branches, and subsidiaries |
| | Evaluate the tracking and record maintenance effort on a cost-benefit basis |
| | Separation of asset accounting and physical asset management |
| | Track assets still under warranty to prevent unnecessary costs for repairs, faults, etc. |
| Properly Value Assets for Accounting Purposes 2104 | Use standardized depreciation lives for assets to streamline depreciation reporting |
| | Utilize a depreciation simulation tool for planning purposes |
| | Treat similar assets as "quantity assets" or "mass assets" which are treated as one unit and depreciated in mass i.e. computer equipment, furniture etc. |
| | Depreciation charges and asset activities post automatically to the ledger system |
| | Automate notification of fully depreciated assets. |
| | Calculate property taxes in fixed asset system |
| | Regularly review depreciation policies from the viewpoint of expected continued use and tax efficiency. |

Table 11 provides an explanation of the purchase to pay capability 122 (FIG. 1), key assessment areas within the capability and corresponding performance capability criteria.

TABLE 11

Purchase to Pay (P2P) 122

| | |
|---|---|
| Description: | The Purchase to Pay cycle generally refers to the end-to-end process beginning with the requisition and purchase of goods and services and ending with payment for those goods and services. |
| | Process |
| Basic Criteria: 210 | Fragmented process; functional silos between "purchasing" and "finance"; limited process documentation and rigor; no formal integration with supplier processes |
| Competitive Criteria: 212 | End-to-end process design partially in place, but "up-stream" purchasing issues still cause "down-stream" problems with payables processing; limited supplier integration |

TABLE 11-continued

Purchase to Pay (P2P) 122

| | |
|---|---|
| Market Leading Criteria: 214 | Single end-to-end P2P process with formal process owner, process documentation, and desk procedures; extensive integration with supplier processes |

Systems

| | |
|---|---|
| Basic Criteria: 210 | Multiple ERP and/or legacy systems including multiple P2P systems; limited or no global visibility into purchasing commitments, spend, or payables by vendor; limited use of EDI and/or other paperless technology |
| Competitive Criteria: 212 | Single ERP system, but with exceptions - some legacy systems; various "work-arounds" (e.g., data warehouse, spreadsheets) required to get visibility into global purchasing commitments, spend, or payable balance by vendor |
| Market Leading Criteria: 214 | Single end-to-end ERP system used worldwide; no legacy P2P systems; ERP-generated visibility into global purchasing commitments, spend, and payables balance for each supplier; heavy use of EDI and/or other paperless technologies |

Data

| | |
|---|---|
| Basic Criteria: 210 | Multiple definitions/instances of common data elements (e.g., multiple records for the same vendor), multiple vendor masters, limited governance of P2P master data |
| Competitive Criteria: 212 | Common P2P data definitions, but with exceptions; global vendor master addresses majority of vendors/payments; central governance of P2P master data |
| Market Leading Criteria: 214 | Common P2P data definitions including standard "parent-child" structure for vendors, single global vendor master, central governance of P2P master data |

Organization

| | |
|---|---|
| Basic Criteria: 210 | Purchase to Pay activities fragmented across businesses and/or geographies; process designed around functional/geographic silos |
| Competitive Criteria: 212 | Selected use of shared services/outsourcing for P2P processes; journey to shared services not complete |
| Market Leading Criteria: 214 | Organization is aligned to fit the process, not the other way around; maximum leverage of shared service and/or outsourcing |

Table 12 describes additional market leading criteria for capabilities within the 'purchase to pay' capability 122. FIGS. 22-27 illustrate capabilities within the finance process excellence framework multi-level hierarchy corresponding to the 'purchase to pay' capability 122. Market leading criteria for 'purchase to pay' capability 122 may include: treating purchasing and accounts payable as part of a single process; and aligning the organization to support the process P2P is well suited for SSC/BPO. The transactional portion of P2P is non-core competency for most organizations. Market leading criteria for 'purchase to pay' capability 122 may include: implementing P2P as a SSC/BPO; providing policy manuals online to any employee conducting P2P activities; improving overall performance through proactive management of the P2P process; employing incentive compensation to manage attrition and performance in specific areas, and non-monetary incentives to build team morale to improve P2P performance; and performing downstream payables activities in the same system as the upstream purchasing activity.

Table 12

Finance & Accounting Operations 106
Market Leading Criteria 214

| | |
|---|---|
| Purchase to Pay 122 | Leverage a single, standard, end-to-end P2P process across all business units and geographies<br>Perform the majority of P2P activities using a shared service center or BPO model<br>Formally document all P2P policies, procedures, processes and controls<br>Implement a formal feedback loop and continuous improvement process within Procure to Pay<br>Develop incentive structure that includes performance based compensation at the SSC, team, and individual levels<br>Implement an organization structure with minimal management levels and high spans of control<br>Organize P2P staff in specialized teams based on function and/or vendor segmentation<br>Establish clear and regular communication channels and escalation paths within the P2P operation and with other related departments<br>Institute a robust P2P training curriculum and program including both P2P practioners and internal customers<br>Leverage a single, end-to-end ERP system for the entire P2P process<br>Centralize payables functions, decentralize accountability, error, authorization and approval processing<br>Extend the requisition to pay functions to support integration with vendors/suppliers<br>Track, report and eliminate non-compliant (maverick) spend<br>Fully integrated with Tax functions, i.e. ensure proper tax treatment for all purchase items (tax and non-tax items, rate validation), automated feeds into tax software<br>Manage operations through defined key performance measures which are real time, cascaded down from team targets, individual Management by Objectives (MBO), and partner/supplier SLAB<br>Formalize vendor selection process including fraud prevention requirements<br>Eliminate one-time vendor processing<br>Align purchasing strategy with organizational strategies<br>Develop and actively monitor supplier performance ratings<br>Create P2P structures to supporting ethical supplier relationships<br>Reduce cycle times for routine orders<br>View vendors as business partners whose goals are aligned with yours, sharing both risks and rewards<br>Benchmark comparisons completed on a periodic basis<br>Shared services for capital buying, order management, vendor management, content management, and payables processing across all business units, in a low-cost operating locale<br>People developed, dynamically matched, and cross trained throughout the corporation |

Table 13 describes additional market leading criteria for capabilities within the 'purchase to pay' capability 122, including criteria for: 'manage and record requisition and purchase' capability 2202; 'manage inbound documents' capability 2204; 'record goods receipt; approve and schedule payment' capability 2302; 'process payments' capability 2502; 'address vendor inquiries; handle disputes and exceptions' capability 2602; 'perform P2P reconciliations and period end close activities' capability 2604; 'manage vendor data/data master' capability 2702; and 'manage corporate P-card program' capability 2704.

'Manage and record requisition and purchase' capability 2202 may include arranging with frequently used vendors to have sales tax information captured at point of sale. Relationships may include national purchasing agreements, consolidated and centralized billings, consignment inventories (e.g., wholesaler holding stock of supplier "on consignment", which is paid for after sales to customer), evaluated receipt settlement (ERS) to pay on receipt of goods and/or services may eliminate the need to receive and process vendor invoices. 'Manage and record requisition and purchase' capability 2202 may include: employing online purchase requisition submission and approval; using paperless catalogues with real time pricing and quantity; employing Outbound Electronic Data Interchange (EDI) and/or an Internet link to vendor sites for purchase order and requisition; employing Inbound EDI and/or an Internet link from procurement card and vendors; actively pursuing vendors to leverage electronic commerce; analyzing and evaluating total cost of ownership over the expected life of the product and/or service, and assessing vendors, products and services accordingly (e.g., in additional to more traditional price, quality and terms); formulating and implementing different strategies for different commodity groups; and leveraging "specialist" buyers.

The 'manage inbound documents' capability 2204 may include implementing initiatives to reduce invoice volumes, despite a possible increase in matching issues, and centralizing the receipt of invoices; performing opening, sorting, scanning in the same location where invoices are received.

'Record Goods Receipt; Approve and Schedule Payment' capability 2302 may include: eliminating approvals for stock goods (e.g., materials and merchandise may be automatically replenished); scanning delivery notes and receivers at the warehouse and entering service acceptances directly with outstanding deliveries flagged on the system; using computerized scanners to read and enter data as opposed to manual entry of invoice amounts; leveraging analytics tools and reporting to identify duplicate payments; performing "preventative" analytics, as well as post "audit and compliance" analytics; raising limit for checks requiring signatures; automatically approving low dollar invoices; reviewing large dollar invoices and statistically sampling the remainder (e.g., through a tie back to PO); and refusing invoices without proper order number.

'Process payments' capability 2502 may include: eliminating paper checks to the extent possible; holding check stock in safe in locked office space so that access is limited to a few designated key holders; requiring suppliers to invoice once per month and use composite invoices for high volume supplies to reduce invoice volumes; invoicing by GRN to improve and more efficiently match.

'Address vendor inquiries; handle disputes and exceptions' capability 2602 may include: implementing Internet enabled link and/or interactive voice response (IVR) unit allows suppliers to perform and/or access account status inquiries, payment inquiries, remittance advices, and vendor reconciliations; reducing help desk employee time and related cost; reducing and/or eliminating the number of personnel involved in contacting a vendor for a particular request; dedicating personnel to particular vendors to develop an efficient and consistent handling of vendor inquiries and requests.

'Perform P2P reconciliations and period end close activities' capability 2604 may include: ensuring that all purchase orders are registered, purchase and sales invoices are processed and expense claims submitted; holding individuals accountable for major errors that impact the close timeline; and implementing a formal and pre-defined communication approach and issue resolution process and decision framework to speed identification and resolution to close issues.

'Manage Vendor Data/Data Master' capability 2702 may include: preventing multiple (e.g., duplicate) vendor records that lead to inaccuracies in tracking and managing individual vendor activity. Separate records can also lead to separate contracts with different prices and payment terms for identical items. Structured parent-child relationships allow companies to address the situation where they deal with multiple entities within the same vendor company. 'Manage Vendor Data/Data Master' capability 2702 may include: providing major ERP vendors robust vendor master data management capabilities to efficiently produce visibility into global purchasing commitments, spend, and payables balance for each supplier and to maximize buying power; regularly searching for and eliminating duplicates; and regularly analyzing inactive vendors 'Manage corporate P-card program' capability 2704 may include: implementing separate P-Cards for each account to be charged; coordinating with frequently used vendors to have department and accounts and/or other relevant information entered at point of sale by vendor; setting a materiality limit under which manual allocations are prohibited; employing procurement cards to minimize the high volume of low dollar PO's and invoices being processed; minimizing vendor blocking where exceptions may occur (e.g., blocking all hotel charges when a travel card is not used may block charges for meeting facility rental from a hotel); relying on budget controls for certain expense items; and automatically checking orders against budgets.

TABLE 13

Purchase to Pay (P2P) 122
Market Leading Criteria 214

| | |
|---|---|
| Manage and Record Requisition and Purchase 2202 | Establish standard electronic RFQ process is available to external suppliers<br>Code and validate expense information (e.g., GL acct, project codes, cost center, product) at time of requisition/approval process<br>Approval process is standardized across organization and integrated to procurement system<br>Eliminate expense pre-approval requirements for purchases below established tolerances<br>Establish preferred supplier programs that leverage negotiated buying power and key supplier performance criteria<br>Establish strategic vendor relationships<br>Use the Web for electronic commerce through the use of online catalogs and order processing<br>Automate the requisition process including the interface with vendors<br>Fully integrate the purchase order system to the accounts payable system and accounts payable to the general ledger with on-line verification capability<br>Value and measure total cost of ownership when making purchasing decisions<br>Divide purchased parts and services into commodity groups handled by specific buyers<br>Involve potential suppliers in the definition of requirements for specialized purchases<br>Contracts are centrally logged, compliance is pro-actively managed and regularly reported and contract information available on-line to appropriate individuals<br>Leverage purchasing contracts to secure pricing for volatile purchase items<br>Maintain automated approval workflow routing for requisition processes<br>Leverage vendor-based forecasting and replenishment systems by outsourcing inventory management to vendors<br>Leverage reverse auctions to reduce purchase item costs<br>Perform all required approvals at time of requisition/purchase<br>Populate and leverage requisition coding system defaults by vendor, items (i.e. type of expense, inventory) and requester (i.e. business unit, cost center) |
| Manage Inbound Documents 2204 | Request summary and consolidated invoices from key suppliers<br>Receive and image all inbound documents at a single central location<br>Establish date of receipt as the applicable date for discounts rather than the invoice date |

TABLE 13-continued

Purchase to Pay (P2P) 122
Market Leading Criteria 214

| | |
|---|---|
| | Leverage optical character recognition (OCR) to reduce data input |
| | Leverage imaging application to index, deliver, store, and retrieve Purchase to Pay documentation (paper invoices, bill of lading, etc.) |
| Record Goods Receipt; Approve and Schedule Payment 2302 | Reduce vendor invoice volumes by leveraging 2-way match/invoiceless processing (ERS, pay upon receipt, self billing) for major suppliers |
| | Use a standardized inventory receipt and accounting process across organization |
| | Eliminate approvals for stock goods |
| | Utilize ERP material and service receipt functionality to facilitate downstream transaction processing |
| | Use electronic notification of receipt of material goods |
| | Maintain current and timely status of orders (via timely order entry and change orders) to facilitate down-stream processing. |
| | Use bar coding to match receiving documents with goods expected for delivery |
| | Automatically load procurement card transaction data into accounts payable system |
| | Allow for automatic payment of recurring invoices |
| | Perform formal duplicate payment audit |
| | Review 100% of large dollar invoices and statistically sample the remainder. |
| | Personnel are able to utilize imaging and drill down capabilities within ERP system to gather information |
| | Link receivables and payables systems to net payments due to/due from other parties |
| | Request suppliers to state the order number (as used in the buyer's computer system) in their invoices to accelerate internal processing |
| | Focus exception processing on significant matching variances or high value transactions |
| | Migrate from EDI to XML based payment methods |
| | Request invoice segmentation according to invoice processing requirements (e.g., cost center, locations) |
| | Establish automated workflow defaults for any required invoice approvals |
| Process Payments 2502 | Optimize number of check runs each month; leverage daily electronic payment runs where practical |
| | Batch/schedule supplier payments into one payment made from central Accounts Payable function |
| | Utilize EFT/direct deposit for payment to eliminate use of paper checks as much as possible |
| | Limit/eliminate manual check request generation |
| | Automate signature blocks applied to checks |
| | If paper checks do exist, maintain tight physical control over check stock |
| | Automate determination of payment date based upon vendor profiles |
| | Implement positive pay capabilities to reduce fraudulent check processing |
| | Evaluate requirement that vendors provide summarized and consolidated invoices |
| Address Vendor Inquiries; Handle Disputes and Exceptions 2602 | Equip suppliers with self-service tools (web and interactive voice response) to perform routine inquiries |
| | Capture during the initial vendor inquiry/request all information necessary to categorize, route, and resolve the inquiry |
| | Establish an inquiry handling function or help desk as a distinct function within the P2P process |
| Perform P2P Reconciliations & Period End Close Activities 2604 | Automate key accounts payable accruals and minimize the number of accruals during the closing process |
| | Accruals should be created dynamically when a commitment occurs (i.e. goods receipt) |
| | Perform formal vendor statement reconciliations |
| | Distribute clear and concise monthly and weekly instructions to all departments/entities including specific activities and required timing |
| | Strictly adhere to the defined timetable for monthly cut-offs |
| | Pre-define issue resolution approach |
| Manage Vendor Data/Data Master 2702 | Rationalize vendors on a periodic basis evaluating number of vendors utilized, minimizing vendor base and partnering with primary vendors |
| | Centralize control and maintenance of the vendor master file |
| | Maintain a single, global vendor master; maintain a single record for each vendor |
| | Support customer parent/child relationships in the customer master and any supporting systems |
| | Employ standard vendor naming convention |
| | Clearly defined master data processes, procedures and policies are in place across the organization |
| | Perform formal vendor database clean-up on a recurring basis |
| | Implement duplicate account edits which are executed during account setup and perform periodic duplicate account reviews |
| | Vendor master file should accurately reflect terms negotiated by purchasing |
| | Use vendor master data set up to define the type of invoice and subsequent treatment and routing |
| Manage Corporate P-Card Program 2704 | Use a corporate purchasing card (P-Card) for low value purchases |
| | Use card data to negotiate discounts and other benefits with vendors, including the card provider |
| | Arrange for individual cardholders to receive statement information electronically or via the web |
| | Minimize allocation of cost of P-Card purchases to departments. When allocations must be made, employ strategies to reduce manual allocations. |
| | Minimize P-Card usage restrictions; encourage use of P-Card program |
| | Central bill/central pay for P-card transactions |

Table 14 provides an explanation of the 'travel and expense reimbursement' capability 124, key assessment areas within the capability and corresponding performance capability criteria.

TABLE 14

Travel & Expense Reimbursement 124

| | |
|---|---|
| Description: | Includes those activities associated with reimbursing employees for travel and other appropriate expenses. |

Process

| | |
|---|---|
| Basic Criteria: 210 | Inconsistent policies and processes for travel authorization and expense submission and reimbursement |
| Competitive Criteria: 212 | Single, standard, T&E submission and reimbursement process partially in place, but with various exceptions |
| Market Leading Criteria: 214 | Single, standard, T&E submission and reimbursement process used consistently across the entire enterprise |

Systems

| | |
|---|---|
| Basic Criteria: 210 | Paper based submission process with manual data entry by T&E staff; stand alone system not integrated with ERP/GL/cost center reporting |
| Competitive Criteria: 212 | Single online T&E system, integrated with the ERP system, but with exceptions for selected business units/geographies |
| Market Leading Criteria: 214 | Single online T&E system, integrated with the ERP system, used consistently across the entire enterprise |

Organization

| | |
|---|---|
| Basic Criteria: 210 | T&E activities fragmented across businesses and/or geographies; process designed around functional/ geographic silos; activities performed in high cost location(s) |

TABLE 14-continued

Travel & Expense Reimbursement 124

| | |
|---|---|
| Competitive Criteria: 212 | Selected use of shared services/outsourcing for T&E processes; journey to shared services/low cost location not complete |
| Market Leading Criteria: 214 | Maximum leverage of shared services and/or outsourcing in low cost location for all T&E activities |

Figure 28:
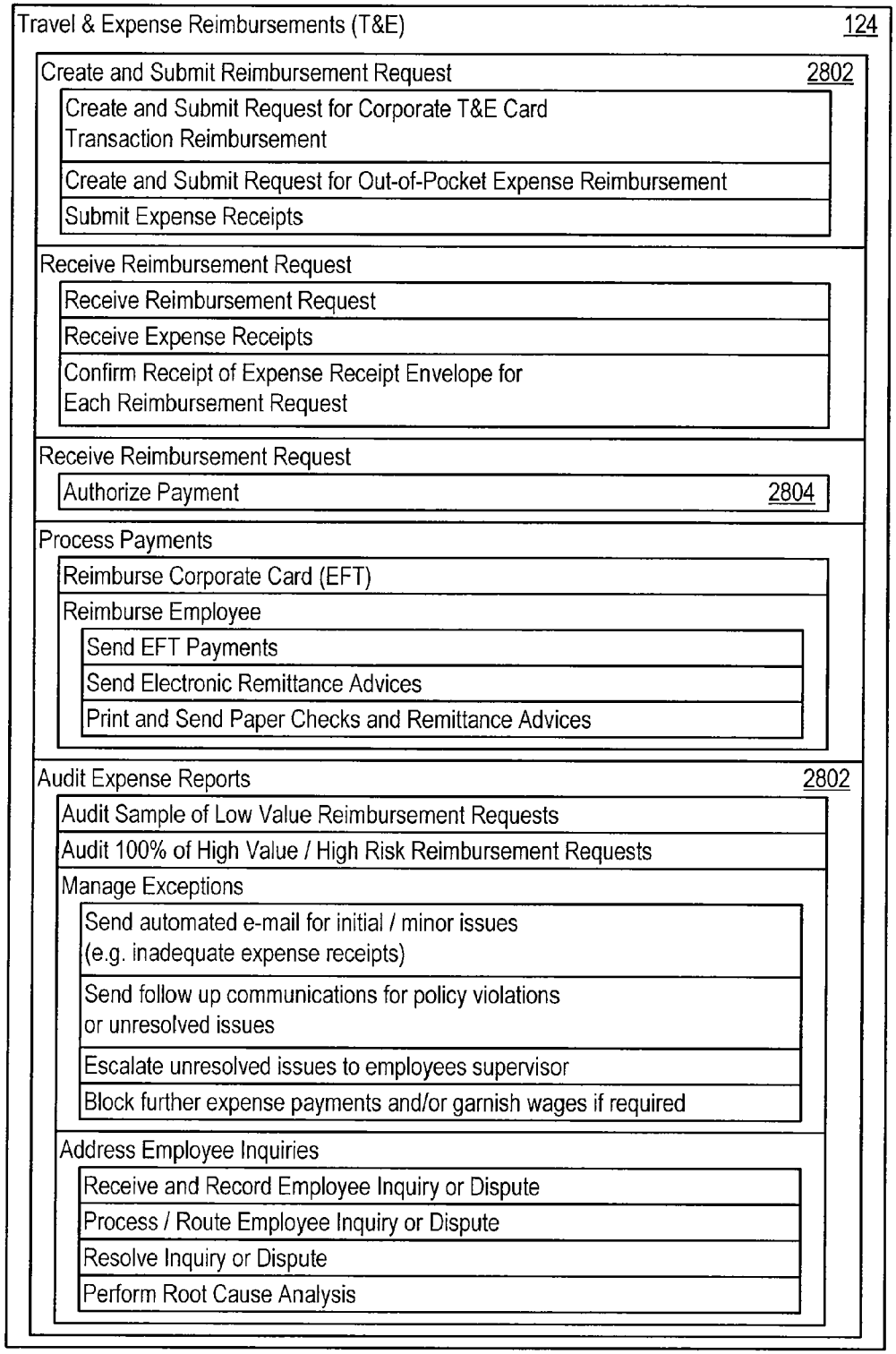
FIG. 28 illustrates capabilities within the 'travel and expense reimbursement' capability corresponding to the 'finance and accounting operations' platform.

Table 15 describes additional market leading criteria for capabilities within the 'travel and expense reimbursement (T&E)' capability 124. FIGS. 28-29 illustrate capabilities within the finance process excellence framework multi-level hierarchy corresponding to the 'travel and expense reimbursement (T&E)' capability 124. 'Travel and expense reimbursement (T&E)' capability 124 may include: 'create and submit reimbursement request' capability 2802; 'authorize payment' capability 2804; 'audit expense reports' capability 2806; 'maintain travel and expense policy' capability 2902; and 'manage corporate card program' capability 2904. Market leading criteria for 'Create and submit reimbursement request' capability 2802 may include ensuring that entities use the same process, regardless of BU or geography. T&E is well suited for SSC/BPO. T&E is non-core competency for most organizations. Market leading criteria for 'Travel and expense reimbursement (T&E)' capability 124 may include: deploying T&E as a SSC/BPO; and eliminating paper based expense claims. Market leading criteria for 'Authorize payment' capability 2804 may include automatically flagging expense requests that require pre-approval. Market leading criteria for 'Audit expense reports' capability 2806 may include: auditing a small sample of low value/low risk reimbursement requests; auditing all of high value/high risk reimbursement requests; updating future samples sizes and the approach used to audit based on data from previous audits; sending automated e-mail for initial and minor issues (e.g., inadequate expense receipts); sending follow up communications for policy violations or unresolved issues; escalating unresolved issues to employees supervisor; and blocking further expense payments and/or garnish wages when required. Market leading criteria for 'Maintain travel and expense policy' capability 2902 may include implementing a relevant and clearly stated financial control framework; and ensuring that managers throughout the organization are responsible for controlling expenses and understanding the implications of any actions. Market leading criteria for 'Manage corporate card program' capability 2904 may include: implementing corporate cards to eliminate the need for advances and floats; the organization receiving discounts from the card issuer in exchange for the employees using the card.

TABLE 15

Travel & Expense Reimbursement (T&E) 124 - Market Leading Criteria 214

| | |
|---|---|
| Create & Submit Reimbursement Request 2802 | Leverage a single, standard, T&E reimbursement process<br>Leverage a single T&E system, integrated with the ERP system<br>Perform the majority of T&E activities using a shared service center or BPO model<br>Utilize flexible sourcing models that take advantage of cost reductions available by placing select staff in low cost geographic locations.<br>Formally document and distribute all T&E policies and procedures<br>Implement a formal feedback loop and continuous improvement process within the T&E process<br>Develop incentive structure that includes performance based compensation at the SSC, team, and individual levels.<br>Implement a relatively flat organization with high spans of control<br>Establish clear and regular communication channels and escalation paths within the P2P operation and with other related departments.<br>Institute a robust training curriculum and program<br>Employees arrange own travel through designated travel agency within organization guidelines, reclaiming cost on expense claims<br>Self approval of expense claims followed by post audit<br>Use a customized credit card statement as the expense claim form<br>Leverage an on-line travel and expense system that is fully integrated with the accounting system<br>Require employees to complete expense claims electronically, using the on-line T&E system<br>Have electronic input prompt for explanation of non-compliance with company policy using validation rules<br>Require expense receipts to be mailed in pre-printed/coded expense envelopes on the same day that the on-line expense claim in submitted |
| Receive Reimbursement Request ----- | Receive all in-bound T&E documents in one central location<br>Use image processing for receipts (expense documentation)<br>Automated notification if expense receipt envelope is not received within one week of on-line expense claim submission |
| Authorize Payment 2804 | Eliminate redundant reviews and approvals - perform post audit rather than pre-approval in most cases<br>Segment reimbursement requests into risk categories when determining post audit sample sizes<br>Require pre-authorization only when amounts are over predetermined limits or if charges do not comply with policy<br>Embed controls in technology |
| Audit Expense Reports 2806 | Eliminate redundant reviews and approvals - perform post audit rather than pre-approval in most cases<br>Control T&E processes via sample audits<br>Segment reimbursement requests into risk categories when determining post audit sample sizes<br>Rout exception reports automatically to managers electronically<br>Create standard, pre-defined escalation procedures for non-compliance |
| T&E Document Retention ----- | Require expense receipts to be mailed in pre-printed/coded expense envelopes on the same day that the on-line expense claim in submitted<br>Use image processing for receipts (expense documentation) |
| Maintain Travel & Expense Policy 2902 | Use one travel agency, organization wide - review annually<br>Have travel policies available on-line in an easily accessible, user friendly format<br>Relevant, clearly stated financial control framework<br>Use T&E expense data to negotiate discounts with primary vendors |
| Manage Corporate Card Program 2904 | Provide a corporate credit card for all employees incurring business expenses<br>Put in place an agreement with Customs and Excise for reclaiming VAT from credit card |

Table 16 provides an explanation of the order to cash capability 126, key assessment areas within the capability and corresponding performance capability criteria.

TABLE 16:

Order to Cash (OTC) 126

| | |
|---|---|
| Description: | A process in which an organization realizes revenue. |

Role/Focus/Impact

| | |
|---|---|
| Basic Criteria: 210 | Focus on reducing days sales outstanding (DSO). |
| Competitive Criteria: 212 | Monitor and focus on improving select metrics and service levels in each area of the OTC process. |
| Market Leading Criteria: 214 | Drive value through OTC by comprehensively improving customer service, working capital utilization, operating expense, and revenue/risk mix. |

Process

| | |
|---|---|
| Basic Criteria: 210 | Partially standardized processes by business segment; substantial exception processing takes place. Deeply experienced personnel relied upon to provide process and customer specific knowledge. |
| Competitive Criteria: 212 | Standardized and documented processes by business segment; limited exception processing required. Process and customer specific knowledge captured in a repository shared by all relevant personnel. |
| Market Leading Criteria: 214 | Single integrated set of standardized and documented processes across all business segments; exception processing is rare. Process and customer specific knowledge embedded within OTC systems and workflow management tools. |

System

| | |
|---|---|
| Basic Criteria: 210 | Elements of the OTC process (Order Entry, AR, Billing) integrated by single transaction processing system. |
| Competitive Criteria: 212 | Tightly integrated transaction processing system spanning the entire OTC process. |
| Market Leading Criteria: 214 | Integrated transaction processing system across OTC process supported by performance management reporting and collection workflow tools. |

Data

| | |
|---|---|
| Basic Criteria: 210 | Basic OTC reporting in place (e.g., aging analysis, unapplied cash). |
| Competitive Criteria: 212 | OTC cycle data used to perform issue root cause analysis and develop continuous feedback channels. |
| Market Leading Criteria: 214 | Detailed data used to optimize the OTC cycle, prevent issues, predict customer actions, and drive employee performance. |

Organization

| | |
|---|---|
| Basic Criteria: 210 | OTC personnel are distributed across business segments or sales organizations. |
| Competitive Criteria: 212 | Transaction processing personnel are located in low cost locations using flexible sourcing models that include the use of shared services or outsourcing. |
| Market Leading Criteria: 214 | Most OTC personnel who are not required to spend time on customer premises are managed as integrated process team(s) in low cost locations. |

Controls

| | |
|---|---|
| Basic Criteria: 210 | Manual process controls in place to comply with audit and Sarbanes Oxley (Sarbox) requirements. |
| Competitive Criteria: 212 | Basic audit and Sarbox controls are supported by systematic enforcement. Key revenue assurance controls in place. |
| Market Leading Criteria: 214 | System and process controls embedded within every aspect of the OTC process to facilitate Sarbox compliance, provide revenue assurance support, ensure accuracy, and drive data entry quality. |

Table 17 describes additional market leading criteria for capabilities within the order to cash (OTC) capability 126. Market leading criteria for 'Order to cash' capability 126 may include: improving process efficiency, eliminating break points, and enhancing customer service; reducing operating expense, improves controls, improves scalability, and improves efficiency by consolidating operations. Improves overall performance through proactive management of the OTC process; and controlling operating expense by using part-time employees.

TABLE 17

Finance & Accounting Operations 106 - Market Leading Criteria 214

| | |
|---|---|
| Order to Cash 126 | Manage OTC as an end-to-end process which integrates front office customer facing functions with back office transaction processing. |
| | Utilize flexible sourcing models that take advantage of cost reductions available by placing select staff in low cost geographic locations. |
| | Implement a formal feedback loop and continuous improvement process within the OTC process. |
| | Develop incentive structure that includes performance based compensation at the BU/department, team, and individual levels. Include incentives to manage attrition and non-monetary incentives to build team morale. |
| | Implement a relatively flat organization with high spans of control. |
| | Organize OTC staff in specialized teams based on function and/or customer segmentation. |
| | Establish clear and regular communication channels and escalation paths within the OTC operation and between OTC, Customer Care, Sales, and other related departments. |
| | Institute a robust training curriculum and program which includes initial employee training, training across disciplines (functional, technical, telephone etiquette, etc.), and training across the OTC process to enable integration and work load balancing. |
| | Establish a well defined career path for OTC staff. |
| | Implement a robust performance monitoring process which includes evaluation of both written and verbal customer communications. Performance shortfalls should be addressed directly through counseling and training. |
| | Leverage a significant number of part-time staff to perform activities such as inbound call handling and telephone collection reminders. |
| | Recognize and actively develop leadership potential of OTC leadership; consider grooming for leadership positions inside/outside OTC. |
| | Provide performance management reporting with metrics spanning the entire OTC process. Metrics should cascade from the overall operation, individual business unit/segment, team, and individual. |
| | Provide real-time access through a common front end to all required applications (where controls permit) for all OTC personnel. |
| | Implement resource forecasting and work load balancing in the OTC process; using capacity management software for large operations. |

Figure 31:
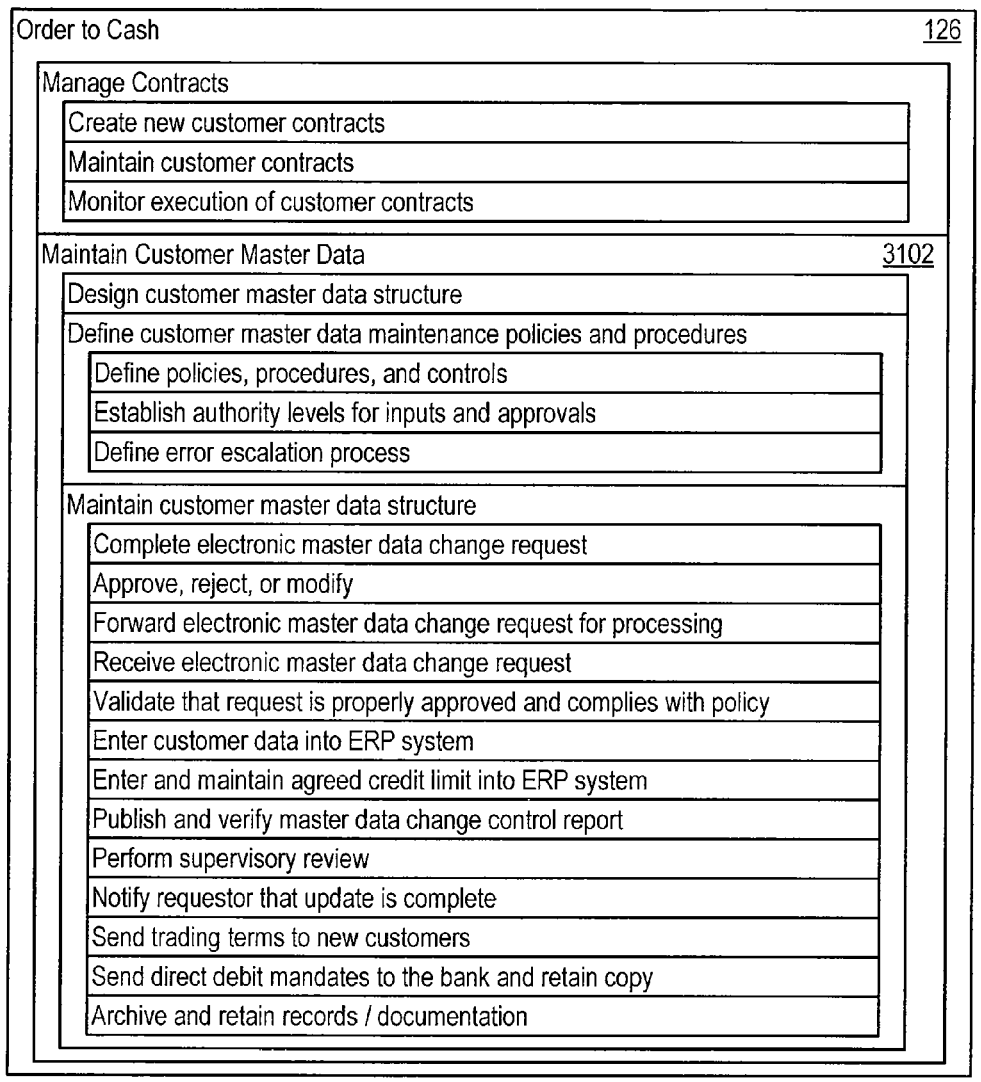
FIG. 31 illustrates additional capabilities within the 'order to cash' capability corresponding to the 'finance and accounting operations' platform.
Figure 34:
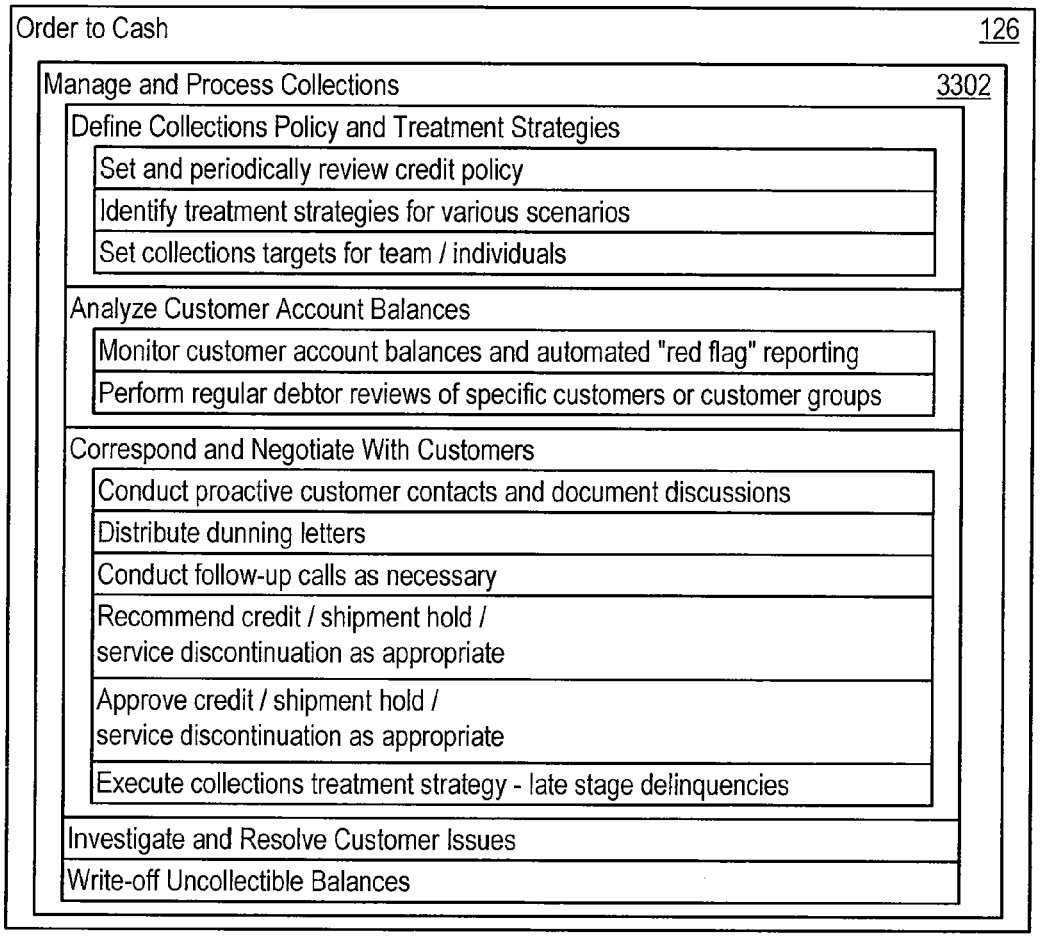
FIG. 34 illustrates additional capabilities within the 'order to cash' capability corresponding to the 'finance and accounting operations' platform.

FIGS. 30-35 illustrate capabilities within the finance process excellence framework multi-level hierarchy corresponding to the 'order to cash' capability 126. Table 18 describes additional market leading criteria for the capabilities of the order to cash capability 126, including criteria for: 'Authorize and manage credit' capability 3002 (FIG. 30); 'Manage sales orders' capability 3004 (FIG. 30); 'Maintain customer master data' capability 3102 (FIG. 31); 'Invoice customer' capability 3202 (FIG. 32); 'Maintain NR ledger and apply cash' capability 3302 (FIG. 33); 'Manage and process collections' capability 3402 (FIG. 34); and 'Manage and Process Disputes and Deductions' capability 3502 (FIG. 35).

Market leading criteria for 'Authorize and manage credit' capability 3002 (FIG. 30) may include: ensuring that the credit policy of the organization is properly enforced by confirming that the policy is clear to all parties involved; ensuring that the policy supports corporate objectives because credit risk tolerance can have a direct impact on sales and revenue; and removing conflict of interest between sales objectives and credit risk management. Credit management can be used to produce significant value but requires investment to develop and continually refine. New credit requests may be validated against current account activity, previous denials and previous write-offs, but may not be necessary for regular, high volume customers but is recommended for customers who are less established. Market leading criteria for 'Authorize and manage credit' capability 3002 (FIG. 30) may include: aligning all parts of the organization with the desired credit quality; eliminating conflicts of interest between managing credit quality and generating sales; reducing transaction process expense; reducing cycle time and transaction processing expense; reducing cycle time and transaction processing expense. Credit evaluations may be performed on all customers because gaps may exist regarding customer credit activity processed on systems owned by other organizations. Credit models may be updated regularly to reflect experience with different types of customers/organizations using both internal and external data. Market leading criteria for 'Authorize and manage credit' capability 3002 (FIG. 30) may improve customer satisfaction by simplifying the credit evaluation process. Using credit risk to differentiate treatment is a leading practice most commonly used with consumer debt but may also be applied for business customers (e.g., the customer base may include a significant small business component).

Market leading criteria for 'Authorize and manage credit' capability 3002 may include restricting risky customers to lower tier product/services until credit worthiness is proven; and limiting uncollectible charges by blocking premium tier product/services. For example, a new customer for Product Line A may already have history with Product Line B so the Product Line B data should be used in making a new credit decision. Authorize and manage credit' capability 3002 may include: improving the ability to manage credit risk by having a complete view into exposure related to a particular customer; reducing credit risk exposure by limiting fraudulent activity. Reducing credit risk exposure by limiting fraudulent activity may include: using deposits or automatic bill pay to minimize credit risk and allow the organization to do business with customers that would otherwise be turned down. Market leading criteria for Authorize and manage credit' capability 3002 (FIG. 30) may include: maximizing coverage for credit scoring and updating; and using 3rd party data to provide a broader base of information, beyond information available internally, on which to evaluate credit worthiness. Market leading criteria for 'Authorize and manage credit' capability 3002 (FIG. 30) prevents and reduces fraudulent activity such as the use of a stolen identity and/or other account information, and reduces cycle time and transaction processing expenses, and may include providing online access to information that can be used throughout the OTC process including collections.

Market leading criteria for 'Manage sales orders' capability 3004 (FIG. 30) may include implementing an integrated solution for pricing, order entry, invoicing, and credit. Accurate terms and pricing may reduce customer disputes and improve working capital utilization. Market leading criteria for 'Manage sales orders' capability 3004 (FIG. 30) provides a basic check and balance that allows the business to consciously determine when and where margin exceptions may be made rather than leaving margin decisions open to the sales force which is often incented only on sales. Market leading criteria for 'Manage sales orders' capability 3004 (FIG. 30) facilitates consistency between customer expectations and pricing that is ultimately recorded and serves to validate accuracy before producing an invoice, thereby, minimizing collection issues. Market leading criteria for 'Manage sales orders' capability 3004 (FIG. 30) may address permitted time and conditions of authorized return, price to be credited (e.g., avg. price/period or actual price), freight/handling fees, and required documentation. Market leading criteria for 'Manage sales orders' capability 3004 (FIG. 30) may ensure an organization can leverage a well defined and controlled returns process consistent w/policy, reduce errors, customer disputes, unauthorized returns, and reverse logistics processing cost. Market leading criteria for 'Manage sales orders' capability 3004 (FIG. 30) may avoid pricing discrepancies between credit memos and customer's deductions, which leads to revenue leakage and follow-up efforts.

Market leading criteria for 'Manage sales orders' capability 3004 (FIG. 30) may include: using bar-coded RMA's and hand-held scanners in the returns process. Returns screens may prompt for RMA#, SKU or UPC code, quantity, disposition and physical state of the merchandise. The RMA may be reconciled against the return to record quantity received for credit. Market leading criteria for 'Manage sales orders' capability 3004 (FIG. 30) may reduce cycle time and improve error prone data entry and credit processing typically associated with a paper-based returns process, and support monitoring what is approved as a return versus what is actually received as a return. Market leading criteria for 'Manage sales orders' capability 3004 (FIG. 30) may include monitoring cycle time and total credit exposure.

Market leading criteria for 'Manage sales orders' capability 3004 (FIG. 30) may include: providing customers a way to generate their own orders on-line or via EDI. The selection criteria for product quantities may be tied to what can be shipped, and credit cards may be accepted. Market leading criteria for 'Manage sales orders' capability 3004 (FIG. 30) may include: reducing cycle time and transaction processing expense; eliminating many ordering errors including those that require follow-up calls to customers; and allowing for reduction in DSO with credit card payment. Market leading criteria for 'Manage sales orders' capability 3004 (FIG. 30) may include: incorporating a web-enabled or system look-up to show stock availability into the order process; providing a web-enabled site for a quick reference to determine when a backordered product may be available; and providing customers the option to receive an e-mail alert when stock is available, thereby eliminating the need for the customer to periodically check product availability. Market leading criteria for 'Manage sales orders' capability 3004 (FIG. 30) may include: implementing online and/or e-RMA solutions that enable return requests to be submitted over the Internet on customized forms and allow the return to be linked to the original order; providing real-time reporting on the products returned, the reasons and sources of returns; increasing control and policy compliance to reduce credit discrepancies; coordinating with key customers to reduce errors and miscommunication; and reducing cycle time and disputes.

Market leading criteria for 'Manage sales orders' capability 3004 (FIG. 30) may include: reduces working capital requirements; employing electronic catalogues to facilitate customer awareness of broader product offerings; maintaining appropriate training of order entry personnel, so that companies may sell upgrades and/or additional services that might be appropriate for the customer; requiring small customers to adhere to price schedules, while allowing key customers to leverage volume discounts; establishing long term contracts to "lock in" customers as opposed to continuous renegotiating; preventing pricing discrepancies and associated rework to correct customer accounts. Longer term contracts may reduce the amount of time and the effort spent to renegotiate and ensure continued sales for a longer period of time. Market leading criteria for 'Manage sales orders' capability 3004 (FIG. 30) may include: establishing order entry system validations to ensure accurate information is captured at the time of order entry and/or shortly after order submission (e.g., units of measure, reasonable quantities based on historical/average purchases, payment terms, ship to address, and customer number); preventing incomplete orders from being processed and/or occurring unless all relevant data is captured at the time of order entry. Upfront validation increases control, improves quality of data and reduced rework and questions from warehouses and collections. Market leading criteria for 'Manage sales orders' capability 3004 (FIG. 30) may include: implementing a link between the order entry and the warranty system (e.g., to verify that the customer requesting a part under warranty actually purchased the system for which the part is required) and thereby reducing ordering errors and eliminating the majority of unauthorized warranty claims. Market leading criteria for 'Manage sales orders' capability 3004 (FIG. 30) may include: preventing pricing discrepancies and associated rework to correct customer accounts; providing electronic order notifications and advanced shipping notifications to customers to confirm what has been ordered, the price that will be billed, and validate orders quickly before the shipment is released, rather than relying on back-end disputes to identify discrepancies. Market leading criteria for 'Manage sales orders' capability 3004 (FIG. 30) may include: implementing automated methods (e.g., auto-fax, auto e-mail, and/or web-portal) that provide the customer the ability to review the order details without manual print and faxing; integrating fax purchase orders with OCR software to semi-automate the order entry process; and electronically storing for future research, inquiries and quality audits orders where OCR is not an option (e.g., images of each faxed purchase order), where customers are unwilling and/or unable to transmit purchase orders electronically.

Market leading criteria for 'Maintain customer master data' capability 3102 (FIG. 31) may include: enabling customers to track their own orders, shipment details, and history on the internet, using a unique customer number and order reference number for each purchase and thereby reducing manual inquiries and increasing customer satisfaction. Market leading criteria for 'Maintain customer master data' capability 3102 (FIG. 31) may include: increasing control over price changes; managing inventories across corporate boundaries; integrating purchasing, manufacturing operations, logistics, invoicing, claims, returns, and backlog management; increasing communication across divisions; and implementing integrated management of product and customer relationships up and down the supply chain.

Market leading criteria for 'Maintain customer master data' capability 3102 (FIG. 31) may include: minimizing integration issues by using consistent nomenclature across business areas and systems; providing the basis to perform analysis on total credit exposure; ensuring that the organization can seamlessly serve customers at both the parent and child levels. Customer information may be captured at the beginning of the process rather than in arrears so as to avoid processing errors, reduce communication challenges, and improve analytical capabilities by having one customer master entry per customer. Market leading criteria for 'Maintain customer master data' capability 3102 (FIG. 31) may include: increasing agent efficiency and improving the customer experience by quickly retrieving relevant data using whatever information the customer is readily able to present; avoiding future issues by confirming correct customer account details; reducing fraud generated by identify theft and using information to aid the collections process and any potential skip tracing requests; and improving customer communications to improve working capital utilization and the customer experience.

Market leading criteria for 'Invoice customer' capability 3202 (FIG. 32) may include: minimizing integration issues by using consistent nomenclature across business areas and systems; providing the basis to perform analysis on total credit exposure. 'Invoice customer' capability 3202 (FIG. 32) may ensure that the organization can seamlessly serve customers at both the parent and child levels. Market leading criteria for 'Invoice customer' capability 3202 (FIG. 32) may include: implementing electronic delivery (e.g., EDI, email, and self-service options); reducing disputes and improving working capital utilization, which is particularly important in high volume operations; ensuring ensure customers know where/who to contact when facing a billing issue, rather than letting an issue turn into a collections problem. Information access is critical for managing credit risk, collections, and resolving customer disputes. Fees may include reactivation, NSF check charges, and late fees.

Market leading criteria for 'Invoice customer' capability 3202 (FIG. 32) may reduce operating expense, fosters accuracy and consistency in revenue recognition, and aid in achieving revenue recognition compliance across the organization. Market leading criteria for 'Invoice customer' capability 3202 (FIG. 32) may reduce fraud generated by identify theft, aid in the collections process and any potential skip tracing requests. Market leading criteria for 'Invoice customer' capability 3202 (FIG. 32) may enable the organization to provide more clear and effective customer communications that in turn improves working capital utilization and the customer experience, and promotes quality and consistency in the data masters.

Market leading criteria for 'Invoice customer' capability 3202 (FIG. 32) may include: placing credit as an approval step when changing customer financial information, which may facilitate managing the credit exposure of an organization. Market leading criteria for 'Invoice customer' capability 3202 (FIG. 32) may improves efficiency across the OTC process by making information easier to locate and reduce complication in supporting IT systems.

'Maintain A/R ledger and apply cash' capability 3302 (FIG. 33) may include: reducing cycle time and transaction processing expenses; improving working capital utilization; establishing predictability with bad debt reserves; ensuring the availability of source document and information to improve efficiency, reduce cycle time, transaction processing expense and improve customer service; improving working capital utilization. 'Maintain A/R ledger and apply cash' capability 3302 (FIG. 33) may reduce AR transaction processing expense by leveraging low cost labor markets and provide visibility to the most current balances to be used by credit, collections, billing, and disputes. 'Maintain A/R ledger and apply cash' capability 3302 (FIG. 33) may provide visibility to short payments to pinpoint areas where preventative measures can be pursued, maintain a clean AR ledger and reduce customer service issues by providing a current view of the account. 'Maintain A/R ledger and apply cash' capability 3302 (FIG. 33) may improve working capital utilization and reduce operating expense by developing solutions to correct cash posting issues rather than leveraging staff to continually resolve.

Market leading criteria for 'Manage and process collections' capability 3402 (FIG. 34) may include: employing multiple servicing locations based on language requirements; ensuring that collectors have complete and accurate information when discussing collection issues with the customer;

providing the information in a condensed format to improve collector efficiency and average handle times. Market leading criteria for 'Manage and process collections' capability 3402 (FIG. 34) may reduce cycle time and process expenses, provide the ability to leverage low cost channels for certain customer segments and risk profiles, improve working capital utilization and reduce transaction processing expenses. Market leading criteria for 'Manage and process collections' capability 3402 (FIG. 34) may improve operating expense and collector efficiency by reducing wasted processing, and improve working capital utilization and reduce transaction processing expenses. Market leading criteria for 'Manage and process collections' capability 3402 (FIG. 34) may include: implementing metrics that cascade down from aggregate level, BU/product/service line, geography, team, and individual collector. Market leading criteria for 'Manage and process collections' capability 3402 (FIG. 34) may include: measuring the performance of collectors based on the reduction in bad debt and cash collected rather than on number of customer contacts made; reviewing the number of contacts when the collector is not meeting cash collection targets; providing visibility into which segments and/or accounts drive DSO. Market leading criteria for 'Manage and process collections' capability 3402 (FIG. 34) may include: prioritizing based on aging bucket, balance, segment, targeted collection campaign and/or other criteria; allowing collectors to address issues within certain parameters to improve customer satisfaction and/or retention; actively monitoring and adjusting differentiated treatments to optimize results and costs for each strategy.

Market leading criteria for 'Manage and process collections' capability 3402 (FIG. 34) may include: requiring collectors to increase severity and use of a stronger tone as the debt ages and gets harder to collect. Market leading criteria for 'Manage and process collections' capability 3402 (FIG. 34) may prevent debt from moving to late stage delinquency and becoming uncollectible. Market leading criteria for 'Manage and process collections' capability 3402 (FIG. 34) may include: modifying a treatment (e.g., manner of handling delinquency) when the customer provides an indication that the current form of treatment may not be successful. Market leading criteria for 'Manage and process collections' capability 3402 (FIG. 34) may maximize the use of collector time and efforts, ensure the account progresses through the treatment cycle and use PTPs to help improve cash forecast accuracy and use these as a key input to driving collector performance. Market leading criteria for 'Manage and process collections' capability 3402 (FIG. 34) may include: improving collections by having specific tasks performed by organizations (e.g., SSC and/or BPO) where such tasks are core competencies. Market leading criteria for 'Manage and process collections' capability 3402 (FIG. 34) may include: improving collections performance by using groups specializing in specific types of collections; and keeping AR ledger clean, and avoiding spending additional time and/or expense on balances that cannot be collected. Market leading criteria for 'Manage and process collections' capability 3402 (FIG. 34) may include: making a final attempt to collect internally to avoid external agency fees; and designing and implementing the 'Manage and process collections' capability integrated with the overall telephony infrastructure; supported by a call monitoring/recording tool in medium to high volume operations; routing calls to reduce operating expense; providing targeted coaching and frequent adjustments; and evaluating a cost/benefit analysis of the capability to establish parameters for which accounts are contacted proactively.

Market leading criteria for 'Manage and process collections' capability 3402 may include: implementing call scripting embedded in training and/or provided through a call scripting tool; implementing automated tools to improve agent call performance; systematically analyzing and adjusting treatment strategy to improve collections effectiveness; reducing operating expense by capturing PTPs in an automated fashion.

'Manage and Process Disputes and Deductions' capability 3502 (FIG. 35) may include: managing the quantity of potential deductions and/or disputes by clear communication and strict adherence to policy; and establishing a standard set of reason codes, rather than free form text, provides a solid basis by which reporting and analysis can be performed on issues occurring in the OTC cycle. Breakdowns in the OTC process often manifest themselves as a customer deduction and/or dispute and may be recurring issues. 'Manage and Process Disputes and Deductions' capability 3502 (FIG. 35) may include: eliminating and/or reducing customer deduction and/or disputes by tracking, evaluating and correcting such deduction and/or disputes.

Overall margins can be eroded when agents offer adjustments that exceed desired limits (e.g., offering a $100 adjustment for a customer that generates $50 in margin annually). 'Manage and Process Disputes and Deductions' capability 3502 (FIG. 35) may include: conducting training to develop the specialized skill of exception handling; and creating a focused, highly skilled team may shorten the resolution cycle time which may drive improved customer satisfaction and working capital utilization. Manage and Process Disputes and Deductions' capability 3502 (FIG. 35) may include: requiring personnel familiar with deduction/dispute issues categorizing and reporting to perform task in order to facilitate consistency in reporting and categorization; conducting and communicating Top 10/Top 20 Reason Code and by Customer analysis to relevant parties (e.g., Sales, Collections and Management).

Market leading criteria for 'Manage Customer Requests and Inquiries' capability 3504 (FIG. 35) may include: reducing operating expense and improve customer satisfaction by automating the handling of routine inquiries with IVR so that staff are able to focus on exception items and analysis; providing a toll-free and/or local phone number to customers to facilitate access to key order shipment information. Market leading criteria for 'Manage Customer Requests and Inquiries' capability 3504 (FIG. 35) may include: utilizing phone numbers by country to enable routing of calls with common language preferences; reducing the need to contact the customer multiple times for the same request; dedicating personnel to 'Manage Customer Requests and Inquiries' capability may develop an efficient and consistent way of handling customer inquiries and/or requests.

Market leading criteria for 'Perform Revenue Assurance Activities' capability 3506 (FIG. 35) may include: driving the increase revenue and improve working capital utilization; while reducing fraud. Market leading criteria for 'Perform Revenue Assurance Activities' capability 3506 (FIG. 35) may involve varying sources of revenue by industry, switch (e.g., telecommunications), meter (e.g., utilities), and point of sale (e.g., products).

TABLE 18

| Order to Cash 126 - Market Leading Criteria 214 | |
|---|---|
| Authorize and Manage Credit 3002 | Credit policy is clearly defined, monitored, communicated and operationalized. |
| | Credit policy supports the sales and marketing strategy, corporate vision, and financial goals. |
| | Credit decision and maintenance functions separated from Sales organization. |
| | The value provided by credit scoring is widely accepted in the organization and model development receives appropriate funding |
| | Develop internal tracking of positive and negative events to use during the credit approval process. |
| | Establish regular credit line reviews throughout entire customer lifecycle. |
| | Encourage appropriate credit quality by linking sales/staff compensation to net portfolio profitability. |
| | Online credit applications available to customers and/or sales force to submit new requests which are tracked and have online status available until decided. Utilize Optical Character Recognition (OCR) when paper forms are required. |
| | Allow customers to submit self-service requests for credit line changes. |
| | Allow immediate approval for customers with good previous history. |
| | Credit decisions span all customer acquisition channels including affiliates, resellers, points of sale, kiosks, etc. |
| | Automate credit analysis and initial credit line approval using rule-based decision support capability which is regularly updated. |
| | Provide an initial credit approval process which meets customer expectations as being logical and straightforward. |
| | Accounts assigned a risk score which is used to differentiate treatment/handling throughout the customer lifecycle. |
| | Multiple tiers of credit approval supported. |
| | Where customers have activity across multiple business units or product lines, use data from all available sources to make credit decisions. |
| | Monitor total customer credit exposure including subsidiary activity, child accounts, and activity across product lines. |
| | Systematic review of selected accounts, particularly high risk accounts, for abnormal activity. |
| | Optimize the balance of credit risk and revenue/market share by using risk adjusted pricing, offerings, and terms to do business profitably with customers having lesser credit quality. |
| | Use of external alert notification to trigger action based on changes in customer information. |
| | Use of waterfall methodology employing multiple credit bureaus |
| | Exchange data with outside credit bureaus and 'negative database' for credit information, bad debt, fraud, etc. |
| | Utilize fraud and positive identification systems to support the credit risk management. |
| | Identify during credit evaluation any new account requests where the customer has an existing parent/child record in the customer master. |
| | Automatic credit line increase/decrease initiated based on continuous monitoring of internal/external activity (behavior scoring). |
| Manage Sales Orders 3004 | Quote and order management systems are integrated with current and accurate terms/pricing master which can be quickly and easily updated. |
| | Establish target profitability guidelines and ensure customer quotes meet those guidelines; unless exceptions have been approved through a controlled process. |
| | Manage all customer quotes in a system with appropriate version control and history. |
| | Communicate full terms of sale in customer communications including product brochures (where possible), quotes, deal sheets, the contract, and other sales materials. |
| | Standard terms are defined by policy and deviation is approved/monitored including those involving special pricing, promotions, payment terms, returns policy, late fees, etc. |
| | Use consistent format/information to communicate with both customers and the order entry team. Information going to the order entry team should contain the necessary information to accurately record revenue. |
| | Confirm upon receipt that customer purchase order is consistent with pricing and terms of sale and that information is consistent with published standards. |
| | Return policy is enforced and utilizes a process that minimizes complexity. |
| | Bar-coded RMA's (return merchandise authorization) received with handheld scanners |
| | Provide real-time visibility to pending orders. |
| | Maximize use of paperless ordering including internet and electronic data interchange (EDI). |
| | Provide real-time inventory data to sales, order entry, and customers (where appropriate). |
| | Online returns authorization process |
| | Order management maintains complete and updated documentation to comply with requirements of key customers. |
| | Utilize and automated replenishment capability to help minimize required on hand inventory. |
| | On-line electronic catalogs |
| | Utilize customer insight and product training for agents to cross-sell and up-sell at time of order. |
| | Customize pricing strategy by customer segment (where allowed). |
| | Perform reasonableness validation/alerts. |
| | Implement a direct link between the order entry system and the warranty system. |
| | Alert notification process to proactively identify price changes that occur for orders that are in progress. |
| | Automated customer notification |
| | Image and/or digitize paper based or faxed purchase orders using Optical Character Recognition (OCR). |
| | On-line self service order tracking |
| | Reports to monitor price overrides are monitored and related approvals are tracked. |
| | Organize around supply chain management concept (true end-to-end process). |
| Customer Master Data 3102 | Develop consolidated customer master which uses a standard naming/number convention and contains all essential customer attributes including addresses, credit score, and payment terms. |
| | Support customer parent/child relationships in the customer master and any supporting systems. |
| | Collect and store necessary customer information and demographics before or during the order entry process. |
| | Develop customer segmentation methodology can capture appropriate attributes in the customer master. |
| | Implement duplicate account edits which are executed during account setup and perform periodic duplicate account reviews. |
| | Customer service representatives have multiple search mechanisms (e.g., account number, account name, phone, invoice number, etc.) available to access customer data. This data should be integrated seamlessly to customer account/history. |
| | Conduct an account verification/approval upon completing customer account setup. |
| | Include customer identification as part of account setup and verification. |
| | For consumer driven organizations, collect customer identification such as drivers license number, government ID, employer, bank account and other information. |
| | Flag the customer master with the primary language to be used in written/oral communications with the customer. |
| Invoice Customer 3202 | Develop consolidated customer master which uses a standard naming/number convention and contains all essential customer attributes including addresses, credit score, and payment terms. |
| | Support customer parent/child relationships in the customer master and any supporting systems. |
| | Collect and store necessary customer information and demographics before or during the order entry process. |
| | Develop customer segmentation methodology can capture appropriate attributes in the customer master. |

TABLE 18-continued

Order to Cash 126 - Market Leading Criteria 214

| | |
|---|---|
| | Implement duplicate account edits which are executed during account setup and perform periodic duplicate account reviews. |
| | Customer service representatives have multiple search mechanisms (e.g., account number, account name, phone, invoice number, etc.) available to access customer data. This data should be integrated seamlessly to customer account/history. |
| | Conduct an account verification/approval upon completing customer account setup. |
| | Provide standard, automatically consolidated invoice formats which are utilized across customers, business units, geographies, languages, and product/service lines. |
| | Identify and document a set of standard, automatically executed billing triggers. |
| | Invoices should be clear, intuitive, comprehensive, and legible when scanned. |
| | Provide ability to delivery invoices electronically and incent customers to accept electronic delivery. |
| | Proactively confirm that the first invoice sent to a customer meets their processing requirements and contains the correct customer/billing information. |
| | Balance/spread billing cycles throughout the period rather than batching and issuing invoices all at once. |
| | Invoices and statements carry contact number with specific contact name. For high volume operations, the number should be listed (no name) and that number staffed for rapid answer. |
| | Provide on demand, online access to historical billing/volume information containing at least 12 months history. |
| | Billing system allows for automatic charge of special fees. |
| | For printed invoices, control reports should be put in place to ensure all expected invoices are printed. |
| | Invoicing is done on the same day as product shipment or service delivery (where appropriate for the business model). |
| | Approvals/routing for credit memos, rebilling, and invoice adjustments are workflow enabled. |
| | Utilize bulk mailing solutions to minimize mail costs. |
| | Establish clear, well defined revenue recognition guidelines. |
| | Provide revenue recognition training across the organization including executives and sales force. |
| | Include customer identification as part of account setup and verification. |
| | For consumer driven organizations, collect customer identification such as drivers license number, government ID, employer, bank account and other information. |
| | Flag the customer master with the primary language to be used in written/oral communications with the customer. |
| | Establish system enforced controls that limit which personnel have access to change master data. |
| | Financial oriented changes to customer accounts should be routed through the Credit function for approval. |
| | Establish and adhere to a clearly defined account purge policy. |
| Maintain A/R Ledger and Apply Cash 3302 | Maximize use of electronic payment channels including credit/debit card, automated bill pay, internet and EDI. |
| | Provide automated posting of electronic payments. |
| | Paper based cash receipts processed through consolidated lock box network and posted electronically. |
| | Paper documents including remittances and credit/debit memos are scanned and stored for electronic retrieval by those involved in the OTC process including customer care, sales, finance, etc. |
| | Complete periodic lock box studies to maintain best geographic distribution and/or mail times. |
| | Automated cash application algorithms and OCR technology used to electronically match payments to invoices. |
| | Utilize low cost shared service center or outsourcer to handle manual cash application, research unapplied cash, and resolve cash posting exceptions. |
| | Automate cash discount earned/unearned transactions at time of cash application. |
| | Payments, credits, and adjustments applied to customer balances real-time or, at a minimum, on day of receipt. |
| | Financially incent customer behavior. Offer early invoice discounts strategically for high value customers that pay late and/or require collections activity. Apply late fees and penalties for those who pay beyond terms. |
| | Utilize product holds and other operational enforcement to help shape customer behavior when late payment is recurring. This capability should be enabled through an integrated transaction processing system. |
| | Customer short payments/deductions set up as unique new items versus being set only as a short pay which are passed to a group that specializes in handling exceptions. |
| | Allow for systematic removal of small balances (invoice or account level) due to incorrect amount remitted. Maintain edit/audit control reporting to indicate any abuse. |
| | Where the customer is also a vendor, net refunds/rebates against outstanding accounts payable (if mutually agreed). |
| | Clear unapplied cash on a daily basis. |
| | Track and analyze root causes of unapplied cash or exception payments to provide the basis for developing corrective/preventative solutions. |
| | Bad debt reserves policy and calculation is based on historic revenue and charge off experience. |
| Manage and Process Collections 3302 | Perform collections from a consolidated servicing location(s) supporting multiple business units, product/service lines, and geographies. |
| | Provide collector with complete customer account information including contact/correspondence history, account activity, and customer invoices (preferably in the exact format seen by the customer). Minimize the number of screens necessary to display this information to the collector. |
| | Provide self-service capabilities (e.g., internet, IVR) that allow customers to access account information, view information on commonly asked questions, review terms of sale, initiate questions, resolve issues, track invoice status, and review account documentation. |
| | Develop multiple channels to contact customer including direct mail, email, voice mail, SMS, and live agents. |
| | Provide multiple payment channels including automated bill pay, direct debit, electronic bill presentment, internet, electronic check, and personal/corporate credit card. |
| | Integrate collections system with AR such that payments can be recognized real-time in the collections system. |
| | Incent customers to adopt automated bill payment methods. |
| | Create a collections reporting dashboard that provides daily and/or weekly metrics from aggregate level down to individual collectors. This information should be shared with the collections team members as well as business owners supported by the team. |
| | Team/Collector performance metrics based on effectiveness rather than throughput measures. |
| | Throughput measures should be used to investigate effectiveness shortfalls. |
| | Collection metrics should be aligned with overall corporate/departmental strategy and objectives. |
| | Measure/monitor average days to pay/average days late for all customer segments with drill down to individual accounts. |
| | Collector workstation should organize and prioritize collectors work based on criteria defined by the management team. |
| | Collections staff should be empowered with well-defined and appropriate approval authorities for write-offs, settlements, collections expenses, and settlements. |
| | Defined collection treatment cycles should be tailored based on: type of customer (e.g., personal vs. corporate), risk classification, historical behavior, and other groupings (e.g., industry classification). These should be updated on a periodic basis. |
| | Dunning letters and other customer contacts should demonstrate an intensity that appropriately reflects that stage of the debt and current customer relationship. |
| | Offset customer overpayments/rebates/credits against any outstanding balances. |
| | Offer early pay incentives (monetary or non-monetary) to drive timely payment. |
| | Collectors should be trained to focus on "curing" the account as a top priority. |

TABLE 18-continued

Order to Cash 126 -
Market Leading Criteria 214

| | |
|---|---|
| | Focus time and a portion of the organization's best collectors on earlier stage delinquencies; particularly large balances. Transfer collections activities between stages based on events rather than elapsed time. Outstanding debt pursued by "total account" rather than by each invoice. A follow up action is created based on the outcome of each collections contact. Capture promises to pay (PTPs) in the collections tool and use that information to establish the next collections action, to help formulate cash flow reporting, and to monitor collector performance. Leverage outside collection agencies (OCAS) for small balance collections, recoveries, legal, and skip tracing using criteria which includes skill specialization, regional presence, scalability and performance. Utilize multiple OCAS to create competition and comparability. Incent the OCAS with additional volume rather than cash bonuses. Automated transfer of accounts to external OCAS or legal services, according to collection policy. Allow automatic write-off for uncollectible balances/accounts up to a pre-defined level, if treatment is unsuccessful. Use properly experienced staff to address hard to collect accounts as a final step prior to outside collections placement. Route multiple incoming phone numbers to consolidated servicing location(s) using the actual numbers to drive call handling and priorities. Minimize call transfers and call backs required. Transferred calls should carry forward the current state of the customer inquiry. Live inquiries initiated from an IVR or other self service tool should pass details from the self-service tool to the agent. Management monitors/samples actual collection contact calls on a regular basis to assess interaction, approach, performance and to provide agent coaching. Automated call distribution (ACD) used to route calls. Establish daily/weekly cash targets for department, group, individuals. Provide technology for collectors to accept credit cards, electronic checks, and other forms of immediate payment during a customer contact. Use proactive customer calls for larger accounts/invoices and habitually past due customers. Charge bad debt losses against salesperson commissions. Maintain collector alignment by customer whenever possible. Provide multi-lingual support for phone contact and correspondence as necessary. Utilize caller identification and computer telephone integration (CTI) to route inbound calls and automatically retrieve customer information. Utilize Automatic Number Identification (ANI) to capture potential contact numbers for delinquent/written off accounts. Leverage a predictive dialer to improve agent utilization; include use of agentless jobs and answering machine detection to leave automated messages regarding delinquent accounts. Blend the dialer to handle inbound and outbound calls simultaneously. Use call scripting specific to each call type to assure proper steps, actions, and follow through are taken. Automate evaluation and scoring of collector performance on live customer calls. Behavioral scoring system utilized to automatically assign treatment strategy based on historical customer behavior. Adaptive modeling used to continually test and modify the results of various treatment strategies. Leverage advanced ACD functionality including skill based call routing, load balancing, announcements, messaging, and priority inquiry handling. IVR enabled to accept promise-to-pays (PTP) and update the customer account record. Transfer call to a live agent if the PTP is too low or promise date is too far out. Automate collection contacts for initial past due contact for appropriate customer segments using email, letter, or voice blast. Utilize "scoring" in collection agency selection to identify which agency is most effective on which types of accounts. Voice mail/voice blast capability in place to remind customers of overdue balances. Accounts in an advanced state of collections are routed directly to the collections center when they contact the organization for product or service. Automatically reinstatement of services for accounts when minimum thresholds for payment have been reached or adjustments made. |
| Manage and Process Disputes and Deductions 3502 | Set clear policy and enforcement on disputes/deductions for documentation and time period accepted. Identify and define a standard set of reason codes to be assigned to all disputes/deductions. These codes, along with other information about the account (e.g., geography) should be used to determine the issue routing patch and expected resolution timeframe. Formulate a continuous improvement activity/function that uses customer inquiry/dispute data to perform root cause analysis to implement resolutions. Assign clear accountabilities and timeframes for the escalation and resolution of customer deductions/disputes; with some portion of compensation linked to deduction/dispute metrics. Authorize customer service and/or collection agents to resolve deductions/disputes on a real-time basis, within a certain pre-defined limit. Establish adjustment guidelines which link adjustment levels with the economic value of the customer. Establish a separate function/group responsible for exception handling and resolution. Exception management function is responsible for determining dispute/deduction reason code based on documentation and/or specific actionable knowledge. Notify customers in advance of netting credit memos against outstanding AR. Leverage a tool designed specifically for the purpose of deduction/dispute handling including the ability to identify, categorize, track, report, workflow, escalate, and close customer exceptions. Implement exception reporting which shows number of occurrences and financial exposure to be used in analyzing root cause, customer concentrations, trends, and resolution performance. |
| Manage Customer Requests and Inquiries 3504 | Maximize the use of self-service using a customer portal to provide online bill presentment, online payment options, transaction history, dispute handling, copies of documents (e.g., invoice, proof of delivery, purchase order, contract), submit requests, answer FAQs, etc. Integrated voice response (IVR) for routine customer inquiries Toll-free/local phone number for order claims and inquiries Capture during the initial customer inquiry/request all information necessary to categorize, route, and resolve the inquiry Establish an inquiry handling function or help desk as a distinct function within the OTC process |

Figure 37:
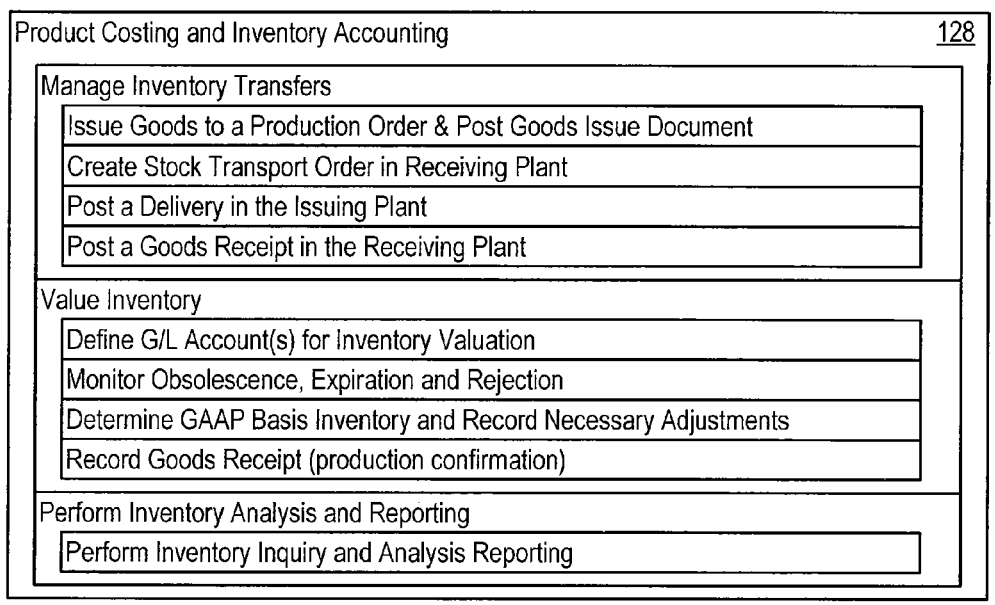
FIG. 37 illustrates additional capabilities within the 'product costing and inventory accounting/capability corresponding to the 'finance and accounting operations' platform.

FIGS. 36-37 illustrate capabilities within the finance process excellence framework multi-level hierarchy corresponding to the 'product costing and inventory accounting' capability 128. Each capability within the 'product costing and inventory accounting' capability 128 may include one or more key assessment areas and corresponding performance capability criteria.

Table 19 provides an explanation of the 'maintain finance systems and data structures' capability 132, key assessment areas within the capability and corresponding performance capability criteria.

TABLE 19

Maintain Finance Systems and Data Structures 132

| | |
|---|---|
| Description: | Refers to the maintenance of finance data structures and finance systems. |

Data Structure

| | |
|---|---|
| Market Leading Criteria: 214 | Formal enterprise data model (x-functional, financial and non-financial, internal and external); consistent data definitions; high data quality and integrity |

Performance Language

| | |
|---|---|
| Market Leading Criteria: 214 | Common performance language across the enterprise; robust and consistent definitions for metrics, measures, and info requirements; no debate about common measures such as "customer" or "headcount"; formal templates, formulas, & guidelines for recurring analyses |

Data Governance

| | |
|---|---|
| Market Leading Criteria: 214 | Centralized data governance and control; formal policy and procedures |

Systems Architecture

| | |
|---|---|
| Basic Criteria: 210 | Multiple ERP and legacy systems; numerous point-to-point interfaces; spreadsheets and/or various stand alone applications dominate planning, forecasting, data analysis, and reporting activities; no web enablement |
| Competitive Criteria: 212 | Single ERP system, but with exceptions; some legacy systems not yet decommissioned; best of breed extensions (e.g., data warehouse, planning/forecasting) not fully integrated and/or deployed inconsistently; spreadsheets still tool of choice |
| Market Leading Criteria: 214 | Single ERP system used worldwide; essentially no legacy systems; integrated best of breed extensions (e.g., data warehouse, planning/forecasting) consistently used; spreadsheets as "supplements" only; web connections to customers, suppliers, and partners; automated work flow |

Information Access

| | |
|---|---|
| Market Leading Criteria: 214 | Automated information access and delivery |

FIG. 38 illustrates capabilities within the finance process excellence framework multi-level hierarchy corresponding to the 'maintain finance system and data structure' capability 132. Table 20 describes additional market leading criteria for capabilities within the 'maintain finance system and data structure' capability 132. 'Maintain finance system and data structure' capability 132 may include: 'Maintain Enterprise Data Model; Perform Data Governance Activities' capability 3802; and 'Maintain Integrated Finance Information Technology Architecture' capability 3804.

Market leading criteria for 'Maintain Enterprise Data Model; Perform Data Governance Activities' capability 3802 may include: implementing a cross functional data model that supports financial and non-financial internal and external; centralizing ownership to achieve and maintain a standardization and consistency; ensuring that corporate controls all master data changes; leveraging formal request template, approval structure, central control, and policy; and defining specific standards that must be met in order to perform a particular operation (e.g., add a new account and cost center); ensuring that all master data elements are used consistently by all entities within the enterprise and use the identical definition; maintaining the master data information in an easily accessible "data dictionary" (e.g., data elements such as customer, product, project, geography, market, contract type, pricing level, and channel). For example, data structures should accommodate an acquisition and/or an internal restructuring without significant manual effort to "move data around". Market leading criteria for 'Maintain Enterprise Data Model; Perform Data Governance Activities' capability 3802 may include: designing financial performance language (e.g., terms and metrics) that support the key business objectives of the organization; identifying KPIs by which the organization desires to operate the business; designing the financial performance language to enable reporting by the KPIs of the business. Multiple vendor records can lead to inaccuracies in tracking and managing individual vendor activity. Separate records can also lead to separate contracts with different prices and payment terms for identical items. Structured parent-child relationships allow companies to address the situation where they deal with multiple entities within the same vendor company. Market leading criteria for 'Maintain Enterprise Data Model; Perform Data Governance Activities' capability 3802 may include: providing major ERP vendors robust vendor master data management capabilities to efficiently produce visibility into global purchasing commitments, spend, and payables balance for each supplier and to maximize buying power and prevent duplicate payments. Market leading criteria for 'Maintain Enterprise Data Model; Perform Data Governance Activities' capability 3802 may include: employing consistent nomenclature across business areas and systems; providing the basis to perform analysis on total credit exposure and customer segmentation in reporting, analysis, and collections; employing robust and consistent definitions for all key metrics, assets, and decision support information requirements; defining unit of measure, formula, data source, frequency, and dimensions; and ensuring consistent use of a performance language dictionary to eliminate or minimize debate about straightforward measures. For example, implement a standard "make vs. buy" analysis template and/or a standard "capital project approval request" document.

Market leading criteria for 'Maintain Integrated Finance Information Technology Architecture' capability 3804 may include: leveraging a single ERP system across all geographies and business units. A complex IT architecture is a significant driver of cost (e.g., excess data gathering, reconciliation, data entry, and IT maintenance) and a barrier to optimized process design. Market leading criteria for 'Maintain Integrated Finance Information Technology Architecture' capability 3804 may include: employing best of breed data warehouse and planning, reporting and analytic tools superior to the functionality offered within ERP systems; and integrating the tools with the ERP system; implementing online, dashboard style presentation of key data; customizing dashboards for all key executives and delivered directly via the financial systems; implementing dashboards with simple user interfaces; ensuring the use of single, best of breed reporting and analysis application consistently throughout the organization; and ensuring the use of spreadsheets are used as "supplements" rather than primary finance analysis tools.

TABLE 20

Maintain Finance Systems and Data Structures 132 - Market Leading Criteria 214

| | |
|---|---|
| Maintain Enterprise Data Model; Perform Data Governance Activities 3802 | Maintain formal enterprise data model<br>Maintain master data centrally<br>Adopt a formal master data add/change/delete process and policy<br>Ensure consistent data definitions for all master data<br>Data structure should support multi-dimensional profitability analysis for all relevant dimensions |

TABLE 20-continued

Maintain Finance Systems and Data Structures 132 - Market Leading Criteria 214

| | |
|---|---|
| | Integrate processes and controls to maintain/improve integrity of data and quality of outputs |
| | Data models should be flexible to change as the business/organization does |
| | Leverage a single, standardized, comprehensive code block across the enterprise |
| | Clearly define the relationship between corporate and local chart of accounts |
| | Align the master data structure/language with the way management wants to run the business |
| | Reporting requirements should drive the development of the code block |
| | Simplify and focus the code block - each element should be clearly defined and used solely for that purpose across the organization and each element should have an expressed reporting/transaction capture purpose |
| | Design flexibility into the code block to support future requirements |
| | Use non-intelligent/non-hierarchical codes in the code block |
| | Support flexible, user-definable rollups |
| | Rationalize the number of cost centers, profit centers, and legal entities |
| | Continually assess/monitor/revise company cost center structure |
| | Centralized control and maintenance of the vendor master file |
| | Maintain a single, global vendor master; maintain a single record for each vendor |
| | Support customer parent/child relationships in the customer master and any supporting systems. |
| | Employ standard vendor naming convention |
| | Perform formal vendor database clean-up on a recurring basis |
| | Vendor master file should accurately reflect terms negotiated by purchasing |
| | Implement duplicate account edits which are executed during account setup and perform periodic duplicate account reviews |
| | Develop consolidated customer master which uses a standard naming/number convention and contains all essential customer attributes including addresses, credit score, and payment terms. |
| | Support customer parent/child relationships in the customer master and any supporting systems. |
| | Develop customer segmentation methodology and capture appropriate attributes in the customer master. |
| | Maintain a common data structure with consistent definitions and performance language documented in a "dictionary" |
| | Maintain a library of templates and usage guidelines for recurring analyses |
| Maintain Integrated Finance Information Technology Architecture 3804 | Standardize on a single ERP system; decommission legacy systems |
| | Best of breed extensions should be fully integrated and consistently used |
| | Fully integrated and automated reporting capability including simple user interface with drill-down capability |
| | Use a single reporting and analytic tool across the enterprise |
| | Build driver based planning models directly in planning tool |
| | Limit the use of spreadsheets |
| | Data extracted from internal and external systems into a central repository to meet multiple reporting requirements (one version of the truth) |
| | Enable automated work flow capabilities |
| | Automated information access and delivery |
| | Enable web connections to customers, suppliers, and partners |
| | Technical solution should be able to accommodate future growth and/or structural changes to the organization |
| | Single point of access for multiple applications |
| | Data from the source systems is extracted once, at the appropriate level of detail |
| | Fully automated sub-ledger interfaces |
| | Integration of the GL with treasury and tax systems |
| | Fully automated inter-company accounting and elimination of inter-company balances |
| | Highly automated financial consolidation activities |

Table 21 provides an explanation of the 'strategic planning/shareholder value targeting' capability 134 and key assessment areas within the capability and corresponding performance capability criteria.

TABLE 21

Strategic Planning/Shareholder Value Targeting 134

| | |
|---|---|
| Description: | Strategic planning refers to the periodic/ongoing process of identifying appropriate business strategy, translating that strategy into specific business objectives, value drivers, and KPI's, and creating strategic planning documents and strategy maps to guide the business forward. |

Focus/Objective

| | |
|---|---|
| Basic Criteria: 210 | Strategic planning is essentially a long-term forecasting exercise, with a focus on incremental changes |
| Competitive Criteria: 212 | Focus is on longer term and/or structural changes, but only loosely linked to shareholder value |
| Market Leading Criteria: 214 | Strategic plan focuses on the financial, operational, and structural changes needed to achieve shareholder value objectives |

Link to Shareholder Value

| | |
|---|---|
| Basic Criteria: 210 | Strategic planning not always shareholder value-driven |
| Competitive Criteria: 212 | Strategic planning loosely driven by shareholder value; but not always an explicit link; no formal enterprise value model is used |
| Market Leading Criteria: 214 | Strategic planning is firmly grounded in shareholder value; formal enterprise value model is maintained; external focus on current and future value |

Use of Business Drivers

| | |
|---|---|
| Basic Criteria: 210 | Limited use of business drivers in planning process; where used, the linkage to strategy and future value is not well understood |
| Competitive Criteria: 212 | Business drivers are used; but drivers are only partially identified and/or not prioritized |
| Market Leading Criteria: 214 | Both current and future value drivers are identified, prioritized, and clearly linked to strategy |

Driver Cause and Effect

| | |
|---|---|
| Basic Criteria: 210 | Limited use of business drivers; no quantitative testing of linkage to shareholder value creation |
| Competitive Criteria: 212 | Focus on current value drivers with assumed cause and effect linkages (conceptual linkage) |
| Market Leading Criteria: 214 | Cause and effect linkages between drivers and results are well-understood and quantitatively tested |

Link to Target Setting

| | |
|---|---|
| Basic Criteria: 210 | Strategic plan stands alone |
| Competitive Criteria: 212 | Partial linkage to targets and budgets; but changes to strategy do not always result in changes to targets and budgets |
| Market Leading Criteria: 214 | Strategic plan explicitly linked to targeting and resource allocation |

Result Measures

| | |
|---|---|
| Basic Criteria: 210 | Many P&L-focused performance measures; neither well-defined nor consistent across the organization |
| Competitive Criteria: 212 | Driver based measures are used in addition to traditional P&L measures; but may not be prioritized or used consistently |
| Market Leading Criteria: 214 | Consistent, prioritized, clearly-defined key result measures of successful execution of strategy with direct linkage to total return to shareholders |

Intangible Assets

| | |
|---|---|
| Basic Criteria: 210 | Intangible assets not accepted as value drivers; intangible asset performance neither explicitly measured nor actively managed |

TABLE 21-continued

Strategic Planning/Shareholder Value Targeting 134

| | |
|---|---|
| Competitive Criteria: 212 | Intangible assets accepted as key drivers of value; but intangible asset performance is not consistently measured or actively managed |
| Market Leading Criteria: 214 | Intangible assets accepted as key drivers of future value and managed actively |

FIG. 39 illustrates capabilities within the finance process excellence framework multi-level hierarchy corresponding to the 'Strategic Planning/Shareholder Value Targeting' capability 134. Table 22 describes additional market leading criteria for the capabilities of the 'Strategic Planning/Shareholder Value Targeting' capability 134, including criteria for: 'Refine Organization Vision and Strategic Objectives' capability 3902; 'Determine Key Business Drivers' capability 3904; 'Determine Key Measures of Success' capability 3906; and 'Create Strategic Plan' capability 3908.

Market leading criteria for 'Refine Organization Vision and Strategic Objectives' capability 3902 may include: long term planning focused on the financial performance and options necessary to achieve shareholder value objectives; financial and operational considerations determined beyond simply performing a "long-term forecasting" exercise. Options and opportunities may be evaluated based on expected contribution to current and future value. A formal enterprise valuation model (e.g., the type used by sell-side equity analysts) may be maintained and updated frequently. Market leading criteria for 'Refine Organization Vision and Strategic Objectives' capability 3902 may include: requiring all finance executives to be familiar with the model and the primary drivers of shareholder value; actively incorporating the model into long-term and strategic planning; tightly integrating strategic planning with target setting and resource allocation; ensuring that targets "add up" to the performance necessary to achieve shareholder value objectives.

Market leading criteria for 'Determine Key Business Drivers' capability 3904 may include: ensuring that management understands the distinction between current value and future value; allocating adequate management time devoted to managing future value; formally identifying and documenting drivers of current and future value (e.g., at the corporate and BU level); reviewing key business drivers whenever significant changes in the business occur (e.g., acquisition, new product introduction, change in business model, and new competitive landscape); identifying, prioritizing and clearly linking current and future value drivers to strategy; ensuring that management focuses on the most sensitive and manageable drivers; creating and maintaining a formal economic model that incorporates the "mathematical linkage" between business drivers and financial results; leveraging the model for strategic planning and metric identification activities to understand the true sensitivity of financial results to changes in the value of the underlying business drivers. Market leading criteria for 'Refine Organization Vision and Strategic Objectives' capability 3902 may include: quantitatively testing the linkage between drivers and shareholder value creation; assessing the ability of management to impact and manage each driver; ensuring a common understanding exists regarding key value drivers across the entire enterprise at all levels of the organization to enable the organization to deliver sustained value creation.

Market leading criteria for 'Determine Key Measures of Success' capability 3906 may include: measuring business drivers, in addition to results; ensuring all key business drivers have an associated metric and/or metrics; evaluating whether to provide temporary, initiative specific metrics to track progress against specific strategic initiatives and eliminating metrics from scorecards when the metrics are no longer needed; ensuring that measurement and management of key value drivers and metrics is a primary focus of management and not considered secondary to traditional earnings measures and accounting ratios; identifying the critical few measures that are balanced and aligned with strategic objectives and value creation. Market leading criteria for 'Determine Key Measures of Success' capability 3906 may include: aligning key stakeholders to establish and maintain key success measures in the organization; identifying the impact of improving a metric on shareholder value objectives; identifying and documenting key management decisions required to achieve shareholder value objectives, the frequency of those decisions, and the information requirements to make each decision, and ensuring metrics support the decisions. Market leading criteria for 'Determine Key Measures of Success' capability 3906 may include: ensuring that the collection of metrics can meet three objectives: 1) track progress and explain the past (e.g., how are we doing, what happened and why); 2) forecasting the future (e.g., what do we expect to occur); and 3) support decisions (e.g., what should we do to achieve objectives). Market leading criteria for 'Determine Key Measures of Success' capability 3906 may further include: defining which of these roles each metric is expected to play; linking business unit metrics to and/or "feeding" corporate level metrics; and linking sub-BU and/or shared service group metrics to BU metrics.

Market leading criteria for 'Create Strategic Plan' capability 3908 may include: creating a formal review process to evaluate the success of investment spending and of other strategic initiatives; conducting strategic planning sessions to review performance against previous session's strategic objectives and commitments; reviewing actual R&D spending and ROI against original estimates (e.g., using information from a project accounting system and process); clearly specifying the processes and associated governance frameworks that define how key decisions may be made (e.g., prioritization of value drivers, approval of capital investment, and change in strategy direction); aligning decisions with strategic planning and ensure decisions facilitate shareholder value creation.

TABLE 22

Strategic Planning/Shareholder Value Targeting 134 - Market Leading Criteria 214

| | |
|---|---|
| Refine Organization Vision and Strategic Objectives 3902 | Focus strategic plan on the financial, operational, and structural changes needed to achieve objectives |
| | Ground all strategic planning activities in shareholder value |
| | Maintain formal enterprise valuation model |
| | Actively instill a value creation mindset and financial acumen into the enterprise |
| | Distinguish between current value and future value |
| | Formally link strategic planning to target setting and resource allocation |
| Determine Key Business Drivers 3904 | Actively distinguish between current value and future value |
| | Identify and prioritize value drivers |
| | Maintain internal economic model |
| | Quantitatively test the linkage between drivers and shareholder value creation |
| | Prioritize business drivers |
| | Ensure deep understanding and alignment around critical value drivers across the enterprise |
| Determine Key Measures of | Attach one or more measures to each business driver and strategic objective |

TABLE 22-continued

Strategic Planning/Shareholder Value Targeting 134 - Market Leading Criteria 214

| | |
|---|---|
| Success 3906 | Focus on the "critical few" metrics necessary to measure successful execution of strategy |
| | Define and gain alignment on all critical metrics |
| | Ensure executive scorecards are aligned with strategic objectives and include associated metrics |
| | Measure and test linkage between individual metric and overall shareholder value creation |
| | Ensure metrics support key management decisions |
| | Segregate metrics by purpose |
| | Organize metrics into tiers |
| Create Strategic Plan 3908 | Strategic planning should clearly define organizational responsibility and accountability |
| | Strategic plans should be translated into phased, actionable programs |
| | Create formal framework to make investment trade-off decisions |
| | Perform post implementation review of strategic plans |
| | Communicate strategy broadly throughout the organization |
| | Employ standardized management processes to support key decision making |

Table 23 provides an explanation of the target setting capability 136, key assessment areas within the capability and corresponding performance capability criteria.

TABLE 23

Target Setting 136

| | |
|---|---|
| Description: | Target Setting refers to the process of analyzing the portfolio of businesses that make up the enterprise and the expected contribution of each, setting top down performance targets, and then cascading or assigning those targets to segments of the business. |

Portfolio View

| | |
|---|---|
| Basic Criteria: 210 | When setting targets, no distinction between assets earning a high return on invested capital and those earning a low return |
| Competitive Criteria: 212 | Distinction is made between high and low returning assets when setting targets, but without the full rigor of a portfolio value assessment |
| Market Leading Criteria: 214 | Portfolio is fully analyzed to identify opportunities to redeploy resources from assets that are not returning the cost of capital to higher-return assets |

Target Accountability

| | |
|---|---|
| Basic Criteria: 210 | Target ownership not aligned with roles, responsibilities, incentives, and rewards |
| Competitive Criteria: 212 | Target ownership aligned with roles and responsibilities, but incentives and rewards are aligned to budgets or other measure |
| Market Leading Criteria: 214 | Clearly aligned target ownership, accountability, decision rights, and incentive compensation |

Nature of Targets

| | |
|---|---|
| Basic Criteria: 210 | Targets negotiated based on probability of achievement and/or set on the basis of last year's actuals |
| Competitive Criteria: 212 | Targets heavily influenced by external market expectations or other external benchmark; but "target negotiation" still allowed |
| Market Leading Criteria: 214 | Targets predetermined based on external market expectations. Relative targets (compared to some external benchmark) instead of absolute targets |

Link to Strategic Planning

| | |
|---|---|
| Basic Criteria: 210 | No link between strategic plan and targets |
| Competitive Criteria: 212 | Partial linkage to strategic plan, but changes to strategy do not always result in target changes |
| Market Leading Criteria: 214 | Strategic plan explicitly linked to targeting and resource allocation |

TABLE 23-continued

Target Setting 136

Cascade Approach

| | |
|---|---|
| Basic Criteria: 210 | Targets set at the corporate level and applied uniformly to business units |
| Competitive Criteria: 212 | Target cascade recognizes differences in business units, but no formal portfolio approach is employed |
| Market Leading Criteria: 214 | Value and risk treated as an aggregation of the business portfolio to set targets by business unit |

External Communication

| | |
|---|---|
| Basic Criteria: 210 | Externally-communicated targets not consistently incorporated into the internal target-setting process |
| Market Leading Criteria: 214 | Internal targets consistent with externally communicated targets |

Target Management

| | |
|---|---|
| Basic Criteria: 210 | Scorecard measure tolerances not set at each organization level; difficult to know when and where to initiate corrective action |
| Market Leading Criteria: 214 | Consistent targets and tolerances in place for the critical few key metrics at each organization level |

Figure 40:
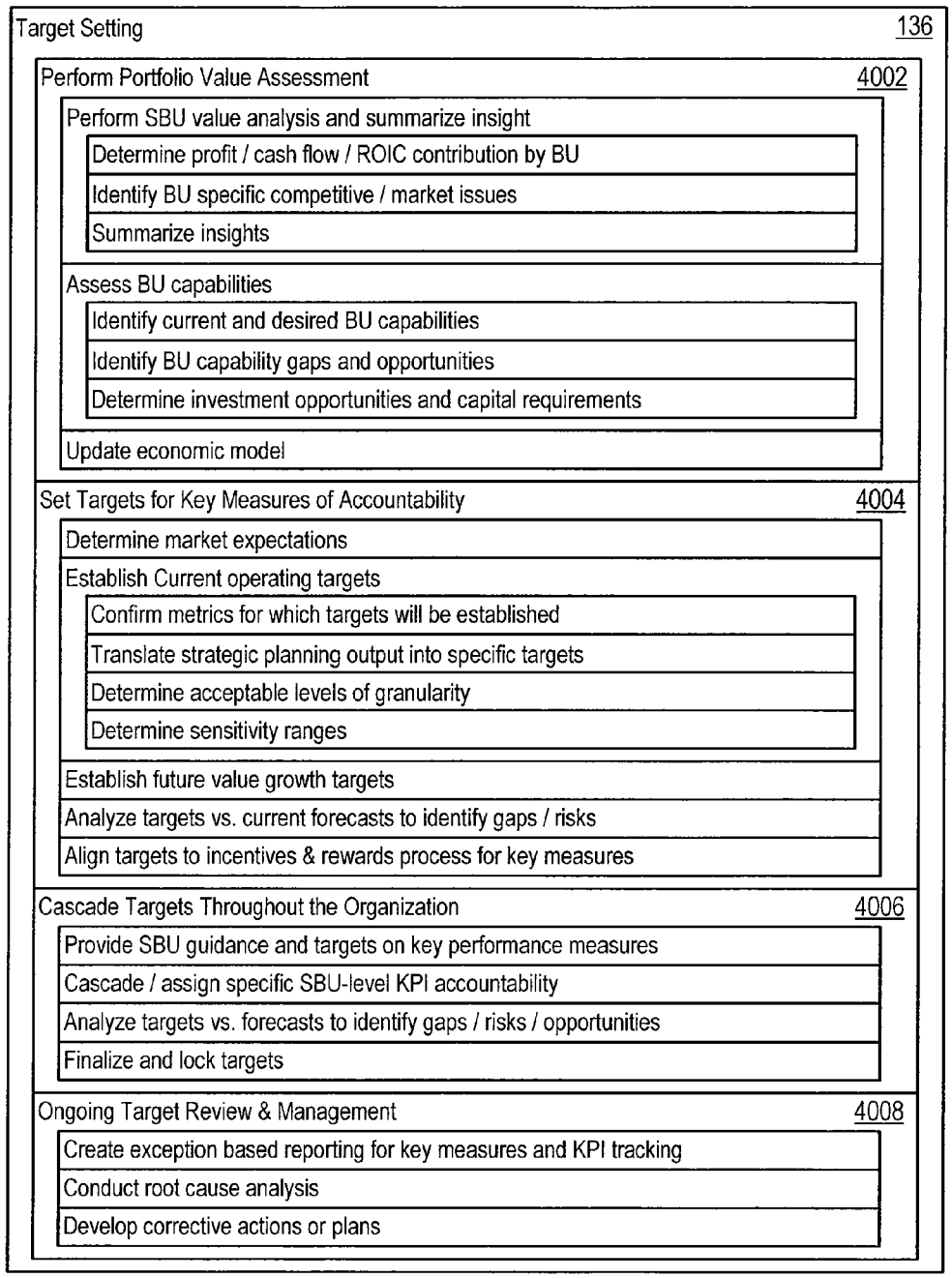
FIG. 40 illustrates capabilities within the 'target setting' capability corresponding to the 'enterprise performance management' platform.

FIG. 40 illustrates capabilities within the finance process excellence framework multi-level hierarchy corresponding to the target setting capability 136. Table 24 describes additional market leading criteria for the capabilities of the target setting capability 136, including criteria for: Perform Portfolio Value Assessment' capability 4002; 'Set Targets for Key Measures of Accountability' capability 4004; 'Cascade Targets Throughout the Organization' capability 4006; and 'Ongoing Target Review & Management' capability 4008.

Market leading criteria for 'Perform Portfolio Value Assessment' capability 4002 may include: designing and implementing at the onset of the target setting process, a clear governance structure to support the necessary activities with the process; and analyzing the portfolio of business units, project, and assets to identify opportunities to redeploy resources from assets that are not returning the cost of capital to higher-return assets.

Market leading criteria for 'Set Targets for Key Measures of Accountability' capability 4004 may include: tightly integrating target setting to strategic planning and resource allocation; deriving targets from the strategy setting process; leveraging external benchmarks and minimum market expectations of returns (e.g., a cost of capital return on enterprise value over the industry lifecycle); preventing the negotiation of targets based on bottom-up budgets; driving targets based on the financial performance necessary to meet shareholder value objectives, rather than "what management believes can be achieved" under a business as usual scenario and/or "last year+10%" approach; ensuring that targets "add up" to the performance necessary to achieve shareholder value objectives; separating targets from shareholder value objectives to de-politicize the process and improve speed and accuracy; and leveraging external and/or industry benchmarks.

Market leading criteria for 'Cascade Targets Throughout the Organization' capability 4006 may include ensuring that each unit earns an appropriate return on capital allocated to the unit.

Market leading criteria for 'Ongoing Target Review & Management' capability 4008 may include: focusing on closing the gaps between target performance and bottom up estimates through action plans and changes to performance, rather than re-negotiating targets; reviewing targets during the year to focus on how successful each business unit is in closing the gaps; assigning managers accountability for meeting those targets over which the manager has control, and compensating managers accordingly from an incentive compensation perspective; maintaining a strategic focus (e.g., forward looking) approach that is analytically driven and provides better insight into the target review process by requiring executives to quickly identify where and when to initiate corrective action in the event targets are not being met; requiring managers to focus on targets, even where bottom-up budgets do not reconcile to the targets; and comparing performance against top-down targets to maintain and adjust detailed budgets as necessary without altering targets.

TABLE 24

Target Setting 136-
Market Leading Criteria 214

| | |
|---|---|
| Perform Portfolio Value Assessment 4002 | Clear governance structures should be in place throughout the target-setting process<br>Perform formal and recurring portfolio analysis<br>Treat value and risk as an aggregation of the business portfolio to set targets by business unit |
| Set Targets for Key Measures of Accountability 4004 | Formally link target setting to strategic planning and resource allocation<br>Targets should be "predetermined" based on external market expectations<br>Separate target setting and forecasting<br>Use relative targets instead of/in addition to absolute targets<br>Clearly align target ownership, accountability and decision rights<br>Make internal targets consistent with externally communicated targets<br>Establish consistent targets and tolerances for the critical few key metrics at each organization level<br>Establish multi-year targets<br>Include non-financial measures in targets |
| Cascade Targets Throughout the Organization 4006 | Treat value and risk as an aggregation of the business portfolio to set targets by business unit<br>Cascade targets down to individual business/organizational units/geographies and tie to capital allocation<br>Unique hurdle rates applied to individual organizations and projects to reflect relative risk |
| Ongoing Target Review & Management 4008 | Corporate and organization units jointly develop action plans and tactics for achieving targets<br>Gaps between top-down targets and bottom up budgets/forecasts should be allocated across the business in the form of stretch targets<br>Clearly aligned target ownership, accountability, decision rights, and incentive compensation<br>Establish consistent targets and tolerances for the critical few key metrics at each organization level<br>Exception based reporting with root cause analysis and corrective actions<br>Measure performance against targets (rather than budgets) |

Table 25 provides an explanation of the 'planning, resource allocation and forecasting' capability 138, key assessment areas within the capability and corresponding performance capability criteria.

TABLE 25

Planning, Resource Allocation and Forecasting 138

| | |
|---|---|
| Description: | Includes planning, budgeting, and forecasting activities as well as capital/investment planning & allocation activities. |

TABLE 25-continued

Planning, Resource Allocation and Forecasting 138

Nature of Budgets and Forecasts

| | |
|---|---|
| Basic Criteria: 210 | Budgets updated annually and based on unsupported assumptions; budgets usually out-of-date due to changing circumstances |
| Competitive Criteria: 212 | Traditional budget in addition to rolling forecast; budgets and forecasts are driver based |
| Market Leading Criteria: 214 | Annual budget replaced with a driver-based rolling forecast; financial outcomes linked to key drivers of current and future value |

Resource Allocation and Deployment

| | |
|---|---|
| Basic Criteria: 210 | Investments politically-driven and not clearly linked to value creating opportunities. No tactical budgeting process to pace resource deployment against strategies. |
| Market Leading Criteria: 214 | Capital allocation priorities linked with overall strategy and value creation across the portfolio. Resource deployment well-timed against strategies. |

Content

| | |
|---|---|
| Basic Criteria: 210 | Unnecessary planning and forecasting detail. Only results forecasted, not business drivers. Budgets set for every line item on the P&L. |
| Competitive Criteria: 212 | Unnecessary detail minimized. Selected business drivers forecast in addition to result measures. Budgets set for the most material and volatile line items on the P&L. |
| Market Leading Criteria: 214 | Planning & forecasting detail based on materiality and volatility. All important business drivers forecasted. Budgets set for highest material and volatile drivers, key metrics, and P&L line items. |

Relationship To Targets

| | |
|---|---|
| Basic Criteria: 210 | Target setting and forecasting are combined; highly-politicized; much gamesmanship |
| Market Leading Criteria: 214 | Target setting and forecasting are separated to de-politicize the process |

Treatment of Risk

| | |
|---|---|
| Basic Criteria: 210 | Individual organizations and project hurdle rates not differentiated for risk |
| Market Leading Criteria: 214 | Unique hurdle rates applied to individual organizations/projects reflecting relative risk |

Process

| | |
|---|---|
| Basic Criteria: 210 | Many iterations of bottom-up budget/forecast due to minimal initial target setting; focused on negotiations and detail roll-up |
| Market Leading Criteria: 214 | Limited number of budget/forecast iterations because of top down target setting; focused on drivers |

Forecast Accuracy

| | |
|---|---|
| Basic Criteria: 210 | Forecasts are considered reliable over very short time horizons only |
| Competitive Criteria: 212 | Forecasts accuracy is adequate to support most business decisions; some exceptions |
| Market Leading Criteria: 214 | Forecasts accuracy supports essentially all business decisions that rely on forecasts |

Budget Cycle Time

| | |
|---|---|
| Basic Criteria: 210 | Budget cycle time is longer than peers and consumes much finance capacity |
| Competitive Criteria: 212 | Budget cycle time is consistent with or slightly better than peers |
| Market Leading Criteria: 214 | Budget cycle time is substantially shorter then peers and does not hinder other activities |

FIG. 41 illustrates capabilities within the finance process excellence framework multi-level hierarchy corresponding to the 'Planning, Resource Allocation & Forecasting' capability 138. Table 26 describes additional market leading criteria for the capabilities of the 'Planning, Resource Allocation & Forecasting' capability 138, including criteria for: 'Develop Plans and Budgets' capability 4102; 'Perform Capital Planning/Resource Allocation' capability 4104; 'Review, Challenge, and Finalize Plans and Budgets' capability 4106; and 'Perform Periodic Forecasting' capability 4108.

Market leading criteria for 'Develop Plans and Budgets' capability 4102 may include identifying and quantitatively testing in advance, business drivers (current and future, financial and operational) and driver based planning models. Market leading criteria for 'Develop Plans and Budgets' capability 4102 may include: planning activities focused on estimating values for the drivers instead of "detail roll-up" work to enable scenario planning and predictive modeling; creating budgets focused on the highest material and volatile drivers, key metrics, and P&L line items, with only limited focus on other items; developing near term plans and forecasts with more details, and longer term plans with fewer details; developing plans with more detail for material and/or volatile drivers and result measures, and fewer details for immaterial and/or stable drivers and result measures; employing planning tools that are more than roll-up and consolidation tools; employing models built directly in the tool to minimize maintenance, testing, standardization and control, rather than a collection of offline spreadsheets; employing a 4 or 6 quarter rolling horizon for planning and/or forecasting; ensuring that the entire organization uses the same tool for target setting, planning, budgeting, forecasting, and management reporting. Market leading criteria for 'Develop Plans and Budgets' capability 4102 may include creating multiple scenarios based on likely variation in key business drivers, rather than a single plan and forecast; employing a planning tool that includes workflow and online review, edit and approval functionality so budget documents do not have to be routed manually (e.g., eliminate the need to e-mail documents); distributing a comprehensive set of planning assumptions (e.g., benefits cost per employee) in advance of the planning process (e.g., benefits cost per employee and average salary increases); and embedding planning assumptions in the planning tool and presenting targets, prior year actuals and most recent forecast using the tool.

Market leading criteria for 'Perform Capital Planning/Resource Allocation' capability 4104 may include: designing planning process to help the enterprise achieve targets and implement strategy; enabling planning to be performed beyond the current fiscal year, eliminate tying compensation to meeting an annual budget; employing a rolling business planning process that is dynamic and focused on reallocating resources to drive business performance; streamlining processes and technology to decrease the number of required resources needed to support the planning process and enable the resources to be allocated where they can contribute the most value; and identifying process efficiencies that yield headcount reductions.

Market leading criteria for 'Review, Challenge, and Finalize Plans and Budgets' capability 4106 may include: eliminating and/or preventing argument and negotiation among different layers of management about what is going to be achieved and the composition of the budget; and conducting period reviews during the year that focus on how successful each business unit is in closing budget gaps.

Market leading criteria for 'Perform Periodic Forecasting' capability 4108 may include: forecasting a 4 to 6 quarter rolling horizon; and creating a "rhythm" of updating existing forecast information and adding a month/quarter with each update. Business drivers (current and future, financial and operational) and driver based models are identified and quantitatively tested in advance. Forecasting activities may focus on estimating values for the drivers instead of "detail roll-up" work, which enables scenario planning and predictive modeling.

TABLE 26

Planning, Resource Allocation & Forecasting 138-
Market Leading Criteria 214

| | |
|---|---|
| Develop Plans and Budgets 4102 | Plans/budgets/forecasts should be driver based |
| | Focus planning efforts on most material and volatile drivers |
| | Planning & forecasting detail vary over time, based on materiality and volatility |
| | Build driver based planning models directly in planning tool |
| | Adopt a rolling planning/forecasting horizon |
| | De-emphasize/eliminate annual budget process; replace with rolling forecast |
| | Limit the # of budget/iterations because of top-down target setting, bottom-up resource allocation, and reconciliation |
| | Integrate financial, operational, and capital plans/budgets/forecasts |
| | Use a single, best of breed planning tool across the entire organization |
| | Perform scenario planning for all plans and forecasts |
| | Automated distribution of budgets and revisions (workflow capabilities) |
| | Create and distribute comprehensive set of planning assumptions |
| | Planning tool should relevant comparative data to assist in building the plan or budget |
| | Finance and operations leadership jointly develop plans and budgets |
| Perform Capital Planning/Resource Allocation 4104 | Capital allocation priorities should be clearly linked with overall strategy and value creation across the portfolio |
| | Use the planning processes to allocate resources (i.e., capital and people) to highest-value opportunities |
| | Streamline analysis processes and technology enablers to increase planning efficiency |
| | Resource deployment should be well-timed against strategies |
| | Apply unique hurdle rates to individual organizations and projects to reflect relative risk |
| Review, Challenge, and Finalize Plans and Budgets 4106 | Gaps between top-down targets and bottom up budgets/forecasts should be allocated across the business in the form of stretch targets |
| Perform Periodic Forecasting 4108 | Adopt a rolling forecast horizon |
| | Produce driver based forecasts |
| | Build driver based forecast models directly in planning tool |
| | Vary forecasting detail over time, based on materiality and volatility |
| | De-emphasize/eliminate annual budget process; replace with rolling forecast |
| | Separate target setting and forecasting |
| | Perform scenario planning for all plans and forecasts |
| | Integrate financial, operational, and capital forecasts |
| | Use a single, best of breed planning tool across the entire organization |
| | Finance and operations leadership jointly develop forecasts |

Table 27 provides an explanation of the performance reporting and analytics capability 140, key assessment areas within the capability and performance capability criteria.

TABLE 27

Performance Reporting & Analytics 140

| | |
|---|---|
| Description: | Performance Reporting and Analytics includes all management reporting and analysis activities - both recurring and ad-hoc. |

Metrics and Measures

| | |
|---|---|
| Basic Criteria: 210 | Many P&L-focused performance measures; neither well-defined nor consistent across the organization. Multiple definitions and calculations of metrics. Measures used at the top not aligned/connected to those used to manage day-to-day operations. |
| Competitive Criteria: 212 | Driver based measures in addition to P&L measures; may not be prioritized. Single definition & calculation for most metrics. Partial alignment of metrics across the organization. |
| Market Leading Criteria: 214 | Consistent, prioritized, clearly defined key result measures with direct linkage to shareholder value. Single definition & calculation for each metric. Clear alignment between measures reported up and those used to manage down. |

Tools

| | |
|---|---|
| Basic Criteria: 210 | Multiple disparate tools required |
| Competitive Criteria: 212 | Single reporting and analytical tool with exceptions for selected geographies or data sources |
| Market Leading Criteria: 214 | Single integrated reporting and analytics tool |

Information Access

| | |
|---|---|
| Basic Criteria: 210 | Management book manually published well after month-end |
| Competitive Criteria: 212 | Management information available on-line in static scorecard/report format |
| Market Leading Criteria: 214 | Online reporting capability including simple user interface with drill-down capability |

Internal versus External Reporting

| | |
|---|---|
| Basic Criteria: 210 | No distinction between internal/external reporting |
| Competitive Criteria: 212 | Understands internal/external reporting needs and creates manual reporting processes to support |
| Market Leading Criteria: 214 | Understands internal external reporting needs and automates data requirements accordingly |

Business Rhythm

| | |
|---|---|
| Basic Criteria: 210 | Inconsistent or multiple processes for measuring performance. Periodic performance reviews usually informal and ad-hoc in nature and structure |
| Competitive Criteria: 212 | Formal reviews focused on many metrics with inclusion/exclusion rules applied |
| Market Leading Criteria: 214 | Consistent process for measuring performance against an agreed upon target. Formal reviews focused on the critical few performance metrics aligned to business rhythm |

Reporting & Analytic center of Excellence

| | |
|---|---|
| Basic Criteria: 210 | Analytical information is inconsistent and independently supported by specific functional area |
| Competitive Criteria: 212 | Single source within specific functional area is identified and leverages centralized data and standardized process |
| Market Leading Criteria: 214 | Information is centralized and leverages Center of Excellence (COE) support capability |

Action Planning Process

| | |
|---|---|
| Basic Criteria: 210 | Inconsistent process to measure performance; limited link to action planning/improved results. Variance explanations lack root cause analysis and corrective |

TABLE 27-continued

Performance Reporting & Analytics 140

| | |
|---|---|
| | actions. No post-implementation reviews of plans, forecasts, and capital allocation decisions. |
| Competitive Criteria: 212 | Standardized process to measure performance with on-going negotiations of targets. Variances are understood, but action plans have limited accountability/link back to performance. Post-implementation reviews conducted inconsistently/for selected investments. |
| Market Leading Criteria: 214 | Simplified process for measuring performance tied to action planning with accountability to close gaps. Root cause analysis and corrective action only required when keymeasures are out of tolerance; corrective actions plan monitored. Rigorous, consistent post-implementation reviews of all key investment decisions. |

FIG. 42 illustrates capabilities within the finance process excellence framework multi-level hierarchy corresponding to the 'Performance Reporting and Analytics' capability 140. Table 28 describes additional market leading criteria for the capabilities of the 'Performance Reporting and Analytics' capability 140, including criteria for: 'Measure, Report, and Analyze Business Performance' capability 4202; 'Maintain Common Performance Language and Definitions' capability 4204; 'Provide On-going Reporting & Analytical Support' capability 4206; and 'Review Impact of Management Incentive Structure on Financial Performance' capability 4208.

Market leading criteria for 'Measure, Report, and Analyze Business Performance' capability 4202 may include: the measurement and management of key value drivers and metrics as a primary focus, rather than subordinate to traditional earnings measures and accounting ratios; and identifying the critical few measures that are balanced and aligned with strategic objectives and value creation. Market leading criteria for 'Measure, Report, and Analyze Business Performance' capability 4202 may include: employing a shareholder value measure or a proxy thereof incorporating cash flow, invested capital and risk as a key result measure of financial performance; employing other result measures that directly impact the overall shareholder value measure; employing metrics that form a cascading hierarchy, where more detailed metrics are components of more summary metrics; ensuring that the reporting process includes trending and root cause analysis as key components; ensuring that information is captured and reported quickly and consistently for all levels and all parts of the business; ensuring the use of common data models (e.g., customer, product, project, geography, market, contract type, pricing level, and channel).

Historically, value was heavily tied to tangible assets. However, currently only 25% of the S&P 500's value can be traced to tangible assets with the balance largely attributed to intangible value. Market leading criteria for 'Measure, Report, and Analyze Business Performance' capability 4202 may include: employing balanced scorecards that reflect tangible and intangible valuations; employing customized dashboards for all key executives and delivered directly via the financial systems; employing reporting content focused on the critical few financial and non-financial metrics and value drivers that align with overall organization objectives; employing online, dashboard style presentation of key data; employing a single, best of breed reporting and analysis application used consistently throughout the organization. The single, best of breed reporting and analysis application may directly access financial and operational data with drill-down capability. Market leading criteria for 'Measure, Report, and Analyze Business Performance' capability 4202 may include: employing a standardized process to review reports on a bi-annual or annual basis and pro-actively make decisions to add, change, or eliminate reports based on the current reporting needs of the business; eliminating unused and non-value added reports; ensuring that management spends more time looking forward than backward (e.g., related to pricing, new products, and geographical expansion); ensuring that analysts within the organization spends relatively little time on historical variance analysis, traditional ratio analysis (e.g., automate historical variance analysis); ensuring that each metric corresponds to a formal target and a pre-defined tolerance range; conducting root cause analysis and corrective action when out of tolerance; developing customized scorecards, reporting and analytics for executives responsive to the executives respective scope of responsibility; providing reporting and analytics in real-time, as needed to support decisions; ensuring a primary group is involved in acknowledgement, evaluation and management of risk; ensuring a secondary group views reports for informational purposes only.

Market leading criteria for 'Maintain Common Performance Language and Definitions' capability 4204 may include: employing robust and consistent definitions for all key metrics, assets, and decision support information requirements; addressing unit of measure, formula, data source, frequency, and dimensions; and ensuring the consistent use of a performance language dictionary to eliminate and/or minimize debate performance measures. For example, a standard "make vs. buy" analysis template or a standard "capital project approval request" document. Model should be cross functional, financial and non-financial, internal and external.

Market leading criteria for 'Provide On-going Reporting & Analytical Support' capability 4206 may include: employing a standardized process; whereas, the company reviews reports on a bi-annual or annual basis, and pro-actively makes decisions to add, change, and/or eliminate reports based on the current reporting needs of the business.

Market leading criteria for 'Review Impact of Management Incentive Structure on Financial Performance' capability 4208 may include: reviewing current value and future value; using a measure of value (e.g., economic value analysis—EVA) as the primary incentive metric; evaluating the use of non-financial metrics (e.g., customer and/or employee) to provide a balanced perspective to compensation and may influence a different set of behaviors that may prove beneficial for the organization; analyzing incentives for performance measured strictly by short-term financial metrics to determine whether a linkage exists to the creation of long-term shareholder value; implementing performance payout reserves and/or bonuses based on sustained performance over time (e.g., multi-year targets and "bonus bank"); evaluating and/or eliminating incentives to "shift performance between years"; removing disincentives to high performance; ensuring a line-of-sight with strategy; and ensuring board and management alignment on incentive pay, and encouraging cooperation across organizational entities.

TABLE 28

| Performance Reporting and Analytics 140- Market Leading Criteria 214 | |
|---|---|
| Measure, Report, and Analyze Business Performance 4202 | Focus on the "critical few" metrics necessary to measure successful execution of strategy<br>Define and gain alignment on all critical metrics<br>Measure and test linkage between individual metric and shareholder value creation<br>Ensure metrics support key management decisions |

TABLE 28-continued

| Performance Reporting and Analytics 140- Market Leading Criteria 214 | |
|---|---|
| | Segregate metrics by purpose<br>Key result measures are consistent, prioritized, and clearly defined<br>Key result measures have direct linkage to shareholder value<br>Clear alignment between measures reported up and those used to manage down<br>Use performance monitoring and analytics to improve the statistical fact base and relevance of what is being measured over time<br>Fast reporting cycles to support decisions and actions required to meet or exceed performance targets<br>Multi-dimensional profitability analysis methodology extended to all applicable dimensions<br>Use analytics to customize offerings and maximize revenue/profit<br>Produce BU P&Ls that only reflect that unit's controllable revenue and cost<br>Balanced scorecard that represents both quantitative (tangible) and qualitative (intangible) information<br>Balanced scorecards with a clear link between the scorecards and growth in shareholder value<br>Incorporate external information in management dashboards<br>Fully integrated and automated reporting capability including simple user interface with drill-down capability<br>Use a single reporting and analytic tool across the enterprise<br>Reports are few in number and focused on a shared management understanding of what is important<br>Employ an ongoing report rationalization process<br>Focus on forward looking analysis (as opposed to historical analysis)<br>Differentiate between internal and external reporting needs - but leverage a single data source<br>Consistent performance measurement and reporting processes across the organization<br>Establish targets and tolerances for each metric<br>Custom scorecards<br>Real-time reporting and analytics<br>Utilize exception-based information, including alerts/alarms/color coded reporting<br>Divide report users into two groups: primary and secondary<br>Include non-financial data in management reports |
| Review Performance with Management | Establish standardized (daily, weekly, monthly) business rhythm for performance reporting<br>Formal reviews should focus on the critical few performance metrics aligned to business rhythm<br>Frequency of information should be based on what is actionable and accurate for that particular audience<br>Link performance reporting with accountability for closing gaps<br>Root cause analysis and corrective action only required when key measures are out of tolerance<br>Corrective action plans monitored<br>Rigorous, consistent post-implementation reviews of all key investment decisions |
| Develop Action Plans, Re-Allocate Resources, & Update Forecast | Employ simplified process for measuring performance tied to action planning with accountability to close gaps<br>Root cause analysis and corrective action only required when key measures are out of tolerance<br>Corrective action plans monitored<br>Corrective action plans actively monitored<br>Rigorous, consistent post-implementation reviews of all key investment decisions |
| Maintain Common Performance Language and Definitions 4204 | Maintain a common data structure with consistent definitions and performance language documented in a "dictionary"<br>Maintain a library of templates and usage guidelines for recurring analyses<br>Maintain formal enterprise data model<br>Manage data centrally<br>Integrate processes and controls to improve integrity of data and quality of outputs |

TABLE 28-continued

Performance Reporting and Analytics 140-
Market Leading Criteria 214

| | |
|---|---|
| Provide On-going Reporting & Analytical Support 4206 | Leverage a reporting and analytics center of excellence (COE) Employ an ongoing report rationalization process |

Table 29 provides an explanation of the internal controls capability 142, key assessment areas within the capability and corresponding performance capability criteria. FIG. 43 illustrates capabilities within the finance process excellence framework multi-level hierarchy corresponding to the internal controls capability 142 and investor relations capability 144, respectively.

TABLE 29

Internal Controls 142

| | |
|---|---|
| Description: | Includes establishment and maintenance of internal control procedures, monitoring compliance (including Sarbox), internal/external audit, and reporting on compliance |
| | Role/Focus/Impact |
| Basic Criteria: 210 | Internal controls do not always meet requirements; compliance is uncertain; high risk |
| Competitive Criteria: 212 | Established policies and procedures for compliance are effective but inefficient; adequate internal controls but at a high cost to the organization |
| Market Leading Criteria: 214 | Optimized internal controls; internal control policies and procedures are both effective and efficient; low compliance risk at low cost to the organization |

FIGS. 44-45 illustrate capabilities within the finance process excellence framework multi-level hierarchy corresponding to the 'Treasury & Cash Management' capability 146. Table 30 describes additional market leading criteria for the capabilities of the 'Treasury & Cash Management' capability 146, including criteria for: 'Perform Treasury Governance Activities' capability 4402; 'Perform Banking & Cash Management Activities' capability 4404; and 'Perform cash flow and cash flow position forecasting' capability 4408.

Market leading criteria for 'Perform Treasury Governance Activities' capability 4402 may include establishing: formal, board approved policies; standard procedures; limited local autonomy; and internal audit review of compliance. Market leading criteria for 'Perform Treasury Governance Activities' capability 4402 may further include: defining detailed treasury policies on a central and local business and organization unit level that are regularly reviewed by the board; and requiring treasury to actively participate on the front end in decisions impacting treasury activities. For example, treasury may provide cash flow and other financial information to the planning and budgeting teams. Market leading criteria for 'Perform Treasury Governance Activities' capability 4402 may include: reporting KPIs on a regular basis (e.g., monthly) and initiating proactive steps to address issues; performing external benchmarking regularly and initiating proactive steps to address gaps; and tightly integrating service management processes with company strategy; and frequently reviewing the service management processes.

Market leading criteria for 'Perform Banking & Cash Management Activities' capability 4404 may include: assigning corporate treasury responsibility for all bank relationship matters (e.g., bank account openings); conducting frequent bank meetings to facilitate considerable interaction and communication; measuring performance using pre-determined and agreed KPIs and comprehensive and well structured Service Level Agreements (SLAs); and implementing virtual bank accounts and in-house banks to significantly reduce transaction costs.

Market leading criteria for 'Perform cash flow and cash flow position forecasting' capability 4408 may include: continuously analyzing treasury to quickly assess the amount of cash that is available and required to eliminate manual involvement and provides more timely cash flow information. Continuously analyzing treasury (e.g., revenue levels, customer mix, interest rates, DSO, A/R write offs and payroll costs) may allow treasury to anticipate significant surpluses and shortfalls, and realize a true picture of global cash and plan for pooling, netting and inter-company lending. Market leading criteria for 'Perform cash flow and cash flow position forecasting' capability 4408 may further include: implementing treasury systems that are integrated with ERP, EPM and other key finance and operations systems; implementing automated reconciliations; deploying algorithms to clear open items automatically; and implementing real-time updates to GL.

TABLE 30

Treasury & Cash Management 146 -
Market Leading Criteria 214

| | |
|---|---|
| Perform Treasury Governance Activities 4402 | A global treasury management model with centralized control |
| | Treasury policies are clearly defined and accepted by the board |
| | Treasury activities are centralized through a corporate treasury function |
| | Corporate treasury has extensive control over the cash operations of the business/organization units |
| | Roles and responsibilities of treasury practitioners are clearly defined - all treasury practitioners understand their role and responsibilities |
| | Treasury is fully integrated with both finance and the broader organization |
| | Treasury is regarded as an important component in strategic business decision making and is consulted before all major business decisions are made |
| | Treasury has significant interaction with the planning and budgeting process. |
| | Key Performance Indicators (KPIs) are used to track performance of treasury activities. |
| | External benchmarks regularly used to assess effectiveness of the treasury function |
| | Treasury has a formal service management process in place |
| Perform Banking & Cash Management Activities 4404 | One (or a few) primary global banking relationship(s) for all cash management activities |
| | Banking relationships managed centrally |
| | Treasury manages each bank relationship proactively |
| | The performance of each bank is measured |
| | Proactive steps taken to identify the preferred banking relationship by region |
| | Central ownership and management of cash |
| | Cash swept daily from global banking partner accounts with total visibility into daily balances |
| | Treasury has visibility of all cash balances of all operating units |
| | Cash position is available online from all organization units Cash position is generated on a daily basis |
| | Minimal idle balances exist; cash is effectively managed and invested across the organization |
| | Treasury takes ownership for managing the inter-organization loan book |
| | inter-organization transactions are calculated and executed on virtual treasury accounts |
| | Cash surpluses are pooled (ZBA or notional) |
| | In-house bank used to facilitate optimized cash management |
| | Accurate and continuous cash flow forecasting |

TABLE 30-continued

Treasury & Cash Management 146 - Market Leading Criteria 214

| | |
|---|---|
| | Cash flow forecasting fully integrated with other forecasting activities |
| | Cash flow forecasting process and tool allows scenario planning/"what if" analysis |
| | System produced cash flow statement |
| | Cash flow forecasts incorporate cash flows from all BUs Horizon for CFF is at least one year |
| | Cash flow forecast covers all cash inflows and outflows |
| | Cash flow forecasts, like other forecasts, should be driver based |
| | Consider cyclical and seasonal variability in cash flow forecasts |
| | Direct method of cash forecasting (the weekly cash flow statement) reconciled to the indirect method (working capital) |
| | Cash flow forecasts are kept simple - minimize the number of line items forecasted |
| | Forecasting accuracy is measured (actual vs. forecast) to gauge accuracy and areas for improvement |
| | Central coordination of forecasts; BU/region cash flows are consolidated into a global total |
| | Scenario analysis used to test sensitivity of cash flow to various drivers |
| | Cash flow forecasting used to identify areas for operational improvement (e.g., A/R management) and to aid in strategic decision making |
| | Treasury systems fully integrated with other key systems |
| | Bank statements are obtained electronically |
| | Bank account reconciliations are automated using electronic bank files |
| | Bank statements are reconciled on a daily basis |
| Manage Foreign Exchange | Coordinated, comprehensive, organization-wide risk management strategy with active treasury involvement at a strategic level |
| | A global foreign exchange management model with centralized control, formal policies, and limited local autonomy to make transactions |
| | Effective currency hedging program resulting in immaterial foreign exchange gains/losses - both transaction and translation related |
| | Consistent netting is used to reduce the amount of FX trades and consolidate the remainder into large trade with better rates |

Table 31 provides an explanation of the corporate tax capability 148, key assessment areas within the capability, and corresponding performance capability criteria. FIG. 46 illustrates capabilities within the finance process excellence framework multi-level hierarchy corresponding to the corporate tax capability 148.

TABLE 31

Corporate Tax 148

| | |
|---|---|
| Description: | Includes tax planning, tax accounting & reporting, and tax audit |

Tax Strategy and Focus

| | |
|---|---|
| Basic Criteria: 210 | Focus around tax compliance efficiency and minimizing cost. Tax viewed as cost center and operator. |
| Competitive Criteria: 212 | Focus around tax planning strategies. Tax viewed as value creator. |
| Market Leading Criteria: 214 | Focus around business transaction optimization. Tax viewed as a profit center and business advisor. |

Tax Planning

| | |
|---|---|
| Basic Criteria: 210 | No documentation of tax strategies including accounting impact and implementation steps. |

TABLE 31-continued

Corporate Tax 148

| | |
|---|---|
| | Unstructured/ad hoc approach to assessing risks associated with tax strategies. |
| Competitive Criteria: 212 | Ad hoc documentation; accounting impact and implementation steps sent in email. Unstructured approach to assessing risks associated with tax strategies. Qualitative assessment of tax strategy risks. |
| Market Leading Criteria: 214 | Standardized processes for documenting tax strategies, implementation steps, and monitoring requirements. Utilization of a standardized process and technology to quantitatively assess the financial, legal, and audit risks associated with a planning strategy. |

Tax Accounting & Reporting

| | |
|---|---|
| Basic Criteria: 210 | Completely disparate tax accounting & tax compliance processes; all compliance & tax accounting filing are done independent of each other. |
| Competitive Criteria: 212 | Quarterly review of tax-sensitive data for issues. Compliance data is synchronized; but the provision continue to operate separate from the compliance filings. |
| Market Leading Criteria: 214 | Monthly review and remediation of tax-sensitive transactions. All tax accounting and compliance files are based off of the same data ensuring data consistency and continuity. |

Tax Audit Management

| | |
|---|---|
| Basic Criteria: 210 | Audit function distinct and silo'd from both Planning and Compliance functions. Audits conducted and information requests completed as required by local authorities. Audits coordinated and managed locally. |
| Competitive Criteria: 212 | Audit processes integrated with Planning and Compliance. Historical Audits evaluated to determine potential recurring inquiries. Local Audit activities communicated globally. |
| Market Leading Criteria: 214 | Audit materials developed in real-time as planning and compliance activities are performed. Audits managed and coordinated globally. |

Tax Governance

| | |
|---|---|
| Basic Criteria: 210 | Limited written tax-specific policies & procedures. Targets not aligned with business or broader financial targets. |
| Competitive Criteria: 212 | Documented but silo'd policies or procedures. Targets aligned to financial targets |
| Market Leading Criteria: 214 | Integrated tax policies & procedures with all tax processes. Targets aligned to business targets as well as customer and employee performance targets. |

Tax Master Data & Document Management

| | |
|---|---|
| Basic Criteria: 210 | High degree of manual activities related to data and document management. Financial data NOT tax-sensitized. Tax data resides in multiple disparate systems and spreadsheets. |
| Competitive Criteria: 212 | Financial data and operational data tax-sensitized. Tax data collection and reconciliations streamlined and automated. Automation used to reduce data collection and scrubbing. |
| Market Leading Criteria: 214 | Tax data and documents centralized and organized for optimal effectiveness. Data Management performed by internal/external providers enabling tax professionals to focus on planning and analysis. |

Figure 47:
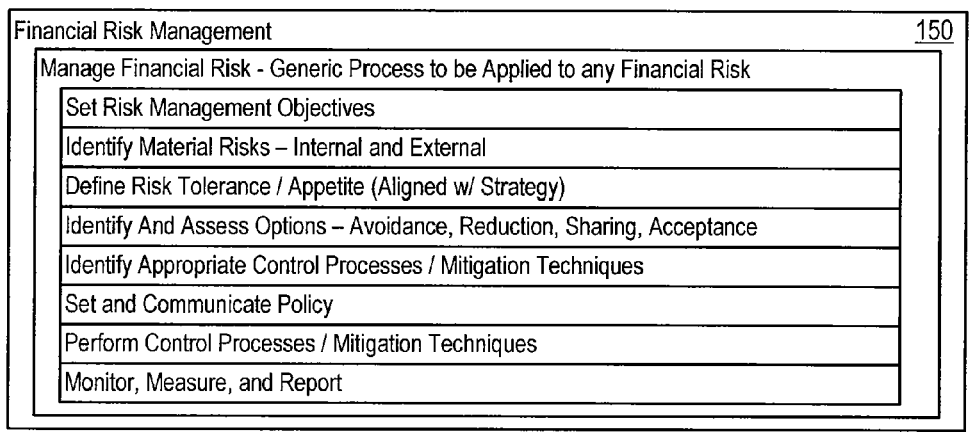
FIG. 47 illustrates capabilities within the 'financial risk management' capability corresponding to the enterprise risk management platform.

Table 32 provides an explanation of the financial risk management capability 150, key assessment areas within the capability and corresponding performance capability criteria. FIG. 47 illustrates capabilities within the finance process excellence framework multi-level hierarchy corresponding to the financial risk management capability 150.

Market leading criteria for financial risk management capability 150 may address a variety of enterprise-wide risks, including: business risk; operational risk; credit risk which refers to the possibility of loss due to default by a counterparty or customer; and market risk which represents the possibility of loss due to adverse movement in market prices.

Market leading criteria for financial risk management capability 150 may address: liquidity risk arising from the possibility of failure to meet short-term cash commitments. Foreign Exchange/Currency Risk is a specific example of market risk that represents the possibility of loss to movement in foreign exchange rates. Business risk is the risk of adverse outcomes due to competitive pressures and/or poor decisions concerning strategy, products, markets, and structures. Operational risk is defined as the exposure to loss from inadequate or failed internal processes, people, and systems. Regulatory/Compliance Risk addresses failure to meet compliance/regulatory requirements resulting in financial penalties and/or reputation damage. Legal Risk arises when an organization becomes subject to financial loss and/or reputation damage as a result of legal actions brought against the company.

TABLE 32

Financial Risk Management 150

| | |
|---|---|
| Description: | Financial Risk Management is the identification, assessment, measurement, management and mitigation of financial risks across the entire enterprise |

Risk Portfolio

| | |
|---|---|
| Basic Criteria: 210 | Inconsistent identification and quantification of risks; risks are addressed individually; no integrated management of risk portfolio |
| Competitive Criteria: 212 | Active focus on identification, quantification, and mitigation of risks; but not managed as a portfolio or in the context of business strategy. |
| Market Leading Criteria: 214 | Risk is optimized and managed as an enterprise wide "risk portfolio" in the context of business strategy |

Organization

| | |
|---|---|
| Basic Criteria: 210 | De-centralized, stand-alone, and sometimes redundant risk management activities |
| Competitive Criteria: 212 | Some coordination of risk management activities; centralized risk management group but with exceptions |
| Market Leading Criteria: 214 | Centralized, fully integrated risk management utilized across the enterprise |

Tools

| | |
|---|---|
| Basic Criteria: 210 | Manual, spreadsheet reliant risk management |
| Competitive Criteria: 212 | Risk management tools used for selected risks; data gathering partially integrated with enterprise systems |
| Market Leading Criteria: 214 | Effective tools to manage both individual risks as well as the overall risk portfolio; data gathering integrated with enterprise systems |

Impact

| | |
|---|---|
| Basic Criteria: 210 | Risks facing the business are not always identified or well understood; risk tolerance and mitigation approach is inconsistent/ad-hoc and is not aligned with business strategy |
| Competitive Criteria: 212 | Risks facing the business are generally identified and well understood; risk tolerance and mitigation approaches are in place, but are inconsistent and not always aligned with business strategy |
| Market Leading Criteria: 214 | Risks facing the business are well understood; risk tolerance and mitigation approach is optimized based on business strategy |

Figure 48:
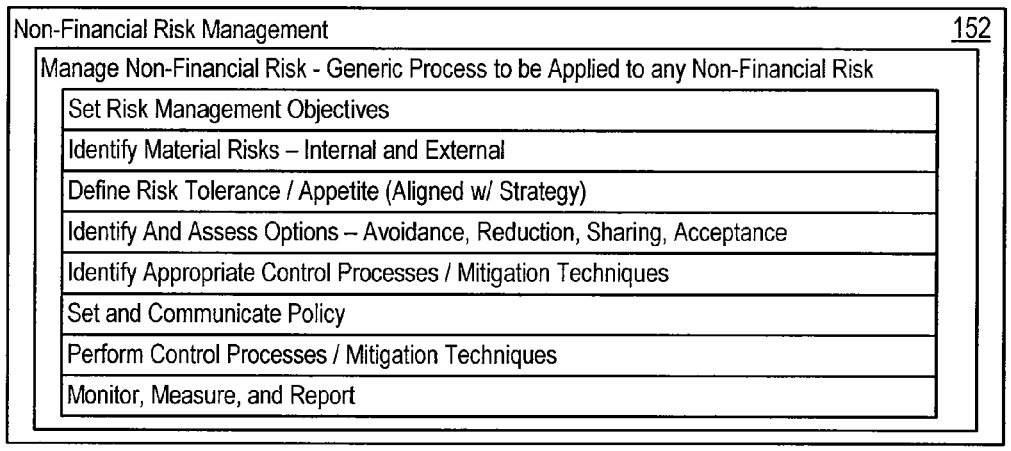
FIG. 48 illustrates capabilities within the 'non-financial risk management' capability corresponding to the 'enterprise risk management' platform.

Table 33 provides an explanation of the non-financial risk management capability 152, key assessment areas within the capability, and corresponding performance capability criteria. FIG. 48 illustrates capabilities within the finance process excellence framework multi-level hierarchy corresponding to the non-financial risk management capability 152.

TABLE 33

Non-Financial Risk Management 152

| | |
|---|---|
| Description: | Non-Financial Risk Management is the identification, assessment, measurement, management and mitigation of non-financial risks across the entire enterprise. |

Risk Portfolio

| | |
|---|---|
| Basic Criteria: 210 | Inconsistent identification and quantification of risks; risks are addressed individually; no integrated management of risk portfolio |
| Competitive Criteria: 212 | Active focus on identification, quantification, and mitigation of risks; but not managed as a portfolio or in the context of business strategy |
| Market Leading Criteria: 214 | Risk is optimized and managed as an enterprise wide "risk portfolio" in the context of business strategy |

Organization

| | |
|---|---|
| Basic Criteria: 210 | De-centralized, stand-alone, and sometimes redundant risk management activities |
| Competitive Criteria: 212 | Some coordination of risk management activities; centralized risk management group but with exceptions |
| Market Leading Criteria: 214 | Centralized, fully integrated risk management utilized across the enterprise |

Tools

| | |
|---|---|
| Basic Criteria: 210 | Manual, spreadsheet reliant risk management |
| Competitive Criteria: 212 | Risk management tools used for selected risks; data gathering partially integrated with enterprise systems |
| Market Leading Criteria: 214 | Effective tools to manage both individual risks as well as the overall risk portfolio; data gathering integrated with enterprise systems |

Impact

| | |
|---|---|
| Basic Criteria: 210 | Risks facing the business are not always identified or well understood; risk tolerance and mitigation approach is inconsistent/ad-hoc and is not aligned with business strategy |
| Competitive Criteria: 212 | Risks facing the business are generally identified and well understood; risk tolerance and mitigation approaches are in place, but are inconsistent and not always aligned with business strategy |
| Market Leading Criteria: 214 | Risks facing the business are well understood; risk tolerance and mitigation approach is optimized based on business strategy |

Table 34 provides an explanation of the finance process excellence platform 102, key assessment areas within the platform, and corresponding performance capability criteria.

TABLE 34

Finance Process Excellence 102

| | |
|---|---|
| Description: | Finance process excellence is a framework that may be implemented as a multi-level hierarchy encompassing all processes for which a CFO may be accountable. |

Finance Function Management

| | |
|---|---|
| Basic Criteria: 210 | Inconsistent identification and quantification of risks; risks are addressed individually; no integrated management of risk portfolio |
| Competitive Criteria: 212 | Active focus on identification, quantification, and mitigation of risks; but not managed as a portfolio or in the context of business strategy |
| Market Leading Criteria: 214 | Risk is optimized and managed as an enterprise wide "risk portfolio" in the context of business strategy |

TABLE 34-continued

Finance Process Excellence 102

Organization

| | |
|---|---|
| Basic Criteria: 210 | De-centralized, stand-alone, and sometimes redundant risk management activities |
| Competitive Criteria: 212 | Some coordination of risk management activities; centralized risk management group but with exceptions |
| Market Leading Criteria: 214 | Centralized, fully integrated risk management utilized across the enterprise |

Tools

| | |
|---|---|
| Basic Criteria: 210 | Manual, spreadsheet reliant risk management |
| Competitive Criteria: 212 | Risk management tools used for selected risks; data gathering partially integrated with enterprise systems |
| Market Leading Criteria: 214 | Effective tools to manage both individual risks as well as the overall risk portfolio; data gathering integrated with enterprise systems |

Impact

| | |
|---|---|
| Basic Criteria: 210 | Risks facing the business are not always identified or well understood; risk tolerance and mitigation approach is inconsistent/ad-hoc and is not aligned with business strategy |
| Competitive Criteria: 212 | Risks facing the business are generally identified and well understood; risk tolerance and mitigation approaches are in place, but are inconsistent and not always aligned with business strategy |
| Market Leading Criteria: 214 | Risks facing the business are well understood; risk tolerance and mitigation approach is optimized based on business strategy |

Figure 5:
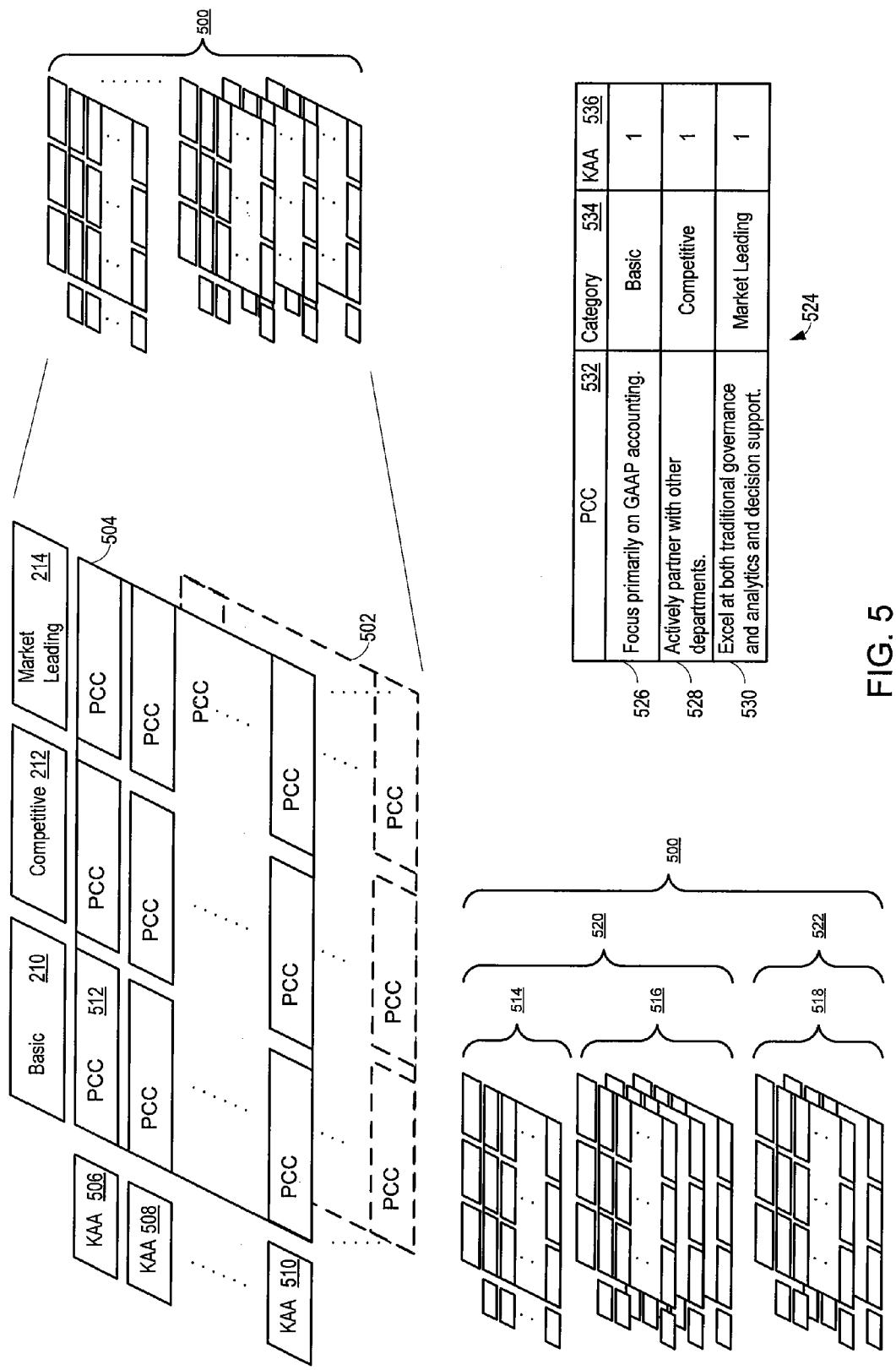
FIG. 5 shows a multidimensional business performance reference set where key assessment performance reference tables may be collected and stored.

FIG. 5 shows a multidimensional industry performance reference set 500 ("reference set 500" that is also referred to as the "capability detail pool") that provides a capability detail pool from which the system described below may obtain benchmarking tables for a business. The reference set 500 includes multiple key assessment performance reference tables ("reference tables"), two of which are labeled 502 and 504. Each reference table may provide the benchmarking criteria for a specific capability, such as those noted above with respect to FIG. 1.

One dimension of each table may establish a 'Basic' performance capability level 210 specifying 'Basic' finance function performance assessment criteria, a 'Competitive' performance capability level 212 specifying 'Competitive' finance function performance assessment criteria, and a 'Market Leading' performance capability level 214 specifying 'Market Leading' finance function performance assessment criteria. Another dimension of each table may specify one or more key assessment areas (KAAs), several of which are labeled 506, 508, and 510. As noted above, performance capability criteria, e.g., the PCC 512, populates each key assessment performance reference table to provide benchmark criteria for 'Basic', 'Competitive', and 'Market Leading' characteristics.

The reference set 500 represents the FF-HPCA model 100. Consistent with the FF-HPCA model 100, the reference set 500 may organize multiple reference tables into a hierarchical structure defining discrete changes in granularity. In one implementation, the hierarchical structure includes reference tables, sub-platforms, platforms, and models. FIG. 5 labels three sub-platforms 514, 516, and 518. With reference to FIG. 1, examples of sub-platforms include finance function management platform 104, finance and accounting operations platform 106, enterprise performance management platform 108, corporate finance platform 110, and enterprise risk management platform 112. The reference set 500 may further organize the sub-platforms into platforms, two of which are labeled 520 and 522. Platforms aggregate into the FF-HPCA model 100 and corresponding reference set 500. Additional, different, or fewer levels of granularity may be defined in the FF-HPCA model 100.

The reference set 500 may dynamically populate the reference tables with the most up-to-date performance capability criteria, for example upon retrieval and presentation by a business analysis consultant. The performance capability criteria may be retrieved from a performance capability criteria database or other information source.

FIG. 5 also shows an example of a database implementation 524 of a portion of a reference table. In particular, the database implementation 524 includes records (e.g., the records 526, 528, 530) that establish each PCC. In the example shown in FIG. 5, each record includes a PCC field 532, a Capability Specifier field 534, a KAA specifier field 536. Other fields may be provided, such as a reference table assignment field or reference set assignment field. The records categorize each PCC into a specific category (e.g., Basic), into a specific KAA, and, optionally, into a specific reference table in a specific reference set for any particular FF-HPCA model.

Figure 6:
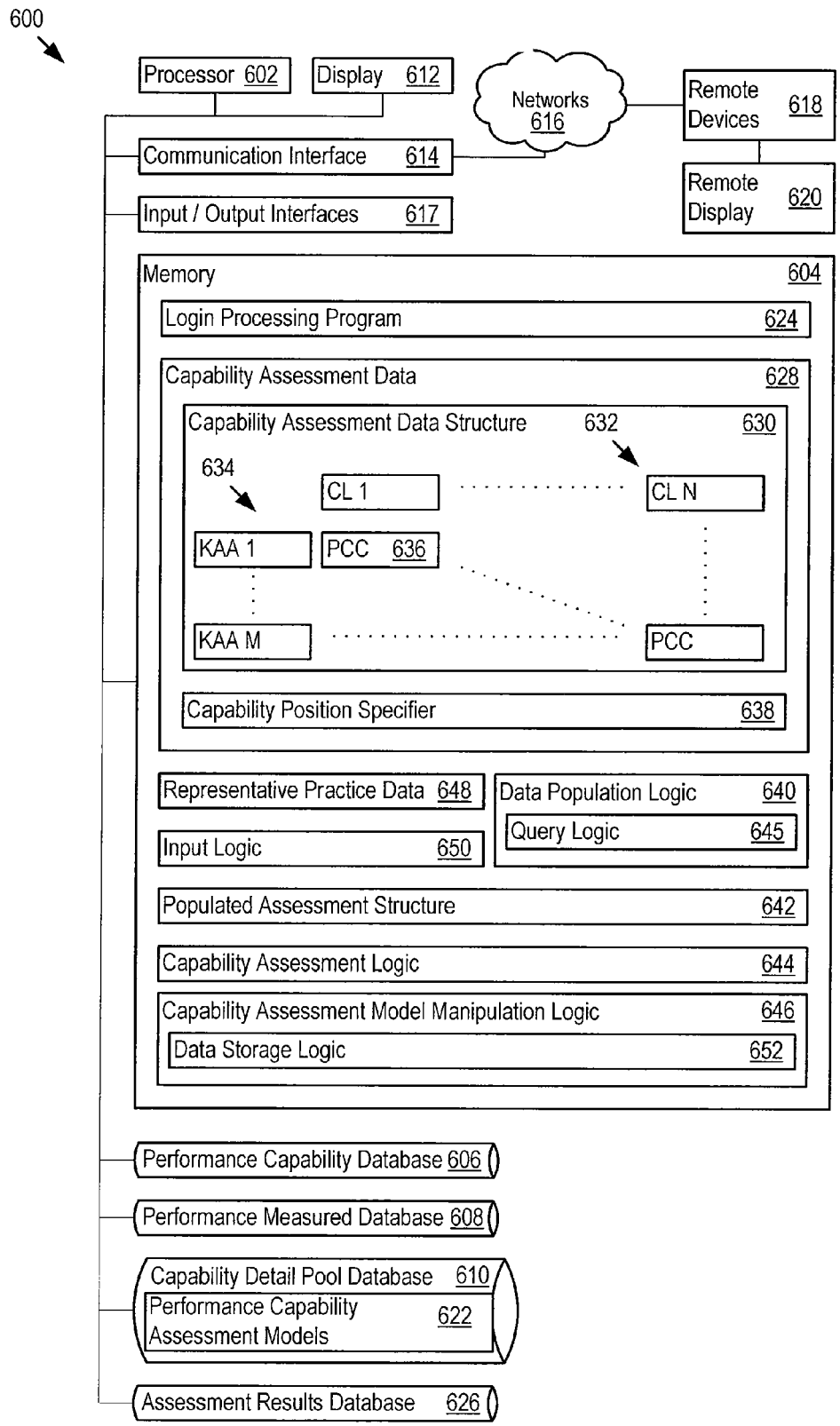
FIG. 6 shows a capability assessment system.

FIG. 6 shows a high performance capability assessment system ("system") 600. The system 600 includes a processor 602 and a memory 604. Several databases support the operation of the system 600, including a performance capability database 606, a performance measured database 608, a capability detail pool database 610, and an assessment results database 626. The system 600 may include a local display 612 and input/output interfaces 617 (e.g., including a keyboard, mouse, microphone, speakers, or other device), and, through the communication interface 614 and networks 616, may communicate with remote devices 618 and remote displays 620. The networks 616 may be any combination of external networks (e.g., the Internet) and internal networks (e.g., corporate LANs). The displays 612 and 620 may, for example, present performance capability assessment models 622 that the system 600 retrieves from the capability detail pool database 610 for review, modification, and application by process engineers or other individuals. With regard to local access or access by the remote devices 618, the system 600 may include a login processing program 624 to authenticate and/or authorize access to the system 600. To that end, the login processing program 624 may include username/password verification, private/public key encryption, or other validation and data protection capabilities.

In one implementation, the performance capability database 606 stores performance capability criteria. As will be described in more detail below, the system 600 may populate performance capability assessment models with performance capability criteria suited to any particular platform (e.g., vision and strategy platform 102, core functions platform 104 and support functions platform 106) and business capability at one or more capability levels across one or more key assessment areas. The performance measured database 608 may store the determined, measured, or otherwise ascertained characteristics, criteria, and other measured data of a particular key assessment area as representative practice data 648. The representative practice data 648 may be obtained through interviews with process engineers, through online questionnaires, through manual or automated analysis of business data (e.g., year end operating reports), or in other manners. The capability detail pool database 610 stores the capability detail pool 500, which includes pre-defined performance capability assessment models 622. The assessment results database 626 stores determined capability levels for specific capabilities that have been analyzed.

The system 600 facilitates the review, modification, creation, and application of performance capability assessment models. In that role, performance capability assessment model manipulation logic ("manipulation logic") 646 within the system 600 creates, retrieves, and stores capability assessment data 628 in the memory 604. The manipulation logic 646 may establish capability assessment data 628 in the memory 604, including a capability assessment data structure 630 with multiple capability levels ("CL") 632 organized along a capability scale dimension, multiple key assessment areas ("KAA") 634 organized along a key factor dimension, and performance capability criteria ("PCC") 636 that populates the performance capability assessment model 630. The manipulation logic 646 may vary widely in implementation, and, as one example, may include data storage logic 652 that saves data in memory and user interface logic that accepts capability level specifications, key assessment area specifications and performance capability criteria inputs to create new performance capability assessment models, modify existing performance capability assessment models, delete performance capability assessment models, or retrieve performance capability assessment models for review. In one implementation, the manipulation logic 646 establishes the capability assessment data structure 630 to include a multidimensional finance function performance reference set that includes multiple key assessment performance reference tables in which the key assessment performance reference tables include a 'Basic' performance capability level, a 'Competitive' performance capability level and a 'Market Leading' performance capability level.

The capability assessment data 628 may also include a capability position specifier 638. The capability position specifier 638 may record the capability level along the performance capability scale 216, as determined for any particular capability. Thus, the system 600 may store the capability level in the assessment results database 626 or elsewhere for future retrieval and review.

In one implementation, the data population logic 640 may be a data population program executed by the processor 602 that populates template performance capability assessment models. For example, the data population logic 640 may include input logic 650 that accepts input specifying a capability of interest that indicates a particular performance capability assessment model. The data population logic 640 may include query logic 645 that executes database queries and prompts a user for input to obtain the corresponding performance capability criteria for the capability of interest.

In one implementation, as an example, the query logic 645 may receive an input specifying a finance function area and finance function key assessment area with the finance function area for analysis. The query logic 645 searches the multidimensional finance function performance reference set for a matching key assessment performance reference table that matches the finance function area and the finance function key assessment area, and retrieves the matching key assessment performance reference table.

The data population logic 640 may further include storage logic that adds the retrieved performance capability criteria to the template performance capability assessment model. The data population logic 640 produces populated performance capability assessment models 642 that may be stored in the capability detail pool database 610.

In addition to the analysis process described above, the system 600 may provide an automated analysis of representative practice data 648 that identifies relevant performance capability criteria and determines the position on the performance capability scale 216 of each key assessment area corresponding to the performance capability criteria for the representative practice data 648. As one example, the system 600 may implement capability assessment logic 644 that includes comparison and/or matching logic that analyzes the representative practice data 648 with respect to performance capability criteria to locate key assessment areas for which the system 600 can determine capability levels to obtain a resultant performance capability level for each key assessment area.

Furthermore, the capability assessment logic 644 may determine an overall position on the performance capability scale 216, shown in FIG. 6 as the capability position specifier 638, for a capability under examination given the knowledge of where the key assessment areas corresponding to the capability under examination fall in each capability level. Thus, for example, the capability assessment logic 644 may determine an overall capability level for a capability corresponding to the capability level for the majority of the key assessment areas, or it may apply a weighted analysis technique to give more emphasis to some key assessment areas than others in determining the overall position on the performance capability scale 216 for a capability. As another example, the capability assessment logic 644 may implement an expert system (e.g., based on a neural network trained on prior determinations) that analyzes the determined characteristics with respect to the performance capability criteria and ascertains where the capability under examination falls along the performance capability scale 216 for each of the key assessment areas, or overall on the performance capability scale 216.

Figure 7:
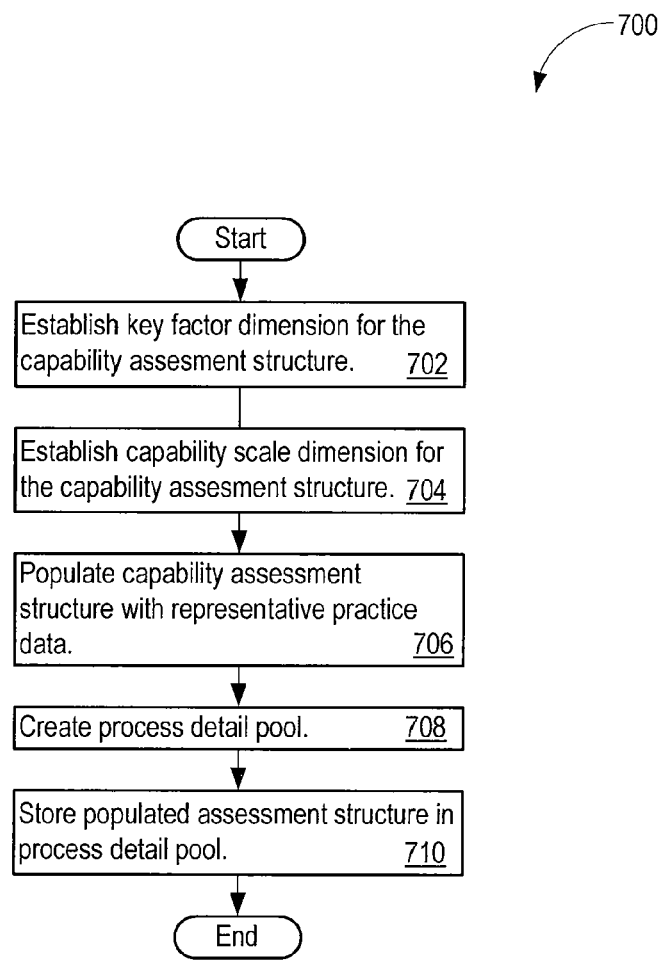
FIG. 7 shows a flow diagram for establishing high performance capability assessment models.

FIG. 7 shows a flow diagram 700 for creating performance capability assessment models. The performance capability assessment model creator (e.g., the manipulation logic 646) establishes a key factor dimension for the performance capability assessment model (702). As one specific example, the performance capability assessment model creator establishes, in the key factor dimension, key assessment areas: a new product development key assessment area 130, a engineering key assessment area 132, a product lifecycle management key assessment area 134, a procurement strategy key assessment area 136, a strategic sourcing and category management key assessment area 138, a requisition to pay key assessment area 140, a supplier relationship management key assessment area 142, a production forecasting planning and scheduling key assessment area 144, a inbound logistics key assessment area 146, a manufacturing and assembly key assessment area 148, and a outbound logistics key assessment area 150.

The performance capability assessment model creator also establishes a capability scale dimension for the performance capability assessment model (704). The capability scale dimension may define a scale of increasing organizational capability. For example, the structure creator may create a 'Basic' capability level 210, a 'Competitive' capability level 212, and a 'Market Leading' capability level 214.

The performance capability assessment model creator also populates the performance capability assessment model with performance capability criteria (706). A capability detail pool 500 may be formed to hold multiple tailored key assessment performance reference tables (708). The performance capability assessment model creator may store the populated assessment structure in the capability detail pool for subsequent retrieval and analysis (710).

Figure 8:
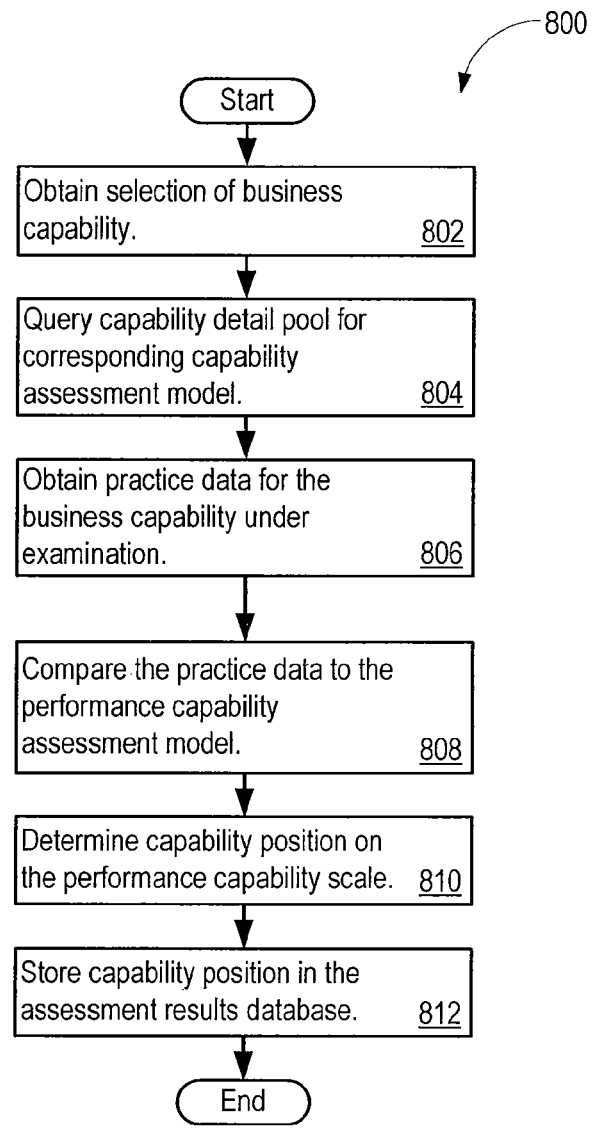
FIG. 8 shows a flow diagram for retrieving and applying high performance capability assessment models.

FIG. 8 shows a flow diagram 800 for retrieving and applying performance capability assessment models. A selection of a capability to be analyzed is obtained (802). In one implementation, the system 600 receives input data that specifies a finance function area and a finance function key assessment area for analysis. For example, the system 600 may accept input from a business consultant that specifies a capability for analysis. The system 600 may query the capability detail pool 500 for a corresponding performance capability assessment model (804). The corresponding performance capability assessment model may be pre-defined in the capability detail pool 500, or the data population logic 630 (or other actor) may populate a performance capability assessment model template that the system 600 newly creates, or that the system 600 retrieves from a data store, such as the capability detail pool database 610.

In another example, the system 600 searches the multidimensional finance function performance reference set (e.g., capability detail pool) 500 for a matching key assessment performance reference table based on the input data that specifies a finance process excellence platform and finance process excellence key assessment area. The system 600 retrieves the matching key assessment performance reference table and initiates analysis of the matching key assessment performance reference table to obtain a resultant performance capability level for the finance process excellence key assessment area.

The system 600 obtains representative practice data 648 for the capability under examination in the specific business under review (806). For example, a business consultant may interview the business to determine how the business currently executes the capability under review. As another example, a representative from the business may complete a questionnaire, submit business data for analysis and parameter extraction, or otherwise provide the characteristics of their current capability execution. As a further example, the system 600 may retrieve the representative practice data 648 from a database of previously obtained representative practice data.

The system 600 compares the representative practice data 648 to the performance capability criteria in the performance capability assessment model (808). For example, a business consultant may use their expertise to arrive at a determination of capability level for the business and the capability under examination (810). Alternatively or additionally, the capability assessment logic 644 may perform an automated analysis of the assessment results data in the assessment results database 626 and ascertain the capability level on the performance capability scale 216 (810). The system 600 may store the assessment results, including the determined capability level, for future reference in the assessment results database 626 or other location (812).

Figure 9:
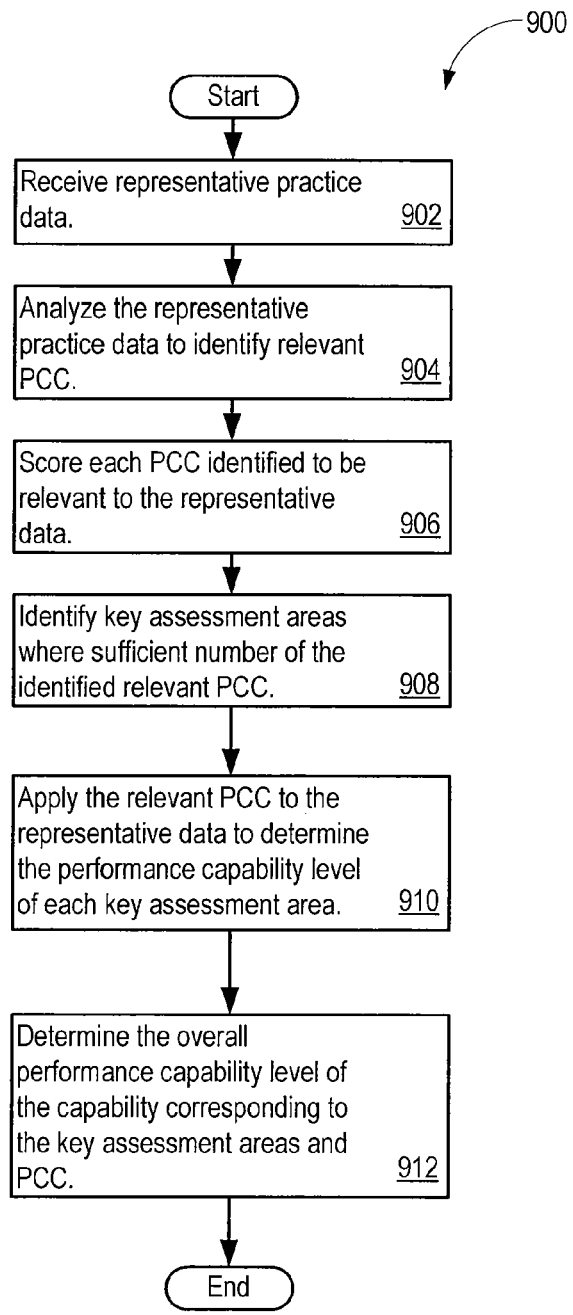
FIG. 9 shows a flow diagram for analyzing representative practice data to determine a business key assessment area to which representative practice data applies.

FIG. 9 shows a flow diagram 900 for analyzing representative practice data 648 to determine a key assessment area to which the representative practice data applies. The system 600 receives representative practice data 648 as input data (902). The system 600 may receive the representative practice data 648 from a database query performed by the query logic 645 that the query logic 645 executes periodically, when instructed by an operator, and/or automatically against any number of available database sources that store representative practice data 648. The capability assessment logic 644 analyzes the representative practice data 648 to identify performance capability criteria in the capability detail pool 500 that the capability assessment logic 644 determines relevant to the representative practice data 648 (904). For example, the capability assessment logic 644 may compare and/or match the content of the representative practice data 648 with the performance capability criteria using natural language processing (NLP), text string and/or substring matching, by comparing tags linked to the representative practice data 648 and that specify that any portion of the representative practice data 648 is applicable to a specific PCC, by querying for a manual classification of the representative practice data 648 to a PCC, or other matching technique. The capability assessment logic 644 may score and/or weight a performance capability criteria and compare the score and/or weight to a user specified relevance threshold to rank the relevance of the performance capability criteria to the representative practice data 648 (906). The user may specify particular terms and/or phrases to search and match between the performance capability criteria and the representative practice data 648, in order to score the performance capability criteria.

The capability assessment logic 644 may determine, based on the number of performance capability criteria that meet or exceed the relevance threshold, that the capability assessment logic 644 has identified a sufficient number of performance capability criteria for a specific key assessment area in order to determine a performance capability level for the capability as a whole or any key assessment area within the capability (908). As one example, where at least 51% of the performance capability criteria for a particular key assessment area meet or exceed the relevance threshold, the capability assessment logic 644 applies the performance capability criteria to the representative practice data 648. In another example, the performance capability criteria for a particular key assessment area may be ranked in importance and/or designated as mandatory in order to assess the key assessment area. In the event the capability assessment logic 644 identifies the mandatory performance capability criteria for a key assessment area the capability assessment logic 644 applies the performance capability criteria to the representative practice data 648.

The capability assessment logic 644 may apply the performance capability criteria meeting or exceeding the relevance threshold to the representative practice data 648 to determine whether any particular PCC is met. Accordingly, as the capability assessment logic 644 analyzes the PCC, the system 600 tracks the best fit of the representative practice data 648 to the PCCs in the key assessment performance reference tables. In other words, the system 600 determines how the representative practice data 648 meets (or does not meet) each PCC, thereby gaining insight into whether the representative practice data 648 is indicative of Basic, Competitive, or Market Leading practices.

The system 600 may also gauge the position on the performance capability scale 216 of each key assessment area corresponding to the performance capability criteria (910). The capability assessment logic 644 may further determine an overall position on the performance capability scale 216 for a capability (912). The capability assessment logic 644 may established that a desired number and/or designated mandatory performance capability criteria for the key assessment areas have been identified as relevant to a capability and sufficient to determine the position on the performance capability scale 216 for the capability. For example, the capability assessment logic 644 may determine an overall capability level for the capability based on the capability level determined for the majority of the key assessment areas. The capability assessment logic 644 may apply a weighted analysis technique to give more emphasis to some key assessment areas than others in determining the overall position on the performance capability scale 216 for the capability.

Although selected aspects, features, or components of the implementations are depicted as being stored in computer-readable memories (e.g., as computer-executable instructions or performance capability assessment models), all or part of the systems and structures may be stored on, distributed across, or read from other computer-readable media. The computer-readable media may include, for example, secondary storage devices such as hard disks, floppy disks, and CD-ROMs; a signal, such as a signal received from a network or received at an antenna; or other forms of memory, including ROM or RAM, either currently known or later developed.

Various implementations of the system may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be combined or split among multiple programs, or distributed across several memories and processors.

The FF-HPCA model provides unexpectedly good results for a performance capability assessment model, particularly in the finance functions of organizations. In particular, the combinations of key assessment areas and particular assessment criteria of the FF-HPCA model, including the criteria noted in Tables 1-34 above, provide significant advantages over other assessment models. The unexpectedly good results include clearly identifying and delineating from among multiple related complex processes specific processes to improve, and how to improve the process and identifying concrete and measurable improvement goals.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer-implemented method for high performance capability assessment of a finance-based business, comprising:
    defining, by a processor coupled to a machine-readable memory, a multidimensional industry performance reference set stored in the memory and comprising multiple key assessment performance reference tables, each of the multiple key assessment performance reference tables further comprising:
    a Basic performance capability level specifying Basic finance function performance assessment criteria in the finance-based business to identify a proper role of finance, the Basic performance criteria including where focus is primarily on GAAP accounting, financial performance, and traditional governance, where there is no active or effective partnering with the rest of the organization, and where the needs of internal customers has not been explicitly surveyed;
    a Competitive performance capability level specifying Competitive finance function performance assessment criteria in the finance-based business to identify a proper role of finance, the competitive performance criteria including where the business actively partners with other departments but potential for better integration remains, where some business support and problem resolution advice is provided but competes with other groups, and where less time than desired is spent on high value activities;
    a Market Leading performance capability level specifying Market Leading finance function performance assessment criteria in the finance-based business to identify a proper role of finance, the Market Leading performance criteria including where both traditional governance and analytics/decision support excels, where a large percentage of time is spent on high value activities; and where a value creation mindset and financial acumen has infused the entire enterprise;
    receiving, through a communication interface coupled to the processor, an input specifying an industry area in the finance-based business and an industry assessment area for analysis;
    searching, by the processor, the multidimensional industry performance reference set for a matching key assessment performance reference table that matches the industry area and the industry key assessment area;
    retrieving, using the processor, the matching key assessment performance reference table;
    analyzing, by the processor, the matching key assessment performance reference table; and
    obtaining, by the processor, a resultant finance-based performance capability level for the industry key assessment area.

2. The computer-implemented method of claim 1, where establishing further comprises:
    establishing a finance function management platform, the finance function management platform establishing a 'manage finance organization' key assessment performance reference table and a 'drive enterprise wide change' key assessment performance reference table.

3. The computer-implemented method of claim 1, where establishing further comprises:
    establishing a finance and accounting operations platform, the finance and accounting operations platform establishing a 'general accounting and reporting (record to report)' key assessment performance reference table, a 'fixed asset accounting' key assessment performance reference table, a 'purchase to pay' key assessment performance reference table, a 'travel and expense reimbursements' key assessment performance reference table, an 'order to cash' key assessment performance reference table, a 'product costing and inventory accounting' key assessment performance reference table, a 'payroll' key assessment performance reference table, and a 'maintain finance systems and data structures' key assessment performance reference table.

4. The computer-implemented method of claim 3, where establishing the Basic performance assessment criteria comprises:
    establishing 'record transactions Basic' performance assessment criteria, including:
    a first criteria: heavy focus on transaction capture, month-end close and accurate accounting;
    a second criteria: heavy focus on month-end close; and
    a third criteria: heavy focus on accurate accounting;
    establishing 'perform inter-company accounting Basic' performance assessment criteria, including:
    a fourth criteria: closing and reporting cycle times are slower than peers; and
    a fifth criteria: one of the last companies in the industry to report results after a quarter ends;

establishing 'accuracy Basic' performance assessment criteria, including:
  a sixth criteria: financial results finalized after many audit adjustments;
  a seventh criteria: internal users often question the accuracy of management reporting; and
  a eighth criteria: restatements are required periodically; and
establishing 'reporting content Basic' performance assessment criteria, including:
  a ninth criteria: reporting content designed to meet external reporting requirements is also used for management reporting; and
  a tenth criteria: limited value added management reporting.

5. The computer-implemented method of claim 3, where establishing the Competitive performance assessment criteria comprises:
  establishing 'record transactions Competitive' performance assessment criteria, including:
    a first criteria: close process is a challenge, but moderate focus on management reporting and analysis;
  establishing 'perform inter-company accounting Competitive' performance assessment criteria, including:
    a second criteria: closing and reporting cycle times are consistent with peers;
  establishing 'accuracy Competitive' performance assessment criteria, including:
    a third criteria: limited audit adjustments are required to finalize financial results;
    a fourth criteria: internal users question the accuracy of selected management reporting, but management reporting is considered accurate overall; and
    a fifth criteria: restatements are extremely rare; and
  establishing 'reporting content Competitive' performance assessment criteria, including:
    a sixth criteria: reporting content feeds distinct management reports in addition to financial reports; and
    a seventh criteria: management reporting meets some of the needs of internal users.

6. The computer-implemented method of claim 3, where establishing the Market Leading performance assessment criteria comprises:
  establishing 'record transactions Market Leading' performance assessment criteria, including:
    a first criteria: Heavy focus on management reporting and analysis, rather than just basic accounting;
  establishing 'perform inter-company accounting Market Leading' performance assessment criteria, including:
    a second criteria: closing and reporting cycle times are materially faster than peers; and
    a third criteria: one of the first companies in the industry to report results after a quarter end; and
  establishing 'accuracy Market Leading' performance assessment criteria, including:
    a fourth criteria: few, if any, audit adjustments are required to finalize financial results; and
    a fifth criteria: Internal management reporting is considered highly accurate by all users;
    a sixth criteria: restatements are essentially unheard of; and
  establishing 'reporting content Market Leading' performance assessment criteria, including:
    a seventh criteria: reporting content feeds distinct management reports in addition to financial reports; and
    a eighth criteria: reporting is adequate to meet the needs of all users, both internal and external users.

7. The computer-implemented method of claim 1, where establishing further comprises:
  establishing a enterprise performance management platform, the enterprise performance management platform establishing a 'strategic planning/shareholder value targeting' key assessment performance reference table, a 'target setting' key assessment performance reference table, a 'planning, resource allocation and forecasting' key assessment performance reference table, and a 'performance reporting and analytics' key assessment performance reference table.

8. The computer-implemented method of claim 7, where establishing the Basic performance assessment criteria comprises:
  establishing 'focus/objective Basic' performance assessment criteria, including:
    a first criteria: strategic planning is essentially a long-term forecasting exercise, with a focus on incremental changes;
  establishing 'link to shareholder value Basic' performance assessment criteria, including:
    a second criteria: Strategic planning not always shareholder value-driven;
  establishing 'use of business drivers Basic' performance assessment criteria, including:
    a third criteria: limited use of business drivers in planning process;
    a fourth criteria: linkage to strategy and future value is not well understood; and
  establishing 'driver cause and effect Basic' performance assessment criteria, including:
    a fifth criteria: limited use of business drivers;
    a sixth criteria: no quantitative testing of linkage to shareholder value creation;
  establishing 'link to target setting Basic' performance assessment criteria, including:
    a seventh criteria: Strategic plan stands alone; and
  establishing 'result measures Basic' performance assessment criteria, including:
    a eighth criteria: many profit and lost (P&L) focused performance measures; and
    a ninth criteria: P&L focused performance measures neither well-defined nor consistent across the organization; and
  establishing 'intangible assets Basic' performance assessment criteria, including:
    a tenth criteria: Intangible assets not accepted as value drivers; and
    a ninth criteria: intangible asset performance neither explicitly measured nor actively managed.

9. The computer-implemented method of claim 7, where establishing the Competitive performance assessment criteria comprises:
  establishing 'focus/objective Competitive' performance assessment criteria, including:
    a first criteria: focus is on longer term and/or structural changes, but only loosely linked to shareholder value;
  establishing 'link to shareholder value Competitive' performance assessment criteria, including:
    a second criteria: strategic planning loosely driven by shareholder value;
    a third criteria: strategic planning not always an explicit link to shareholder value;
    a fourth criteria: no formal enterprise value model is used; and establishing 'use of business drivers Competitive' performance assessment criteria, including:
a fifth criteria: business drivers are used;
a sixth criteria: drivers are only partially identified and/or not prioritized;
establishing 'driver cause and effect Competitive' performance assessment criteria, including:
a seventh criteria: focus on current value drivers with assumed cause and effect linkages (conceptual linkage); and
establishing 'link to target setting Competitive' performance assessment criteria, including:
a eighth criteria: Partial linkage to targets and budgets; and
a ninth criteria: changes to strategy do not always result in changes to targets and budgets; and
establishing 'result measures Competitive' performance assessment criteria, including:
a tenth criteria: driver based measures are used in addition to traditional P&L measures; and
a eleventh criteria: driver based measures may not be prioritized or used consistently; and
establishing 'intangible assets Competitive' performance assessment criteria, including:
a twelfth criteria: Intangible assets accepted as key drivers of value; and
a thirteenth criteria: intangible asset performance is not consistently measured or actively managed.

10. The computer-implemented method of claim 7, where establishing the Market Leading performance assessment criteria comprises:
establishing 'focus/objective Market Leading' performance assessment criteria, including:
a first criteria: strategic plan focuses on the financial, operational, and structural changes needed to achieve shareholder value objectives;
establishing 'link to shareholder value Market Leading' performance assessment criteria, including:
a second criteria: strategic planning is firmly grounded in shareholder value;
a third criteria: external focus on current and future value;
establishing 'use of business drivers Market Leading' performance assessment criteria, including:
a fourth criteria: both current and future value drivers are identified, prioritized, and clearly linked to strategy; and
establishing 'driver cause and effect Market Leading' performance assessment criteria, including:
a fifth criteria: cause and effect linkages between drivers and results are well-understood and quantitatively tested;
establishing 'link to target setting Market Leading' performance assessment criteria, including:
a sixth criteria: strategic plan explicitly linked to targeting and resource allocation;
establishing 'result measures Market Leading' performance assessment criteria, including:
a seventh criteria: consistent, prioritized, clearly-defined key result measures of successful execution of strategy with direct linkage to total return to shareholders; and
establishing 'intangible assets Market Leading' performance assessment criteria, including:
a eighth criteria: intangible assets accepted as key drivers of future value and managed actively.

11. The computer-implemented method of claim 1, where establishing further comprises:
establishing a corporate finance platform, the corporate finance platform establishing a 'internal controls' key assessment performance reference table, a 'investor relations' key assessment performance reference table, a 'treasury and cash management' key assessment performance reference table, and an 'corporate tax' key assessment performance reference table.

12. The computer-implemented method of claim 1, where establishing further comprises:
establishing a enterprise risk management platform, the enterprise risk management platform establishing a 'financial risk management' key assessment performance reference table, and a 'non-financial risk management' key assessment performance reference table.

13. The computer-implemented method of claim 1, where establishing further comprises:
establishing a finance process excellence platform, the finance process excellence platform establishing a 'finance function management' platform comprising a 'identify proper role of finance' key assessment performance reference table, a 'understand needs of internal customers' key assessment performance reference table, a 'manage delivery of finance services' key assessment performance reference table, a 'manage cost of finance' key assessment performance reference table, a manage performance of finance function' key assessment performance reference table, a 'create/maintain finance organization structure' key assessment performance reference table, a 'manage finance workforce; develop finance skills' key assessment performance reference table, and a 'continuously improve finance function' key assessment performance reference table.

14. A computer-implemented method for high performance capability assessment of a finance-based business, comprising:
defining, by a processor coupled to a machine-readable memory a multidimensional industry performance reference set stored in the memory and comprising multiple key assessment performance reference tables, each of the multiple key assessment performance reference tables further comprising:
a Basic performance capability level specifying Basic finance function performance assessment criteria in the finance-based business to manage a cost of finance, the Basic performance criteria including where the true cost of finance may or may not be known, where there is a limited understanding of cost drivers of cost, and where no formal cost reduction program exists;
a Competitive performance capability level specifying Competitive finance function performance assessment criteria in the finance-based business to manage a cost of finance, the Competitive performance criteria including where a total cost of finance has been accurately measured, where the drivers of cost are understood, and where a strategic cost reduction program has been initiated and has realized some benefits;
a Market Leading performance capability level specifying Market Leading finance function performance assessment criteria in the finance-based business to manage a cost of finance, the Market Leading performance criteria including where a total cost of finance has been accurately measured, where cost drivers are understood, and where a desired cost position has been achieved;
obtaining, by the processor, representative practice data of the finance-based business;
evaluating, by the processor, the representative practice data to determine an industry and a key assessment area to which the representative practice data applies;
searching, by the processor, the multidimensional industry performance reference set for a matching key assessment performance reference table that matches the industry area and the industry key assessment area;

retrieving, by the processor, the matching key assessment performance reference table; and analyzing, by the processor, the matching key assessment performance reference table; and obtaining by the processor a resultant finance-based performance capability level for the industry key assessment area.

15. A non-transient computer-readable memory or data storage means encoded with data representing a computer program for a high-performance capability assessment of a financed-based business, the computer-readable memory or data storage means causing the computer to perform the acts of:

providing a processor and operatively coupling the processor to a communication network;

providing one or more databases operatively coupled to the processor and accessible through the communication network;

coupling an interface to the processor for receiving input;

establishing a machine-readable memory in said one or more databases, including a multidimensional industry performance reference set comprising multiple key assessment performance reference tables, at least one key assessment performance reference table defining:

a Basic performance capability level specifying Basic performance assessment criteria in the finance-based business where an organizational structure has evolved over time without conscious design, where shared services are used for selected transactional processes, and where use of low cost locations is limited;

a Competitive performance capability level specifying Competitive performance assessment criteria in the finance-based business where an organizational structure has been consciously designed, but is not yet optimized, where heavy use of shared services center (SSCs), low cost locations, and outsourcing exists, and where ongoing efforts to refine controllership and financial planning and analysis (FP&A) structures exist;

Market Leading performance capability level specifying Market Leading performance assessment criteria in the finance-based business where an organizational structure has been consciously designed and optimized, where all transactional activities occur in SSCs, low cost locations, or are outsourced, and where centers of excellence (COEs) are used;

receiving an input specifying an industry area and an industry key assessment area for analysis;

searching the multidimensional industry performance reference set for a matching key assessment performance reference table that matches the industry area and the industry key assessment area;

retrieving the matching key assessment performance reference table;

analyzing the matching key assessment performance reference table; and obtaining finance-based resultant performance capability level for the industry key assessment area.

16. The non-transient computer-readable medium of claim 15, further comprising computer-readable content to cause a computer to perform acts of establishing a finance function management platform, the finance function management platform establishing a 'manage finance organization' key assessment performance reference table and an 'drive enterprise wide change' key assessment performance reference table.

17. The non-transient computer-readable medium of claim 16, further comprising computer-readable content to cause a computer to perform acts of establishing 'identify proper role of finance Basic' performance assessment criteria, further including:

a first criteria: focus primarily on generally accepted accounting practice (GAAP) accounting, financial performance, and traditional governance;

a second criteria: finance does not actively or effectively partner with the rest of the organization;

a third criteria: finance has not explicitly surveyed the needs of internal customers;

a fourth criteria: limited link between customer needs and finance services provided;

establishing 'manage cost of finance Basic' performance assessment criteria, further including:

a fifth criteria: may know the true cost of finance;

a sixth criteria: limited understanding of cost drivers of cost; no formal cost reduction program;

establishing 'organization structure Basic' performance assessment criteria, further including:

a seventh criteria: organization structure has "evolved" over time without conscious design;

a eighth criteria: shared services used for selected transactional processes;

a ninth criteria: limited use of low cost locations;

establishing 'manage finance workforce/develop finance skills Basic' performance assessment criteria, further including:

a tenth criteria: basic finance and accounting skills;

a eleventh criteria: limited business acumen, deep specialization, or analysis capabilities; and establishing 'continuously improve finance function Basic' performance assessment criteria, further including:

a twelfth criteria: one-off initiatives targeted at fixing problems/fighting fires;

a thirteenth criteria: no formal, clearly defined finance roadmap;

a fourteenth criteria: inconsistent tracking of finance metrics.

18. The non-transient computer-readable medium of claim 16, further comprising computer-readable content to cause a computer to perform acts of establishing establish 'identify proper role of finance Competitive' performance assessment criteria, further including:

a first criteria: actively partners with other departments but potential for better integration remains;

a second criteria: provides some business support and problem resolution advice but competes with other groups for this role;

a third criteria: spends less time than desired on high value activities;

a fourth criteria: limited link between customer needs and finance services provided;

a fifth criteria: finance has informally identified needs of internal customers;

establishing 'manage cost of finance Competitive' performance assessment criteria, further including:

a sixth criteria: Has accurately measured total cost of finance;

a seventh criteria: understands drivers of cost; has begun strategic cost reduction program and realized some benefits;

establishing 'organization structure Competitive' performance assessment criteria, further including:
   a eighth criteria: Organization structure has been consciously designed, but is not yet optimized;
   a ninth criteria: heavy use of shared services centers (SSCs)/low cost locations/outsourcing;
   a tenth criteria: ongoing efforts to refine controllership and 'financial planning and analysis' (FP&A) structures;

establishing 'manage finance workforce/develop finance skills Competitive' performance assessment criteria, further including:
   a eleventh criteria: Strong finance & accounting skills; and
   a twelfth criteria: moderate business acumen/analysis skills;
   a thirteenth criteria: deep specialists in selected areas;
   a fourteenth criteria: basic value creation mindset;

establishing 'continuously improve finance function Competitive' performance assessment criteria, further including:
   a fifteen criteria: Continuous improvement mindset without a formal program;
   a sixteen criteria: collection of individual initiatives;
   a seventeen criteria: selected tracking of finance cost/performance metrics.

19. The non-transient computer-readable medium of claim 16, further comprising computer-readable content to cause a computer to perform acts of
   establishing 'identify proper role of finance Market Leading' performance assessment criteria, further including:
      a first criteria: Excels at both traditional governance and analytics/decision support;
      a second criteria: large percent of time spent on high value activities;
      a third criteria: intimate business partner with business unit (BU) management;
      a fourth criteria: has infused entire enterprise with value mindset and financial acumen;
      a fifth criteria: considered the primary organization for decision support;
      a sixth criteria: explicitly identified needs of internal customers;
      a seventh criteria: consciously makes cost vs. service level decisions;
   establishing 'manage cost of finance Market Leading' performance assessment criteria, further including:
      a eighth criteria: Accurately measured total cost of finance;
      a ninth criteria: understands cost drivers;
      a tenth criteria: achieved desired cost position;
   establishing 'organization structure Market Leading' performance assessment criteria, further including:
      a eleventh criteria: Organization structure has been consciously designed and optimized; and
      a twelfth criteria: all transactional activities in shared services centers (SSCs)/low cost locations/outsourced;
      a thirteenth criteria: centers of excellence (COEs) used where appropriate;
      a fourteenth criteria: analysts properly aligned with business units;
   establishing 'manage finance workforce/develop finance skills Market Leading' performance assessment criteria, further including:
      a fifteen criteria: Very strong finance & accounting and business acumen skills; and
      a sixteen criteria: deep specialists in all relevant areas;
      a seventeen criteria: deep understanding of value creation;
   establishing 'continuously improve finance function Market Leading' performance assessment criteria, further including:
      a eighteen criteria: Formal, ongoing improvement program;
      a nineteen criteria: senior leader/sponsor; and
      a twenty criteria: regular tracking of finance cost/performance metrics; and
      a twenty-first criteria: constant process of increasing requirements.

20. The non-transient computer-readable medium of claim 15, further comprising computer-readable content to cause a computer to perform acts of establishing a finance and accounting operations platform, the finance and accounting operations platform establishing a 'general accounting and reporting (record to report)' key assessment performance reference table, an 'fixed asset accounting' key assessment performance reference table, a 'purchase to pay' key assessment performance reference table, a 'travel and expense reimbursements' key assessment performance reference table, a 'order to cash' key assessment performance reference table, a 'product costing and inventory accounting' key assessment performance reference table, a 'payroll' key assessment performance reference table, and a 'maintain finance systems and data structures' key assessment performance reference table.

21. The non-transient computer-readable medium of claim 20, further comprising computer-readable content to cause a computer to perform acts of
   establishing 'drive a value focus into enterprise Basic' performance assessment criteria, further including:
      a first criteria: Heavy focus on "getting the accounting right", "making plan" and "increasing current profit";
      a second criteria: limited shareholder value focus;
      a third criteria: finance as a whole cannot claim to deeply understand how the enterprise creates shareholder value;
   establishing 'decision making framework Basic' performance assessment criteria, further including:
      a fourth criteria: Limited value based analysis is performed;
      a fifth criteria: key business decisions are made without adequate information;
      a sixth criteria: key business decisions are based on simplistic frameworks;
   establishing 'level of finance influence Basic' performance assessment criteria, further including:
      a seventh criteria: Finance has only partial control of traditional finance activities and must often seek "permission" to makes finance function changes; and
      a eighth criteria: limited or no finance influence outside of the finance function;
   establishing 'act as change agent across the enterprise Basic' performance assessment criteria, further including:
      a ninth criteria: Finance is typically in a reactive mode, racing to respond to changes driven from elsewhere in the organization;
      a tenth criteria: typically plays a relatively minor role in major business transformation efforts.

22. The non-transitory computer-readable medium of claim 20, further comprising computer-readable content to cause a computer to perform acts of
establishing 'drive a value focus into enterprise Competitive' performance assessment criteria, further including:
a first criteria: Finance understands value creation but has not yet infused the rest of this enterprise with this mindset;
a second criteria: more senior employees understand how their actions contribute to the achievement of business goals, but this understanding has not filtered down to lower levels;
establishing 'decision making framework Competitive' performance assessment criteria, further including:
a third criteria: Business decisions are generally based on value analysis;
a fourth criteria: profit, cash flow, capital, and risk are all considered;
a fifth criteria: important information is often unavailable;
a sixth criteria: instinct is relied on more often executives would prefer;
establishing 'level of finance influence Competitive' performance assessment criteria, further including:
a seventh criteria: Finance has complete control over "traditional finance" activities and can manage the finance function as it sees fit; and
a eighth criteria: finance has only selective influence outside of finance function however;
establishing 'act as change agent across the enterprise Competitive' performance assessment criteria, further including:
a ninth criteria: Finance reacts quickly to enterprise-wide change;
a tenth criteria: proactively drives changes within its own organization;
a eleventh criteria: not truly a change agent across the enterprise; and
a twelfth criteria: often plays a key supporting role in major business transformation efforts.

23. The non-transitory computer-readable medium of claim 20, further comprising computer-readable content to cause a computer to perform acts of
establishing 'drive a value focus into enterprise Market Leading' performance assessment criteria, further including:
a first criteria: Finance deeply understands shareholder value creation and has infused the entire organization with a value creation mindset and financial acumen;
a second criteria: employees at all organizational levels understand how individual actions contribute to achievement of business goals;
establishing 'decision making framework Market Leading' performance assessment criteria, further including:
a third criteria: All key business decisions are based on rigorous value analysis prepared with accurate and timely data;
a fourth criteria: profit, cash flow, capital, and risk (short term and long term) are all considered;
a fifth criteria: executive experience and instinct supplements the analysis but does not replace the analysis;
establishing 'level of finance influence Market Leading' performance assessment criteria, further including:
a sixth criteria: Finance influence extend well beyond the finance organization;
a seventh criteria: finance is involved in all major decisions pertaining to the future of the company; and
establishing 'act as change agent across the enterprise Market Leading' performance assessment criteria, including:
a eighth criteria: Finance is proactive in driving both finance-specific and enterprise-wide change aligned with company strategy and with shareholder value creation;
a ninth criteria: viewed as a change agent;
a tenth criteria: often plays a lead role in major business transformation efforts.

24. A system comprising:
a processor; and
a memory coupled to the processor, the memory further comprising:
performance capability assessment model manipulation logic operable to a establish a multidimensional industry performance reference set, where the multidimensional industry performance reference set comprises multiple key assessment performance reference tables, where each of the multiple key assessment performance reference tables further comprise:
a Basic performance capability level specifying Basic finance function performance assessment criteria in the finance-based business to manage finance workforce and develop finance skills, the Basic performance criteria including where finance & accounting skills are basic, where business acumen is limited, and where deep specialization exists;
a Competitive performance capability level specifying Competitive finance function performance assessment criteria in the finance-based business to manage finance workforce and develop finance skills, the Competitive performance criteria including where finance & accounting skills are strong, where business acumen and analysis skills are moderate, and where deep specialists exist in selected areas;
a Market Leading performance capability level specifying Market Leading finance function performance assessment criteria in the finance-based business to manage finance workforce and develop finance skills, the Market Leading performance criteria including where finance and accounting and business acumen skills are very strong, where deep specialists exist in all relevant areas, and where a deep understanding of value creation exists;
query logic operable to:
receive an input specifying an industry area and an industry key assessment area for analysis;
search the multidimensional industry performance reference set for a matching key assessment performance reference table that matches the industry area and the industry key assessment area; and
capability assessment logic operable to:
retrieve the matching key assessment performance reference table;
analyze the matching key assessment performance reference table; and
obtain a finance-based resultant performance capability level for the industry key assessment area.

25. The system of claim 24, wherein the query logic is further operable to obtain representative practice data and store the representative practice data in memory; and wherein the capability assessment logic is further operable to analyze the representative practice data to determine an industry and a key assessment area to which the representative practice data applies.

* * * * *